United States Patent
Dalal et al.

(10) Patent No.: US 12,433,463 B2
(45) Date of Patent: Oct. 7, 2025

(54) MAPPING AN ENVIRONMENT AROUND AN AUTONOMOUS VACUUM

(71) Applicant: MATIC ROBOTS, INC., Mountain View, CA (US)

(72) Inventors: Navneet Dalal, Atherton, CA (US); Seungho Yang, Mountain View, CA (US); Gavin Li, Menlo Park, CA (US); Mehul Nariyawala, Los Altos, CA (US)

(73) Assignee: MATIC ROBOTS, INC., Mountain View, CA (US)

( * ) Notice: Subject to any disclaimer, the term of this patent is extended or adjusted under 35 U.S.C. 154(b) by 322 days.

(21) Appl. No.: 17/172,022

(22) Filed: Feb. 9, 2021

(65) Prior Publication Data
US 2021/0244254 A1    Aug. 12, 2021

Related U.S. Application Data

(60) Provisional application No. 63/121,842, filed on Dec. 4, 2020, provisional application No. 62/972,563, filed on Feb. 10, 2020.

(51) Int. Cl.
*A47L 7/00*      (2006.01)
*A46B 9/00*      (2006.01)
(Continued)

(52) U.S. Cl.
CPC ............ *A47L 9/2847* (2013.01); *A46B 9/005* (2013.01); *A46B 13/006* (2013.01);
(Continued)

(58) Field of Classification Search
CPC ......... G05D 1/0212; G05D 2201/0215; G05D 1/0246; G05D 1/02; G05D 1/0238;
(Continued)

(56) References Cited

U.S. PATENT DOCUMENTS 3,995,414 A    12/1976  Kerr et al.
4,084,948 A     4/1978  Macfarland
(Continued)

FOREIGN PATENT DOCUMENTS

EP        1195127 A2    4/2002

OTHER PUBLICATIONS

X. Yu, J. Wang, W. Chen and H. Wang, "A Map Accessibility Analysis Algorithm for Mobile Robot Navigation in Outdoor Environment," 2019 IEEE International Conference on RCAR, Irkutsk, Russia, 2019, <https://ieeexplore.ieee.org/abstract/document/9043963/> (Year: 2019).*

(Continued)

*Primary Examiner* — Marc Burgess
*Assistant Examiner* — Karen Lynelle Furgason
(74) *Attorney, Agent, or Firm* — Fenwick & West LLP

(57) ABSTRACT

An autonomous cleaning robot (e.g., an autonomous vacuum) may use a sensor system to map an environment that may be used to determine where to clean. The autonomous vacuum receives visual data about the environment and determines a ground plane of the environment based on the visual data. The autonomous vacuum detects objects within the environment based on the ground plane. For each object, the autonomous vacuum segments a three-dimensional (3D) representation of the object out of the visual data and determines whether the object is static or dynamic. The autonomous vacuum adds static objects to a long-term level of a map of the environment and dynamic objects to an intermediate level of the map. The autonomous vacuum may further add virtual borders, flags, walls, and messes to the map.

20 Claims, 47 Drawing Sheets

(51) Int. Cl.

| | | |
|---|---|---|
| *A46B 13/00* | (2006.01) | |
| *A46D 1/00* | (2006.01) | |
| *A47L 5/30* | (2006.01) | |
| *A47L 5/34* | (2006.01) | |
| *A47L 9/04* | (2006.01) | |
| *A47L 9/14* | (2006.01) | |
| *A47L 9/28* | (2006.01) | |
| *A47L 11/20* | (2006.01) | |
| *A47L 11/40* | (2006.01) | |
| *B01D 46/00* | (2022.01) | |
| *B01D 46/02* | (2006.01) | |
| *G01C 21/00* | (2006.01) | |
| *G05D 1/00* | (2024.01) | |
| *G05D 1/225* | (2024.01) | |
| *G05D 1/646* | (2024.01) | |

(52) U.S. Cl.
CPC .............. *A46D 1/0207* (2013.01); *A47L 5/30* (2013.01); *A47L 5/34* (2013.01); *A47L 7/0004* (2013.01); *A47L 7/0009* (2013.01); *A47L 7/0023* (2013.01); *A47L 9/0477* (2013.01); *A47L 9/1409* (2013.01); *A47L 9/1427* (2013.01); *A47L 9/281* (2013.01); *A47L 9/2826* (2013.01); *A47L 11/201* (2013.01); *A47L 11/4052* (2013.01); *A47L 11/4061* (2013.01); *B01D 46/0036* (2013.01); *B01D 46/02* (2013.01); *G01C 21/383* (2020.08); *G05D 1/0044* (2013.01); *G05D 1/0212* (2013.01); *G05D 1/225* (2024.01); *G05D 1/646* (2024.01); *A46B 2200/3033* (2013.01); *A47L 9/2852* (2013.01); *A47L 9/2857* (2013.01); *A47L 2201/00* (2013.01); *A47L 2201/04* (2013.01); *A47L 2201/06* (2013.01); *B01D 2279/55* (2013.01)

(58) Field of Classification Search
CPC .. G05D 1/255; G05D 1/0044; A47L 2201/04; A47L 9/2847; A47L 5/30; A47L 5/34; A47L 7/0004; A47L 7/0009; A47L 7/0023; A47L 9/0477; A47L 9/1409; A47L 9/1427; A47L 9/281; A47L 9/2826; A47L 9/2857; A47L 9/2852; A47L 11/201; A47L 11/4052; A47L 11/4061; A47L 2201/00; A47L 7/00; A47L 11/20; B60W 2420/42; B60W 60/001; G01C 21/383; G01C 21/00; A46B 9/005; A46B 13/006; A46B 2200/3033; A46B 13/00; A46D 1/0207; B01D 46/02; B01D 2279/55
USPC .......................................................... 701/2
See application file for complete search history.

(56) References Cited

U.S. PATENT DOCUMENTS

| | | |
|---|---|---|
| 4,257,791 A | 3/1981 | Wald |
| 4,429,423 A | 2/1984 | Syrenne |
| 4,749,391 A | 6/1988 | Demarco |
| 4,836,141 A | 6/1989 | Whitfield |
| 5,198,198 A | 3/1993 | Gladfelter et al. |
| 5,236,135 A | 8/1993 | Wilson et al. |
| 5,389,346 A | 2/1995 | Copeland |
| 5,595,731 A | 1/1997 | Vallieres |
| 5,601,659 A | 2/1997 | Rohrbacher |
| 6,171,369 B1 | 1/2001 | Schultink et al. |
| 6,261,679 B1 | 7/2001 | Chen et al. |
| 7,534,398 B2 | 5/2009 | Dee et al. |
| 8,388,587 B1 | 3/2013 | Gmuer et al. |
| 8,764,990 B1 | 7/2014 | Julian et al. |
| 9,038,233 B2 | 5/2015 | Jones et al. |
| 9,195,236 B1* | 11/2015 | Fairfield ............... B60W 10/06 |
| 9,333,475 B1 | 5/2016 | Baselli et al. |
| 10,292,560 B2 | 5/2019 | Doughty |
| 10,517,454 B2 | 12/2019 | Jones et al. |
| 10,568,483 B2 | 2/2020 | Lewis |
| 11,058,271 B2 | 7/2021 | Blouin |
| 11,103,113 B2 | 8/2021 | Schregardus et al. |
| 11,116,374 B2 | 9/2021 | Dhindsa et al. |
| 11,278,173 B2 | 3/2022 | Jones et al. |
| 2003/0226773 A1 | 12/2003 | Shaffer |
| 2005/0028316 A1 | 2/2005 | Thomas et al. |
| 2006/0081000 A1 | 4/2006 | Trinh et al. |
| 2006/0085095 A1 | 4/2006 | Reindle et al. |
| 2006/0233470 A1 | 10/2006 | Jacoby et al. |
| 2006/0278087 A1 | 12/2006 | Sepke et al. |
| 2007/0042146 A1 | 2/2007 | Sharp |
| 2008/0060162 A1 | 3/2008 | Burnham |
| 2008/0179330 A1 | 7/2008 | Brooks et al. |
| 2008/0264029 A1 | 10/2008 | Sepaniak |
| 2010/0187135 A1 | 7/2010 | Broering et al. |
| 2010/0256812 A1 | 10/2010 | Tsusaka et al. |
| 2011/0015560 A1 | 1/2011 | Marasco |
| 2011/0047733 A1 | 3/2011 | Jiang et al. |
| 2011/0158563 A1 | 6/2011 | Soletski |
| 2011/0271469 A1 | 11/2011 | Ziegler et al. |
| 2012/0102670 A1 | 5/2012 | Jang et al. |
| 2013/0205716 A1 | 8/2013 | Savla |
| 2014/0013538 A1 | 1/2014 | Dyson et al. |
| 2014/0207281 A1 | 7/2014 | Angle et al. |
| 2014/0336863 A1* | 11/2014 | So .......... G05D 1/0219 701/28 |
| 2015/0107038 A1 | 4/2015 | Lee |
| 2015/0128364 A1 | 5/2015 | Dooley et al. |
| 2015/0342432 A1 | 12/2015 | Blackwell et al. |
| 2015/0352480 A1 | 12/2015 | Morison et al. |
| 2017/0038188 A1 | 2/2017 | Handel |
| 2017/0103658 A1* | 4/2017 | Djordjevic ............ H04W 4/185 |
| 2017/0298304 A1 | 10/2017 | Vesterager |
| 2017/0311768 A1 | 11/2017 | Tibberts |
| 2017/0341317 A1 | 11/2017 | Roberts |
| 2018/0143645 A1* | 5/2018 | Lee ...................... B25J 11/0015 |
| 2018/0184865 A1 | 7/2018 | Lee et al. |
| 2018/0184870 A1 | 7/2018 | Moon et al. |
| 2018/0199785 A1 | 7/2018 | Farmer et al. |
| 2018/0315200 A1* | 11/2018 | Davydov ................ G10L 15/26 |
| 2018/0344116 A1* | 12/2018 | Schriesheim ......... A47L 9/2857 |
| 2019/0045992 A1* | 2/2019 | Brede ................. A47L 11/4061 |
| 2019/0094870 A1* | 3/2019 | Afrouzi ................ G05D 1/0274 |
| 2019/0246867 A1 | 8/2019 | Ziamandanis |
| 2019/0254490 A1 | 8/2019 | Marutani et al. |
| 2019/0261826 A1 | 8/2019 | Goff |
| 2019/0328589 A1 | 10/2019 | Tanguay et al. |
| 2019/0377355 A1 | 12/2019 | Kwak et al. |
| 2020/0008641 A1 | 1/2020 | Gunter et al. |
| 2020/0196831 A1 | 6/2020 | Renner et al. |
| 2020/0293050 A1 | 9/2020 | Cheong |
| 2020/0317442 A1 | 10/2020 | Cox |
| 2020/0334887 A1* | 10/2020 | Salfity .................. G05D 1/0248 |
| 2021/0096579 A1* | 4/2021 | Artes ..................... G05D 1/246 |
| 2021/0130070 A1 | 5/2021 | Zhu et al. |
| 2022/0280007 A1* | 9/2022 | Jang ........................ G06F 3/167 |

OTHER PUBLICATIONS

Hongjun Zhou and Shigeyuki Sakane, "Localizing objects during robot SLAM in semi-dynamic environments," 2008 IEEE/ASME International Conference on Advanced Intelligent Mechatronics, Xian, 2008, pp. 595-601 <https://ieeexplore.ieee.org/abstract/document/4601727/> (Year: 2008).*

Dhiman, N.K., Deodhare, D. & Khemani, D. "Where am I? Creating spatial awareness in unmanned ground robots using SLAM: A survey." Sadhana 40, 1385-1433 (2015). <https://link.springer.com/article/10.1007/s12046-015-0402-6/> (Year: 2015).*

United States Office Action, U.S. Appl. No. 17/172,030, filed Nov. 16, 2022, 20 pages.

(56) References Cited

OTHER PUBLICATIONS

Invitation to Pay Additional Fees, Patent Cooperation Treaty Application No. PCT/US2021/017295, Apr. 13, 2021, three pages.
International Search Report and Written Opinion, Patent Cooperation Treaty Application No. PCT/US2021/017295, Jun. 24, 2021, 43 pages.
Ramalingam et al., "Vision-Based Dirt Detection and Adaptive Tiling Scheme for Selective Area Coverage," *Journal of Sensors*, vol. 2018, Article ID 3035128, Dec. 30, 2018, [online] [retrieved on Jun. 1, 2021] Retrieved from the Internet <URL:https://www.hindawi.com/journals/js/2018/3035128/>, sixteen pages.
United States Office Action, U.S. Appl. No. 17/172,030, filed Jun. 22, 2023, 23 pages.
United States Office Action, U.S. Appl. No. 18/410,528, filed Apr. 11, 2025, 12 pages.

\* cited by examiner

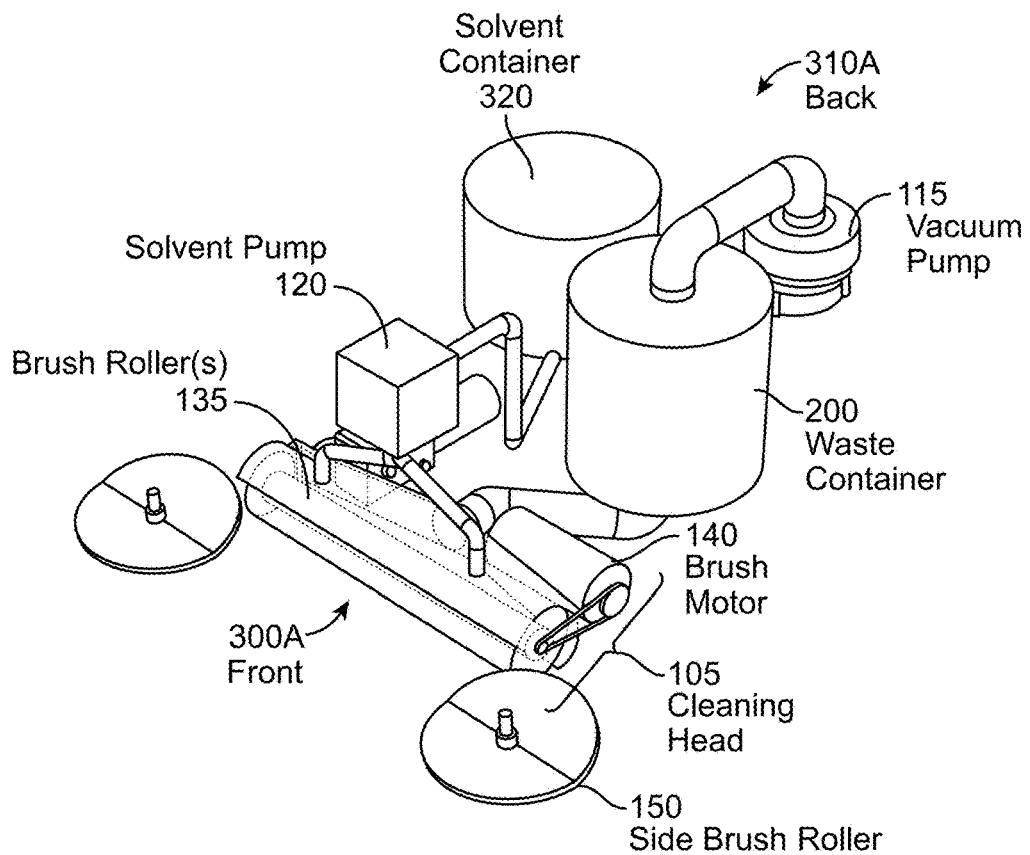
FIG. 3A
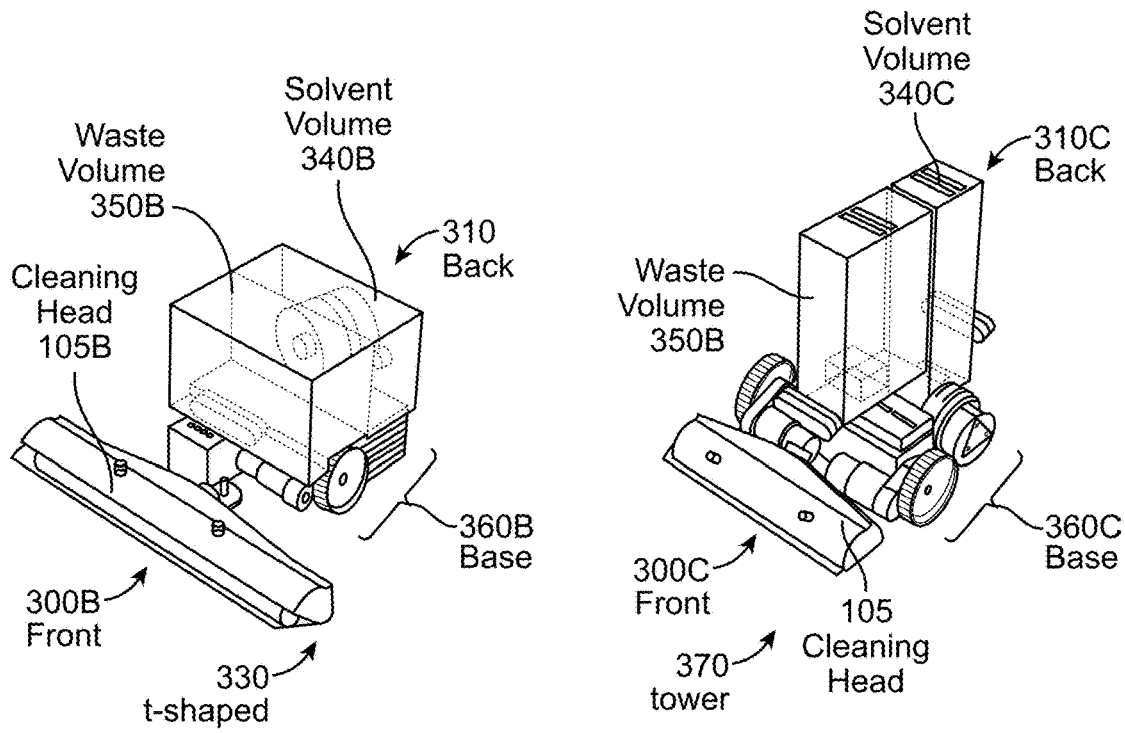
FIG. 3B
FIG. 3C

User Interface 2000A

User Interface 2000C

MAPPING AN ENVIRONMENT AROUND AN AUTONOMOUS VACUUM

CROSS REFERENCE TO RELATED APPLICATIONS

This nonprovisional application claims a benefit of, and a priority to, Provisional Application No. 62/972,563 application entitled "Self-actuated Autonomous Vacuum for Cleaning Various Mess Types," which was filed on Feb. 10, 2020, and Provisional Application No. 63/121,842 entitled "Self-Actuated Autonomous Vacuum for Cleaning Various Mess Types," which was filed on Dec. 4, 2020, the contents of each of which is incorporated by reference herein.

This application is related to U.S. application Ser. No. 17/172,037, titled "Self-Actuated Cleaning Head for an Autonomous Vacuum," which was filed on an even date herewith and incorporated herein by reference in its entirety.

This application is related to U.S. application Ser. No. 17/172,030, titled "Configuration of a Cleaning Head for an Autonomous Vacuum," which was filed on an even date herewith and incorporated herein by reference in its entirety.

This application is related to U.S. application Ser. No. 17/172,035, titled "Waste Bag with Absorbent Dispersion Sachet," which was filed on an even date herewith and incorporated herein by reference in its entirety.

TECHNICAL FIELD

This disclosure relates to autonomous cleaning systems. More particularly, this disclosure describes an autonomous cleaning system for identifying and automatically cleaning various surface and mess types using automated cleaning structures and components.

BACKGROUND

Conventional autonomous floor cleaning systems are limited in their capabilities. Due to the lack of capabilities, the autonomous floor cleaning systems only provide rudimentary cleaning solutions. Without the use of a plurality of sensors and better algorithms, the autonomous floor cleaning systems are unable to adapt to efficiently clean a variety of messes with optimal mobility and require manual adjustment to complete cleaning tasks. For example, conventional autonomous floor cleaning systems use cleaning heads to improve cleaning efficiency by agitating and loosening dirt, dust, and debris. If the cleaning head of a vacuum or sweeper is too low, the autonomous floor cleaning system may be unable to move over an obstacle or may damage the floor, and if the cleaning head is too high, the autonomous floor cleaning system may miss some of the mess. Even if a user manually sets the cleaning head at an optimal height, mobility of the cleaning head within the environment without getting stuck may be sacrificed for cleaning efficacy, which may still be nonoptimal for a variety of surface types and messes in the environment.

Aside from shortcomings as a vacuum cleaning system, conventional autonomous floor cleaning systems also have challenges with cleaning stains on hard surface flooring. A conventional floor cleaning system may include a mop roller for cleaning the floor. While light stains may be relatively easy to clean and can be done in one continuous pass, a tough stain dried onto a surface might require multiple passes of the autonomous floor cleaning system to remove. Further, autonomous floor cleaning systems are unable to inspect whether a stain has been cleaned or if another pass is required.

For some hard surface floorings, an autonomous floor cleaning system with a mop roller may need to apply pressure with the mop roller to remove a tough stain, and when pressure is applied to a microfiber cloth of the mop roller, the microfiber cloth may be unable to retain water as effectively as without pressure. For instance, the microfiber cloth contains voids that fill with water, and when pressure is applied to the microfiber cloth, the voids shrink in size, limiting the microfiber cloth's ability to capture and retain water.

Furthermore, another problem with conventional autonomous floor cleaning systems is a need for a place to store waste as it cleans an environment. Some conventional autonomous floor cleaning systems use a waste bag to collect and store the waste that the cleaning system picks up. However, conventional waste bags are limited to solid waste in their storage capabilities and may become saturated upon storage of liquid waste, resulting in weak points in the waste bag prone to tearing, filter performance issues, and leaks. Other waste storage solutions to handle both liquid and solid waste include waste containers, but liquid waste may adhere to the inside of the waste container, requiring extensive cleaning on the part of a user to empty the waste container.

Yet another issue with conventional autonomous floor cleaning systems is navigation. To navigate the environment, the conventional autonomous floor cleaning system may need a map of the environment. Though an autonomous floor cleaning system could attempt to create a map of an environment as it moves around, environments constantly change and are associated with unpredictability in where objects will be located in the environment on a day-to-day basis. This makes navigating the environment to clean up messes difficult for an autonomous floor cleaning system.

Further, interacting with the autonomous floor cleaning system to give commands for cleaning relative to the environment can be difficult. A user may inherently know where the objects or messes are within the environment, but the autonomous floor cleaning system may not connect image data of the environment to the specific wording a user uses in a command to direct the autonomous cleaning system. For example, if a user enters, via a user interface, a command for the autonomous floor cleaning system to "clean kitchen," without the user being able to confirm via a rendering of the environment that the autonomous floor cleaning system knows where the kitchen is, the autonomous floor cleaning system may clean the wrong part of the environment or otherwise misunderstand the command. Thus, a user interface depicting an accurate rendering of the environment is necessary for instruction in the autonomous floor cleaning system.

SUMMARY

An autonomous cleaning robot described herein uses an integrated, vertically-actuated cleaning head to increase cleaning efficacy and improve mobility. For ease of discussion and by way of one example, the autonomous cleaning robot will be described as an autonomous vacuum. However, the principles described herein may be applied to other autonomous cleaning robot configurations, including an autonomous sweeper, an autonomous mop, an autonomous duster, or an autonomous cleaning robot that may combine two or more cleaning functions (e.g., vacuum, sweep, dust, mop, move objects, etc.).

The autonomous vacuum may optimize the height of the cleaning head for various surface types. Moving the cleaning head automatically allows the user to remain hands-off in the cleaning processes of the autonomous vacuum while also increasing the autonomous vacuum's mobility within the environment. By adjusting the height of the cleaning head based on visual data of the environment, the autonomous vacuum may prevent itself from becoming caught on obstacles as it cleans an area of an environment. Another advantage of self adjusting the height of the cleaning head, such as for the size of debris in the environment ((e.g., when vacuuming a popcorn kernel, the autonomous vacuum moves the cleaning head vertically to at least to the size of that popcorn kernel), is that the autonomous vacuum may maintain a high cleaning efficiency while still being able to vacuum debris of various sizes. The cleaning head may include one or more brush rollers and one or more motors for controlling the brush rollers. Aside from the integrated cleaning head, the autonomous vacuum may include a solvent pump, vacuum pump, actuator, and waste bag. To account for liquid waste, the waste bag may include an absorbent for coagulating the liquid waste for ease of cleaning waste out of the autonomous vacuum.

Further, the cleaning head may include a mop roller comprising a mop pad. The mop pad may have surface characteristics such as an abrasive material to enable a scrubbing type action. The abrasive material may be sufficiently abrasive to remove, for example, a stained or sticky area, but not so abrasive as to damage (e.g., scratch) a hard flooring surface. In addition, the mop pad may be structured from an absorbent material, for example, a microfiber cloth. The autonomous vacuum may use the mop roller to mop and scrub stains by alternating directional velocities of the mop roller and the autonomous vacuum. The autonomous vacuum may dock at a docking station for charging and drying the mop pad using a heating element incorporated into the docking station.

Along with the physical components of the autonomous vacuum, the autonomous vacuum employs audiovisual sensors in a sensor system to detect user interactivity and execute tasks. The sensor system may include some or all of a camera system, microphone, inertial measurement unit, infrared camera, lidar sensor, glass detection sensor, storage medium, and processor. The sensor system collects visual, audio, and inertial data (or, collectively, sensor data). The autonomous vacuum may use the sensor system to collect and interpret user speech inputs, detect and map a spatial layout of an environment, detect messes of liquid and solid waste, determine surface types, and more. The data gathered by the sensor system may inform the autonomous vacuum's planning and execution of complex objectives, such as cleaning tasks and charging. Further, the data may be used to generate a virtual rendering of the physical environment around the autonomous vacuum, which may be displayed in user interfaces on a client device. A user may interact with the user interfaces and/or give audio-visual commands to transmit cleaning instructions to the autonomous vacuum based on objects in the physical environment.

In one example embodiment, an autonomous vacuum creates a two-dimensional (2D) or three-dimensional (3D) map of a physical environment as it moves around the floor of the environment and collects sensor data corresponding to that environment. For example, the autonomous vacuum may segment out three-dimensional versions of objects in the environment and map them to different levels within the map based on the observed amount of movement of the objects. The levels of the map include a long-term level, intermediate level, and immediate level. The long-term level contains mappings of static objects in the environment, which are objects that stay in place long-term, such as a closet or a table, and the intermediate level contains mappings of dynamic objects in the environment. The immediate level contains mappings of objects within a certain vicinity of the autonomous vacuum, such as the field of view of the cameras integrated into the autonomous vacuum. The autonomous vacuum uses the long-term level to localize itself as it moves around the environment and the immediate level to navigate around objects in the environment. As the autonomous vacuum collects visual data, the autonomous vacuum compares the visual data to the map to detect messes in the environment and create cleaning tasks to address the messes. The autonomous vacuum may additionally or alternatively use a neural network to detect dirt within the environment.

The features and advantages described in the specification are not all inclusive and, in particular, many additional features and advantages will be apparent to one of ordinary skill in the art in view of the drawings, specification, and claims. Moreover, it should be noted that the language used in the specification has been principally selected for readability and instructional purposes and may not have been selected to delineate or circumscribe the inventive subject matter.

BRIEF DESCRIPTION OF DRAWINGS

FIGS. 3A-3G illustrate various spatial arrangements of components of the autonomous vacuum, according to one example embodiment.

DETAILED DESCRIPTION

Figure 1:
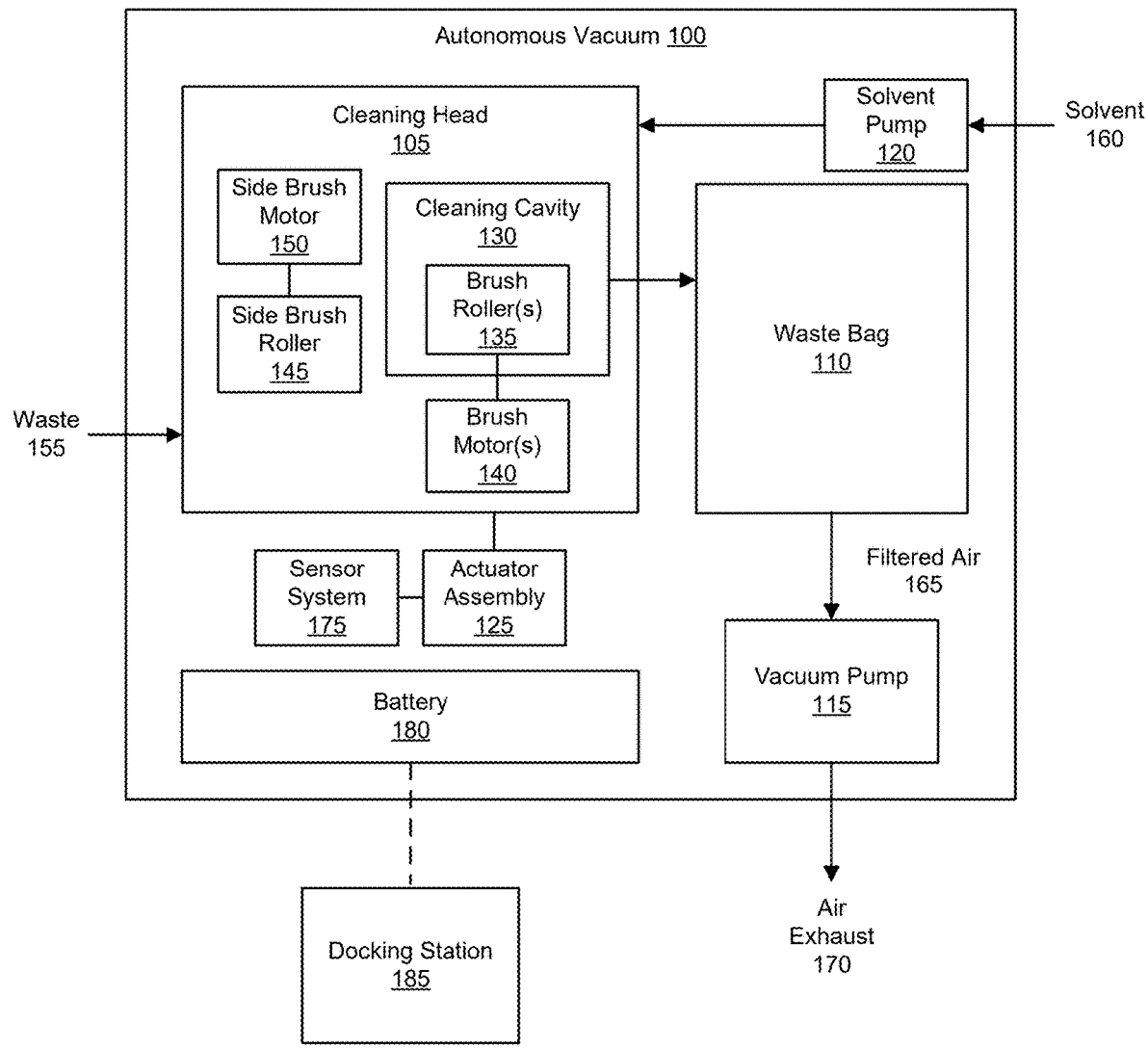
FIG. 1 is a block diagram of an autonomous vacuum, according to one example embodiment.

The figures (FIGS.) and the following description relate to preferred embodiments by way of illustration only. It should be noted that from the following discussion, alternative embodiments of the structures and methods disclosed herein will be readily recognized as viable alternatives that may be employed without departing from the principles of what is claimed.

Reference will now be made in detail to several embodiments, examples of which are illustrated in the accompanying figures. It is noted that wherever practicable similar or like reference numbers may be used in the figures and may indicate similar or like functionality. The figures depict embodiments of the disclosed system (or method) for purposes of illustration only. One skilled in the art will readily recognize from the following description that alternative embodiments of the structures and methods illustrated herein may be employed without departing from the principles described herein.

OVERVIEW

Autonomous cleaning system may run into a host of problems while attempting to complete clean messes within an environment. In particular, some stains and dirt particles, which may stick to the floor when below a certain size, cannot be cleaned effectively with dry vacuums or other non-contact cleaning methods. Other messes may involve larger components, such as chunks of food or small items, which can get in the way of an autonomous cleaning system that is setup to clean messes lower in height.

The following detailed description describes an autonomous cleaning robot. As previously noted, for ease of discussion and by way of one example, the autonomous cleaning robot will be described as an autonomous vacuum. The principles described herein are not intended to be limited to an autonomous vacuum and it is understood that the principles describe may be applied to other autonomous cleaning robot configurations, including an autonomous sweeper, an autonomous mop, an autonomous duster, or an autonomous cleaning robot that may combine two or more cleaning functions (e.g., vacuum and sweep or dust and mop).

In one example embodiment, an autonomous vacuum may include a self-actuated head that can account for some of these common cleaning issues. The autonomous vacuum roams around an environment (such as a house) to map the environment and detect messes within the environment. The autonomous vacuum includes an automated cleaning head that adjusts its height for cleaning a mess based on the mess type, surface type, and/or size of the mess. The autonomous vacuum may include a waste bag for collecting both liquid and solid waste, a camera sensor system for capturing visual-inertial data, and a variety of sensors in a sensor system for collecting other visual, audio, lidar, IR, time of flight, and inertial data (i.e., sensor data) about the environment. The autonomous vacuum may use this sensor data to map the environment, detect messes, compile and execute a task list of cleaning tasks, receive user instructions, and navigate the environment.

System Architecture

Figure ("FIG.") 1 is a block diagram of an autonomous vacuum 100, according to one example embodiment. The autonomous vacuum 100 in this example may include a cleaning head 105, waste bag 110, vacuum pump 115, solvent pump 120, actuator assembly 125, sensor system 175, and battery 180. The components of the autonomous vacuum 100 allow the autonomous vacuum 100 to intelligently clean as it traverses an area within an environment. In some embodiments, the architecture of the autonomous vacuum 100 include more components for autonomous cleaning purposes. Some examples include a mop roller, a solvent spray system, a waste container, and multiple solvent containers for different types of cleaning solvents. It is noted that the autonomous vacuum 100 may include functions that include cleaning functions that include, for example, vacuuming, sweeping, dusting, mopping, and/or deep cleaning.

The autonomous vacuum 100 uses the cleaning head 105 to clean up messes and remove waste from an environment. In some embodiments, the cleaning head 105 may be referred to as a roller housing, and the cleaning head 105 has a cleaning cavity 130 that contains a brush roller 135 that is controlled by a brush motor 140. In some embodiments, the autonomous vacuum 100 may include two or more brush rollers 135 controlled by two or more brush motors 140. The brush roller 135 may be used to handle large particle messes, such as food spills or small plastic items like bottle caps. In some embodiments, the brush roller is a cylindrically-shaped component that rotates as it collects and cleans messes. The brush roller may be composed of multiple materials for collecting a variety of waste, including synthetic bristle material, microfiber, wool, or felt. For further cleaning capabilities, the cleaning head 105 also has a side brush roller 145 that is controlled by a side brush motor 150. The side brush roller 145 may be shaped like a disk or a radial arrangement of whiskers that can push dirt into the path of the brush roller 135. In some embodiments, the side brush roller 145 is composed of different materials than the brush roller 135 to handle different types of waste and mess. Further, in embodiments where in the autonomous vacuum 100 also includes a mop roller, the brush roller 135, side brush roller 145, and mop roller may each be composed of different materials and operate at different times and/or speeds, depending on a cleaning task being executed by the autonomous vacuum 100. The brush roller 135, side brush roller 145, mop roller, and any other rollers on the autonomous vacuum 100 may collectively be referred to as cleaning rollers, in some embodiments.

The cleaning head 105 ingests waste 155 as the autonomous vacuum 100 cleans using the brush roller 135 and the side brush roller 145 and sends the waste 155 to the waste bag 110. The waste bag 110 collects and filters waste 155 from the air to send filtered air 165 out of the autonomous vacuum 100 through the vacuum pump 115 as air exhaust 170. Various embodiments of the waste bag 110 are further described in relation to FIGS. 11A-11D. The autonomous vacuum 100 may also use solvent 160 combined with pressure from the cleaning head 105 to clean a variety of surface types. The autonomous vacuum may dispense solvent 160 from the solvent pump 120 onto an area to remove dirt, such as dust, stains, and solid waste and/or clean up liquid waste. The autonomous vacuum 100 may also dispense solvent 160 into a separate solvent tray, which may be part of a charging station (e.g., docking station 185), described below, clean the brush roller 135 and the side brush roller 145.

The actuator assembly 125 includes one or more actuators (henceforth referred to as an actuator for simplicity), one or more controllers and/or processors (henceforth referred to as a controller for simplicity) that operate in conjunction with the sensor system 175 to control movement of the cleaning head 105. In particular, the sensor system 175 collects and uses sensor data to determine an optimal height for the cleaning head 105 given a surface type, surface height, and mess type. Surface types are the material the floor of the environment is made of and may include carpet, wood, and tile. Mess types are the form of mess in the environment, such as smudges, stains, and spills. It also includes the type of phase the mess embodies, such as liquid, solid, semi-solid, or a combination of liquid and solid. Some examples of waste include bits of paper, popcorn, leaves, and particulate dust. A mess typically has a size/form factor that is relatively small compared to obstacles that are larger. For example, spilled dry cereal may be a mess but the bowl it came in would be an obstacle. Spilled liquid may be a mess, but the glass that held it may be an obstacle. However, if the glass broke into smaller pieces, the glass would then be a mess rather than an obstacle. Further, if the sensor system 175 determines that the autonomous vacuum 100 cannot properly clean up the glass, the glass may again be considered an obstacle, and the sensor system 175 may send a notification to a user indicating that there is a mess that needs user cleaning. The mess may be visually defined in some embodiments, e.g., visual characteristics. In other embodiments it may be defined by particle size or make up. When defined by size, in some embodiments, a mess and an obstacle may coincide. For example, a small LEGO brick piece may be the size of both a mess and an obstacle. The sensor system 175 is further described in relation to FIG. 4.

The actuator assembly 125 automatically adjusts the height of the cleaning head 105 given the surface type, surface height, and mess type. In particular, the actuator controls vertical movement and rotation tilt of the cleaning head 105. The actuator may vertically actuate the cleaning head 105 based on instructions from the sensor system. For example, the actuator may adjust the cleaning head 105 to a higher height if the sensor system 175 detects thick carpet in the environment than if the processor detects thin carpet. Further, the actuator may adjust the cleaning head 105 to a higher height for a solid waste spill than a liquid waste spill. In some embodiments, the actuator may set the height of the cleaning head 105 to push larger messes out of the path of the autonomous vacuum 100. For example, if the autonomous vacuum 100 is blocked by a pile of books, the sensor system 165 may detect the obstruction (i.e., the pile of books) and the actuator may move the cleanings head 105 to the height of the lowest book, and the autonomous vacuum 100 may move the books out of the way to continue cleaning an area. Furthermore, the autonomous vacuum 100 may detect the height of obstructions and/or obstacles, and if an obstruction or obstacle is over a threshold size, the autonomous vacuum 100 may use the collected visual data to determine whether to climb or circumvent the obstruction or obstacle by adjusting the cleaning head height using the actuator assembly 125.

The controller of the actuator assembly 125 may control movement of the autonomous vacuum 100. In particular, the controller connects to one more motors connected to one or more wheels that may be used to move the autonomous vacuum 100 based on sensor data captured by the sensor system 175 (e.g., indicating a location of a mess to travel to). The controller may cause the motors to rotate the wheels forward/backward or turn to move the autonomous vacuum 100 in the environment. The controller may additionally control dispersion of solvent via the solvent pump 120, turning on/off the vacuum pump 115, instructing the sensor system 175 to capture data, and the like based on the sensor data.

The controller of the actuator assembly 125 may also control rotation of the cleaning rollers. The controller also connects to one or more motors (e.g., the brush motor(s) 140, side brush motor 150, and one or more mop motors) positioned at the ends of the cleaning rollers. The controller can toggle rotation of the cleaning rollers between rotating forward or backward or not rotating using the motors. In some embodiments, the cleaning rollers may be connected to an enclosure of the cleaning head 105 via rotation assemblies each comprising one or more of pins or gear assemblies that connect to the motors to control rotation of the cleaning rollers. The controller may rotate the cleaning rollers based on a direction needed to clean a mess or move a component of the autonomous vacuum 100. In some embodiments, the sensor system 175 determines an amount of pressure needed to clean a mess (e.g., more pressure for a stain than for a spill), and the controller may alter the rotation of the cleaning rollers to match the determined pressure. The controller may, in some instances, be coupled to a load cell at each cleaning roller used to detect pressure being applied by the cleaning roller. In another instance, the sensor system 175 may be able to determine an amount of current required to spin each cleaning roller at a set number of rotations per minute (RPM), which may be used to determine a pressure being exerted by the cleaning roller. The sensor system may also determine whether the autonomous vacuum 100 is able to meet an expected movement (e.g., if a cleaning roller is jammed) and adjust the rotation via the controller if not. Thus, the sensor system 175 may optimize a load being applied by each cleaning roller in a feedback control loop to improve cleaning efficacy and mobility in the environment.

The autonomous vacuum 100 is powered with an internal battery 180. The battery 180 stores and supplies electrical power for the autonomous vacuum 100. In some embodiments, the battery 180 consists of multiple smaller batteries that charge specific components of the autonomous vacuum 100. The autonomous vacuum 100 may dock at a docking station 185 to charge the battery 180. The process for charging the battery 180 is further described in relation to FIG. 12. The docking station 185 may be connected to an external power source to provide power to the battery 180. External power sources may include a household power source and one or more solar panels. The docking station 185 also may include processing, memory, and communication computing components that may be used to communicate with the autonomous vacuum 100 and/or a cloud computing infrastructure (e.g., via wired or wireless communication). These computing components may be used for firmware updates and/or communicating maintenance status. The docking station 185 also may include other components, such as a cleaning station for the autonomous vacuum 100. In some embodiments, the cleaning station includes a solvent tray that the autonomous vacuum 100 may spray solvent into and roll the brush roller 135 or the side brush roller 145 in for cleaning. In other embodiments, the autonomous vacuum may eject the waste bag 110 into a container located at the docking station 185 for a user to remove.

Figure 2:
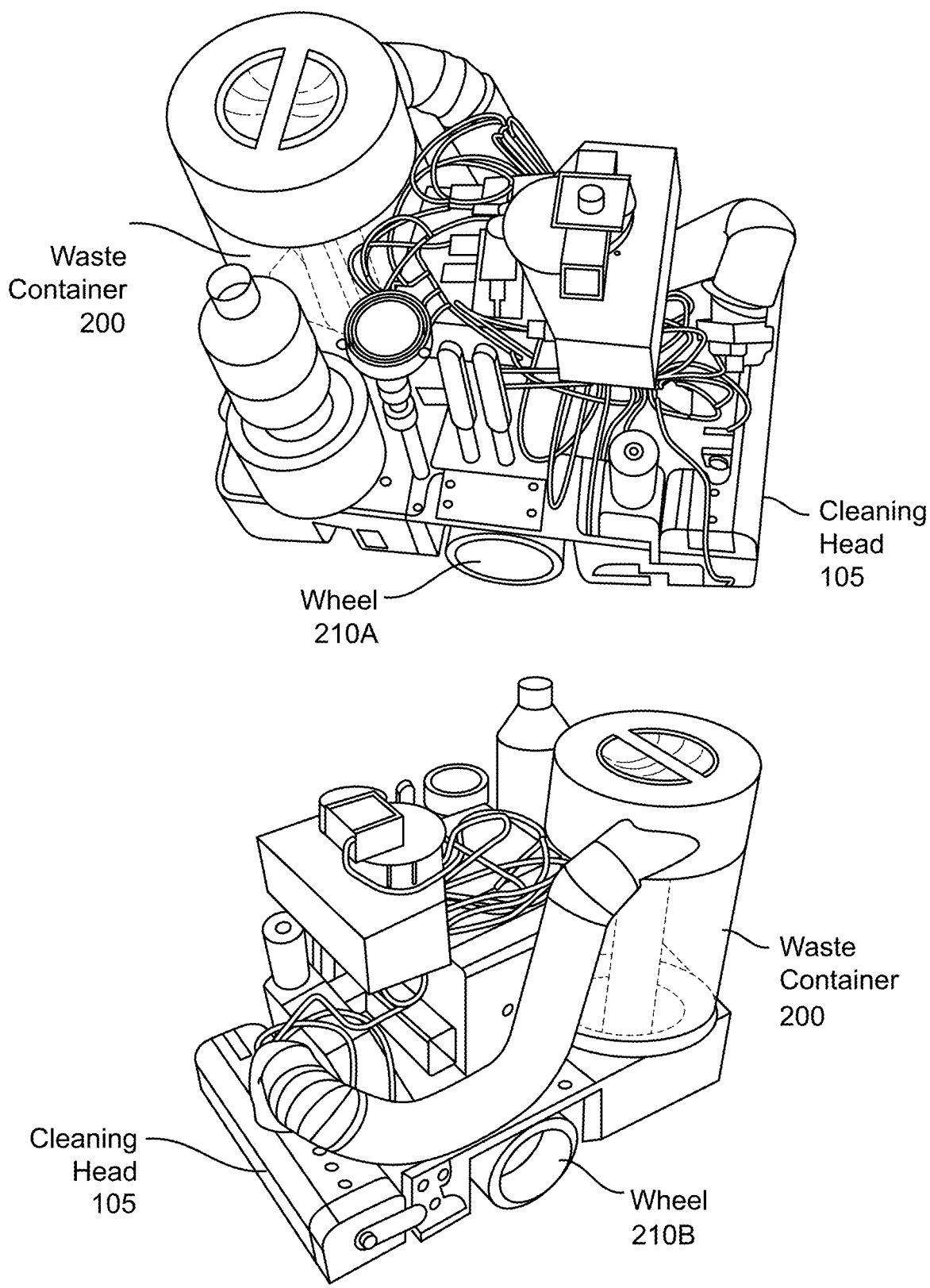
FIG. 2 illustrates the autonomous vacuum from various perspective views, according to one example embodiment.

FIG. 2 illustrates the autonomous vacuum 100 from various perspective views, according to one example embodiment. In this example embodiment, the autonomous vacuum 100 includes a waste container 200 instead of the waste bag 110. In some embodiments, the waste container 200 may contain the waste bag 110. Both angles of the autonomous vacuum 100 in the figure show the cleaning head 105 and at least one wheel 210, among other components. In this embodiment, the autonomous vacuum 100 has two wheels 210 for movement that rotate via one or more motors controlled by the controller, but in other embodiments, the autonomous vacuum 100 may have more wheels or a different mechanism for movement including forward/backward rotation or side-to-side movement (e.g., for turning the autonomous vacuum 100).

Figure 3D:
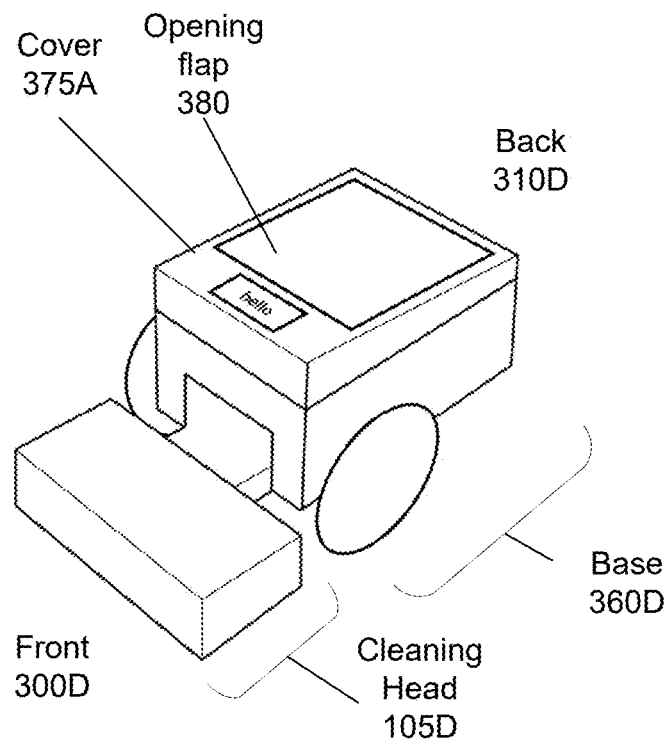

FIGS. 3A-3E illustrate various spatial arrangements of some components of the autonomous vacuum 100, according to one example embodiment. FIG. 3A shows the cleaning head at the front 300A of the autonomous vacuum 100. The cleaning head 105 may include a cylindrical brush roller 135 and a cylindrical side brush roller 150. Above the cleaning head 105 is the solvent pump 120, which dispenses solvent 160 from a solvent container 320 to the cleaning head 105 for cleaning messes. The solvent container 320 is at the back 310A of the autonomous vacuum 100 next to the waste container 200 and the vacuum pump 115, which pulls waste 155 into the waste container 200 as the cleaning head 105 moves over the waste 155.

FIG. 3B illustrates a t-shaped 330 spatial configuration of components of the autonomous vacuum 100. For simplicity, the figure shows a solvent volume 340B and a waste volume 350B. The solvent volume 340B may contain the solvent pump 120 and solvent container 320 of FIG. 3A, and the waste volume 350B may contain the waste container 200 (and/or waste bag 110, in other embodiments) and vacuum pump 115 of FIG. 3A. In this configuration, the cleaning head 105B is at the front 300B of the autonomous vacuum 100 and is wider than the base 360B. The solvent volume 340B is at the back 310B of the autonomous vacuum 100, and the waste volume 350B is in between the cleaning head 105B and the solvent volume 340B. Both the solvent volume 340B and the waste volume 350B each have the same width as the base 360B.

FIG. 3C illustrates a tower 370 spatial configuration of components of the autonomous vacuum 100. For simplicity, the figure shows a solvent volume 340C and a waste volume 350C. The solvent volume 340C may contain the solvent pump 120 and solvent container 320 of FIG. 3A, and the waste volume 350C may contain the waste container 200 (and/or waste bag 110, in other embodiments) and vacuum pump 115 of FIG. 3A. In this configuration, the cleaning head 105C is at the front 300C of the autonomous vacuum 100 and is the same width as the base 360B. The solvent volume 340C is at the back 310C of the autonomous vacuum 100, and the waste volume 350C is in between the cleaning head 105C and the solvent volume 340C. Both the solvent volume 340C and the waste volume 350C are smaller in width than the base 360C and are taller than the solvent volume 340B and the waste volume 350B of the t-shaped configuration 330 in FIG. 3B.

FIG. 3D illustrates a cover 375A of autonomous vacuum 100. In particular, the cover is an enclosed structure that covers the solvent volume 340 and waste volume 350. In this configuration, the cleaning head 105D is at the front 300D of the autonomous vacuum 100 and is the same width as the base 360D. The cover is at the back 310D of the autonomous vacuum 100, and includes an opening flap 380 that a user can open or close to access the solvent volume 340 and waste volume 350 (e.g., to add more solvent, remove the waste bag 110, or put in a new waste bag 110). The cover may also house a subset of the sensors of the sensor system 175 and the actuator assembly 125, which may be configured at a front of the cover 375A to connect to the cleaning head 105D.

In some embodiments, such as the spatial configuration of FIGS. 3A-3D, the cleaning head 105 has a height of less than 3 inches (or e.g., less than 75 millimeters (mm)) at each end of the cleaning head 105. This maximum height allows the autonomous vacuum 100 to maneuver the cleaning head 105 under toe kicks in a kitchen. A toe kick is a recessed area between a cabinet and the floor in the kitchen and traditionally poses a challenge to clean with conventional autonomous vacuums due to their geometries. By keeping the height of the cleaning head 105 below 3 inches (or below 75 mm), the autonomous vacuum 100 can clean under toe kicks without height constraints reducing the amount of waste that the autonomous vacuum 100 can collect (i.e., not limiting the size of the waste volume 350).

Figure 3E:
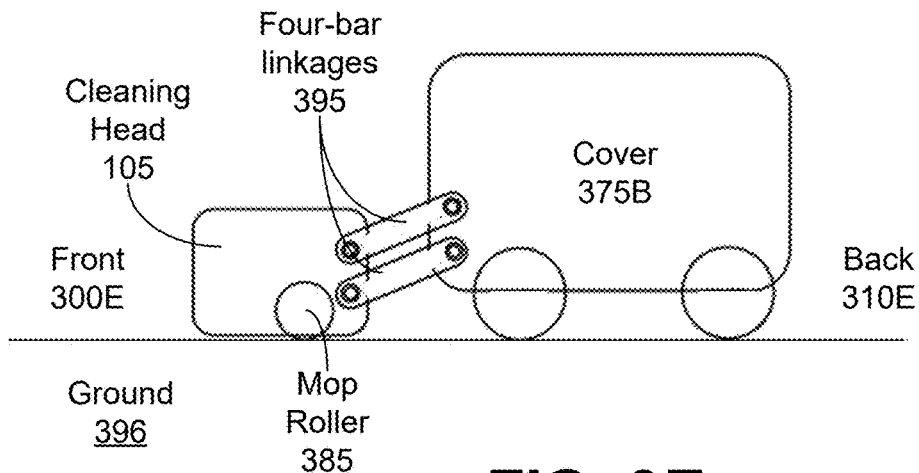

In some embodiments, as shown in FIG. 3E, the autonomous vacuum 100 may be configured using four-bar linkages 395 that connect the cleaning head 105 to the cover 375B. In some embodiments, the four-bar linkages may connect the cleaning head 105 directly to the cover 375B (also referred to as the body of the autonomous vacuum 100) or one or more components housed by the cover 375B. The four-bar linkages are connected to the actuator of the actuator assembly 125 such that the actuator can control movement of the cleaning head with the four-bar linkages. The four-bar linkages 395 allow the cleaning head 105 to maintain an unconstrained vertical degree of freedom and control rotation movement of the cleaning head 105 to reduce slop (e.g., side-to-side rotation from the top of the cleaning head 105, from the front of the cleaning head 105, and from each side of the cleaning head 105) upon movement of the autonomous vacuum. The four-bar linkages 395 also allow the cleaning head 105 to have a constrained rotational (from front 300E to back 310E) degree of freedom. This is maintained by leaving clearance between pins and bearings that hold the four-bar linkages 395 in place between the cleaning head 105 and the cover 375B.

The four-bar linkages 395 allow the autonomous vacuum 100 to keep the cleaning head 105 in consistent contact with the ground 396 by allowing for vertical and rotational variation without allowing the cleaning head 105 to flip over, as shown in FIG. 3E. Thus, if the autonomous vacuum 100 moves over an incline, the cleaning head 105 may adjust to the contour of the ground 396 by staying flat against the ground 386. This may be referred to as passive articulation, which may be applied to keep the autonomous vacuum 100 from becoming stuck on obstacles within the environment. The autonomous vacuum 100 may leverage the use of the four-bar linkages to apply pressure to the brush roller 135 with the actuator to deeply clean carpets or other messes.

Figure 3F:
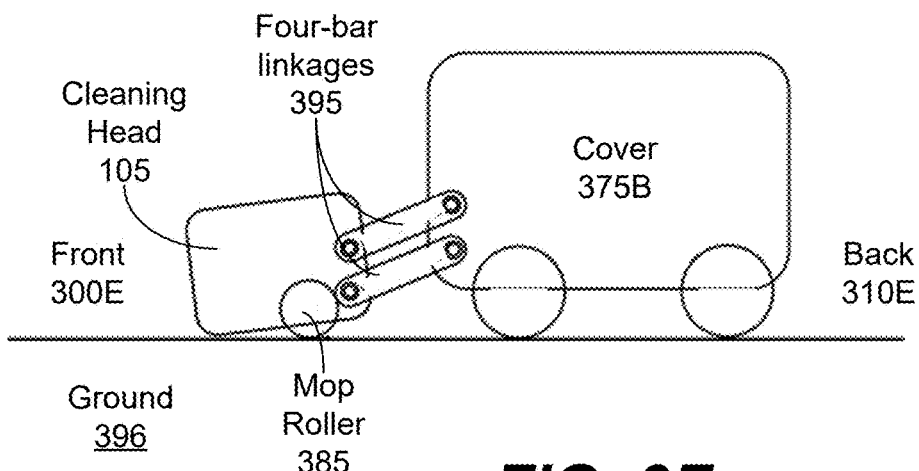
Figure 3G:
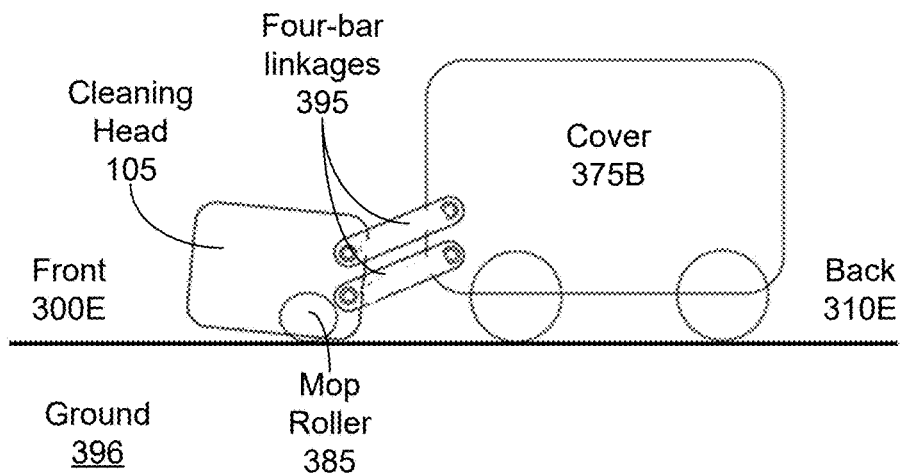

The connection using the four-bar linkages also allow the autonomous vacuum 100 to apply pressure to a mop roller 385 to clean various messes. The mop roller 385 may be partially composed of microfiber cloth that retains water (or other liquids) depending on pressure applied to the mop roller 385. In particular, if the mop roller 385 is applied to the ground 386 with high pressure, the mop roller 385 cannot retain as much water as when the mop roller 385 is applied to the ground 396 with low pressure. The mop roller 385 may have higher cleaning efficacy when not retaining water than when retaining water. For example, if the autonomous vacuum 100 moves forward (i.e., towards its front 300E), the mop roller 385 will apply a low pressure and take in more water since it is uncompressed, as shown in FIG. 3F. Further, if the autonomous vacuum 100 moves backward, the mop roller 385 will apply a high pressure due to backward title of the cleaning head 105 from the four-bar linkages, resulting in a high cleaning efficacy, as shown in FIG. 3G. The autonomous vacuum 100 may leverage these aspects of using the four-bar linkages to clean messes detected by the sensor system 175 with the mop roller 385 (e.g., such as alternating between moving forward and backward to suck in water and scrub a stain, respectively). The mop roller is further described in relation to FIGS. 22-25.

Sensor System

Figure 4:
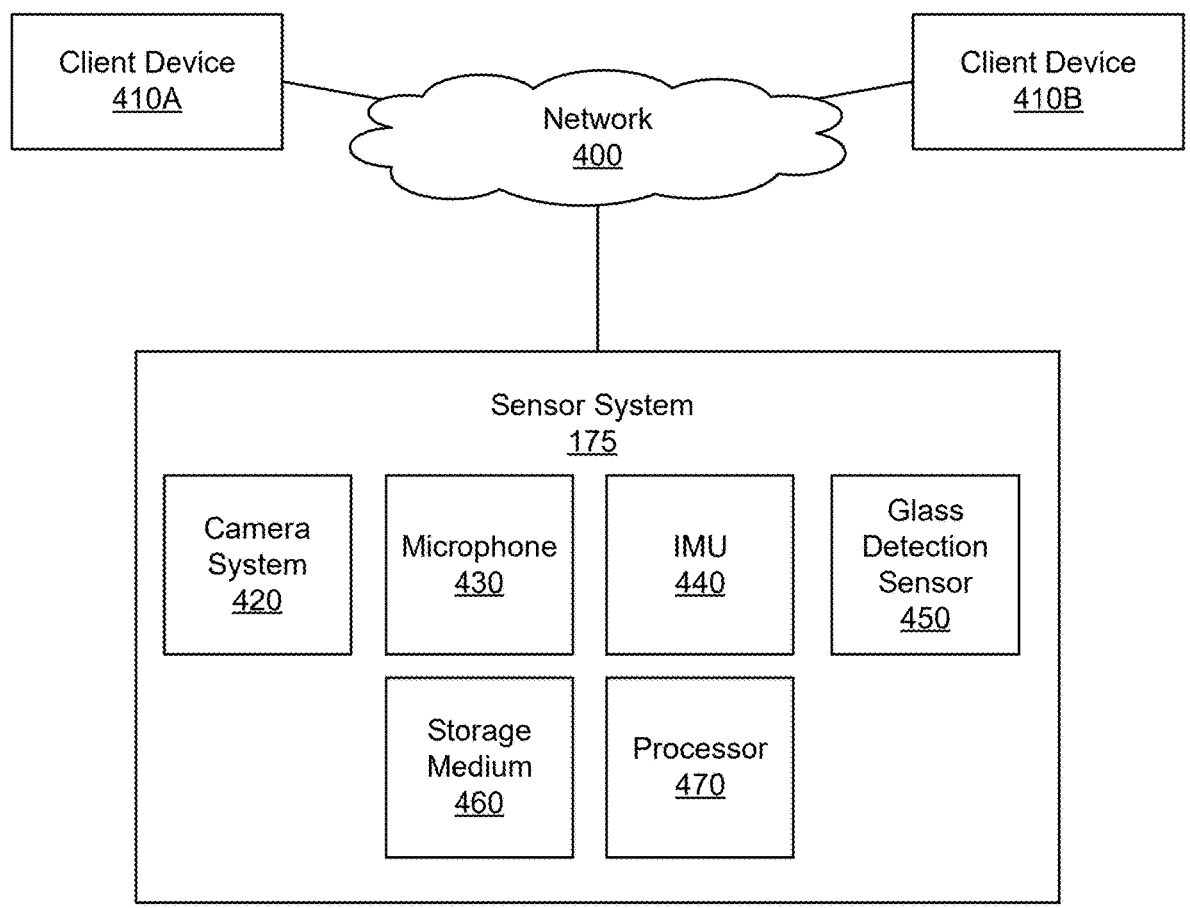
FIG. 4 is a block diagram of a sensor system of the autonomous vacuum, according to one example embodiment.

FIG. 4 is a block diagram of a sensor system 175 of the autonomous vacuum 100, according to one example embodiment. The sensor system 175 receives data from, for example, camera (video/visual), microphone (audio), lidar, infrared (IR), and/or inertial data (e.g., environmental surrounding or environment sensor data) about an environment for cleaning and uses the sensor data to map the environment and determine and execute cleaning tasks to handle a variety of messes. The sensor system 175 may communicate with one or more client devices 410 via a network 400 to send sensor data, alert a user to messes, or receive cleaning tasks to add to the task list.

The network 400 may comprise any combination of local area and/or wide area networks, using wired and/or wireless communication systems. In one embodiment, the network 400 uses standard communications technologies and/or protocols. For example, the network 400 includes communication links using technologies such as Ethernet, 802.11 (WiFi), worldwide interoperability for microwave access (WiMAX), 3G, 4G, 5G, code division multiple access (CDMA), digital subscriber line (DSL), Bluetooth, Near Field Communication (NFC), Universal Serial Bus (USB), or any combination of protocols. In some embodiments, all or some of the communication links of the network 400 may be encrypted using any suitable technique or techniques.

The client device 410 is a computing device capable of receiving user input as well as transmitting and/or receiving data via the network 400. Though only two client devices 410 are shown in FIG. 4, in some embodiments, more or less client devices 410 may be connected to the autonomous vacuum 100. In one embodiment, a client device 410 is a conventional computer system, such as a desktop or a laptop computer. Alternatively, a client device 410 may be a device having computer functionality, such as a personal digital assistant (PDA), a mobile telephone, a smartphone, a tablet, an Internet of Things (IoT) device, or another suitable device. A client device 410 is configured to communicate via the network 400. In one embodiment, a client device 410 executes an application allowing a user of the client device 410 to interact with the sensor system 175 to view sensor data, receive alerts, set cleaning settings, and add cleaning tasks to a task list for the autonomous vacuum 100 to complete, among other interactions. For example, a client device 410 executes a browser application to enable interactions between the client device 410 and the autonomous vacuum 100 via the network 400. In another embodiment, a client device 410 interacts with autonomous vacuum 100 through an application running on a native operating system of the client device 410, such as iOS® or ANDROID™.

The sensor system 175 includes a camera system 420, microphone 430, inertial measurement device (IMU) 440, a glass detection sensor 445, a lidar sensor 450, lights 455, a storage medium 460, and a processor 47. The camera system 420 comprises one or more cameras that capture images and or video signals as visual data about the environment. In some embodiments, the camera system includes an IMU (separate from the IMU 440 of the sensor system 175) for capturing visual-inertial data in conjunction with the cameras. The visual data captured by the camera system 420 may be used by storage medium for image processing, as described in relation to FIG. 5. The camera system is further described in relation to FIGS. 6 and 7.

The microphone 430 captures audio data by converting sound into electrical signals that can be stored or processed by other components of the sensor system 175. The audio data may be processed to identify voice commands for controlling functions of the autonomous vacuum 100, as described in relation to FIG. 5. In an embodiment, sensor system 175 uses more than one microphone 430, such as an array of microphones.

The IMU 440 captures inertial data describing the autonomous vacuum's 100 force, angular rate, and orientation. The IMU 440 may comprise of one or more accelerometers, gyroscopes, and/or magnetometers. In some embodiments, the sensor system 175 employs multiple IMUs 440 to capture a range of inertial data that can be combined to determine a more precise measurement of the autonomous vacuum's 100 position in the environment based on the inertial data.

The glass detection sensor 445 detects glass in the environment. The glass detection sensor 445 may be an infrared sensor and/or an ultrasound sensor. In some embodiments, the glass detection sensor 445 is coupled with the camera system 420 to remove glare from the visual data when glass is detected. For example, the camera system 420 may have integrated polarizing filters that can be applied to the cameras of the camera system 420 to remove glare. This embodiment is further described in relation to FIG. 7. In some embodiments, the glass sensor is a combination of an IR sensor and neural network that determines if an obstacle in the environment is transparent (e.g., glass) or opaque.

The lidar sensor 450 emits pulsed light into the environment and detects reflections of the pulsed light on objects (e.g., obstacles or obstructions) in the environment. Lidar data captured by the lidar sensor 450 may be used to determine a 3D representation of the environment. The lights 455 are one or more illumination sources that may be used by the autonomous vacuum 100 to illuminate an area around the autonomous vacuum 100. In some embodiments, the lights may be white LEDs.

The processor 470 operates in conjunction with the storage medium 460 (e.g., a non-transitory computer-readable storage medium) and the actuator assembly 125 (e.g., by being communicatively coupled to the actuator assembly 125) to carry out various functions attributed to the autonomous vacuum 100 described herein. For example, the storage medium 460 may store one or more modules or applications (described in relation to FIG. 5) embodied as instructions executable by the processor 470. The instructions, when executed by the processor 470, cause the processor 470 to carry out the functions attributed to the various modules or applications described herein or instruct the controller and/or actuator to carry out movements and/or functions. For example, instruction may include when to take the sensor data, where to move the autonomous vacuum 100 to, and how to clean up a mess. In one embodiment, the processor 470 may comprise a single processor or a multi-processor system.

Figure 5:
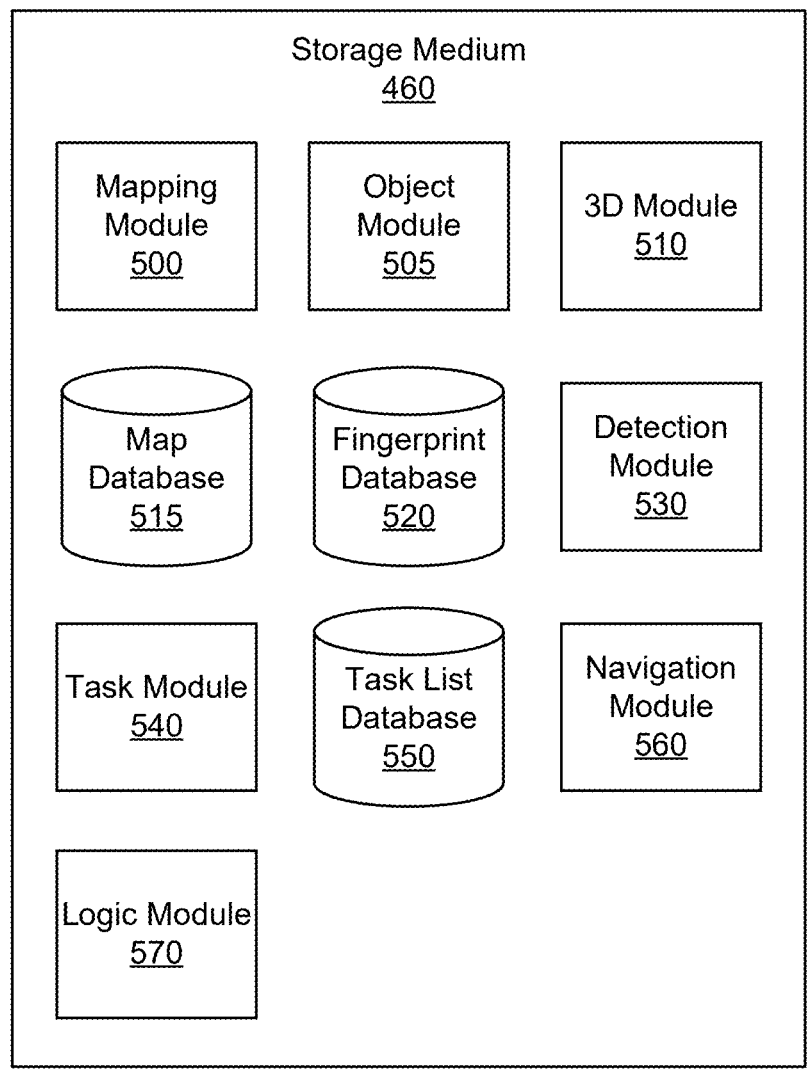
FIG. 5 is a block diagram of a storage medium of the sensor system, according to one example embodiment.

FIG. 5 is a block diagram of the storage medium 460 of the sensor system 175, according to one example embodiment. The storage medium 460 includes a mapping module 500, an object module 505, a 3D module 510, a map database 515, a fingerprint database 520, a detection module 530, a task module 540, a task list database 550, a navigation module 560, and a logic module 570. In some embodiments, the storage medium 460 includes other modules that control various functions for the autonomous vacuum 100. Examples include a separate image processing module, a separate command detection module, and an object database.

The mapping module 500 creates and updates a map of an environment as the autonomous vacuum 100 moves around the environment. The map may be a two-dimensional (2D) or a three-dimensional (3D) representation of the environment including objects and other defining features in the environment. For simplicity, the environment may be described in relation to a house in this description, but the autonomous vacuum 100 may be used in other environments in other embodiments. Example environments include offices, retail spaces, and classrooms. For a first mapping of the environment, the mapping module 500 receives visual data from the camera system 420 and uses the visual data to construct a map. In some embodiments, the mapping module 500 also uses inertial data from the IMU 440 and lidar and IR data to construct the map. For example, the mapping module 500 may use the inertial data to determine the position of the autonomous vacuum 100 in the environment, incrementally integrate the position of the autonomous vacuum 100, and construct the map based on the position. However, for simplicity, the data received by the mapping module 500 will be referred to as visual data throughout the description of this figure.

In another embodiment, the mapping module 500 may capture a 360 degree "panorama view" using the camera system 420 while the autonomous vacuum 100 rotates around a center axis. The mapping module 500 applies a neural network to the panorama view to determine a boundary within the environment (e.g., walls), which the mapping module 500 may use for the representation of the environment. In other embodiments, the mapping module 500 may cause the autonomous vacuum 100 to trace the boundary of the environment by moving close to walls or other bounding portions of the environment using the camera system 100. The mapping module 500 uses the boundary for the representation.

In another embodiment, mapping module 500 may use auto-detected unique key points and descriptions of these key points to create a nearest neighborhood database in the map database 510. Each key point describes a particular feature of the environment near the autonomous vacuum 100 and the descriptions describe aspects of the features, such as color, material, location, etc. As the autonomous vacuum 100 moves about the environment, the mapping module 500 uses the visual data to extract unique key points and descriptions from the environment. In some embodiments, the mapping module 500 may determine key points using a neural network. The mapping module 500 estimates which key points are visible in the nearest neighborhood database by using the descriptions as matching scores. After the mapping module 500 determines there are a threshold number of key points within visibility, the mapping module 500 uses these key points to determine a current location of the autonomous vacuum 100 by triangulating the locations of the key points with both the image location in the current visual data and the known location (if available) of the key point from the map database 515. In another embodiment, the mapping module uses the key points between a previous frame and a current frame in the visual data to estimate the current location of the autonomous vacuum 100 by using these matches as reference. This is typically done when the autonomous vacuum 100 is seeing a new scene for the first time, or when the autonomous vacuum 100 is unable to localize using previously existing key points on the map. Using this embodiment, the mapping module 500 can determine the position of the autonomous vacuum 100 within the environment at any given time. Further, the mapping module 500 may periodically purge duplicate key points and add new descriptions for key points to consolidate the data describing the key points. In some embodiments, this is done while the autonomous vacuum 100 is at the docking station 185.

The mapping module 500 processes the visual data when the autonomous vacuum 100 is at the docking station 185. The mapping module 500 runs an expansive algorithm to process the visual data to identify the objects and other features of the environment and piece them together into the map. The mapping module stores the map in the map database 515 and may store the map as a 3D satellite view of the environment. The mapping module 500 may update the map in the map database 515 to account for movement of objects in the environment upon receiving more visual data from the autonomous vacuum 100 as it moves around the environment over time. By completing this processing at the docking station, the autonomous vacuum 100 may save processing power relative to mapping and updating the map while moving around the environment. The mapping module 500 may use the map to quickly locate and/or determine the location of the autonomous vacuum 100 within the environment, which is faster than when computing the map at the same time. This allows the autonomous vacuum 100 to focus its processing power while moving on mess detection, localization, and user interactions while saving visual data for further analysis at the docking station.

The mapping module 500 constructs a layout of the environment as the basis of the map using visual data. The layout may include boundaries, such as walls, that define rooms, and the mapping module 500 layers objects into this layout to construct the map. In some embodiments, the mapping module 500 may use surface normals from 3D estimates of the environment and find dominant planes using one or more algorithms, such as RANSAC, which the mapping module 500 uses to construct the layout. In other embodiments, the mapping module 500 may predict masks corresponding to dominant planes in the environment using a neural network trained to locate the ground plane and surface planes on each side of the autonomous vacuum 100.

If such surface planes are not present in the environment, the neural network may output an indication of "no planes." The neural network may be a state-of-the-art object detection and masking network trained on a dataset of visual data labeled with walls and other dominant planes. The mapping module 500 also uses the visual data to analyze surfaces throughout the environment. The mapping module 500 may insert visual data for each surface into the map to be used by the detection module 530 as it detects messes in the environment, described further below. For each different surface in the environment, the mapping module 500 determines a surface type of the surface and tags the surface with the surface type in the map. Surface types include various types of carpet, wood, tile, and cement, and, in some embodiments, the mapping module 500 determines a height for each surface type. For example, in a house, the floor of a dining room may be wood, the floor of a living room may be nylon carpet, and the floor of a bedroom may be polyester carpet that is thicker than the nylon carpet. The mapping module may also determine and tag surface types for objects in the room, such as carpets or rugs.

The mapping module 500 further analyzes the visual data to determine the objects in the environment. Objects may include furniture, rugs, people, pets, and everyday household objects that the autonomous vacuum 100 may encounter on the ground, such as books, toys, and bags. Some objects may be barriers that define a room or obstacles that the autonomous vacuum 100 may need to remove, move, or go around, such as a pile of books. To identify the objects in the environment, the mapping module 500 predicts the plane of the ground in the environment using the visual data and removes the plane from the visual data to segment out an object in 3D. In some embodiments, the mapping module 500 uses an object database to determine what an object is. In other embodiments, the mapping module 500 retrieves and compares visual data retrieved from an external server to the segmented objects to determine what the object is and tag the object with a descriptor. In further embodiments, the mapping module 500 may use the pretrained object module 505, which may be neural network based, to detect and pixel-wise segment objects such as chairs, tables, books, shoes. For example, the mapping module 500 may tag each of 4 chairs around a table as "chair" and the table as "table" and may include unique identifiers for each object (i.e., "chair A" and "chair B"). In some embodiments, the mapping module 500 may also associate or tag an object with a barrier or warning. For example, the mapping module 500 may construct a virtual border around the top of a staircase in the map such that the autonomous vacuum 100 does not enter the virtual border to avoid falling down the stairs. As another example, the mapping module 500 may tag a baby with a warning that the baby is more fragile than other people in the environment.

The map includes three distinct levels for the objects in the environment: a long-term level, an intermediate level, and an immediate level. Each level may layer onto the layout of the environment to create the map of the entire environment. The long-term level contains a mapping of objects in the environment that are static. In some embodiments, an object may be considered static if the autonomous vacuum 100 has not detected that the object moved within the environment for a threshold amount of time (e.g., 10 days or more). In other embodiments, an object is static if the autonomous vacuum 100 never detects that the object moved. For example, in a bedroom, the bed may not move locations within the bedroom, so the bed would be part of the long-term level. The same may apply for a dresser, a nightstand, or an armoire. The long-term level also includes fixed components of the environment, such as walls, stairs, or the like.

The intermediate level contains a mapping of objects in the environment that are dynamic. These objects move regularly within the environment and may be objects that are usually moving, like a pet or child, or objects that move locations on a day-to-day basis, like chairs or bags. The mapping module 500 may assign objects to the intermediate level upon detecting that the objects move more often than a threshold amount of time. For example, the mapping module 500 may map chairs in a dining room to the intermediate level because the chairs move daily on average, but map the dining room table to the long-term level because the visual data has not shown that the dining room table has moved in more than 5 days. However, in some embodiments, the mapping module 500 does not use the intermediate level and only constructs the map using the long-term level and the immediate level.

The immediate level contains a mapping of objects within a threshold radius of the autonomous vacuum 100. The threshold radius may be set at a predetermined distance (i.e., 5 feet) or may be determined based on the objects the autonomous vacuum 100 can discern using the camera system 420 within a certain resolution given the amount of light in the environment. For example, the immediate level may contain objects in a wider vicinity around the autonomous vacuum 100 around noon, which is a bright time of day, than in the late evening, which may be darker if no indoor lights are on. In some embodiments, the immediate level includes any objects within a certain vicinity of the autonomous vacuum 100.

In other embodiments, the immediate level only includes objects within a certain vicinity that are moving, such as people or animals. For each person within the environment, the mapping module 500 may determine a fingerprint of the person to store in the fingerprint database 520. A fingerprint is a representation of a person and may include both audio and visual information, such as an image of the person's face (i.e., a face print), an outline of the person's body (i.e., a body print), a representation of the clothing the person is wearing, and a voice print describing aspects of the person's voice determined through voice print identification. The mapping module 500 may update a person's fingerprint in the fingerprint database 520 each time the autonomous vacuum 500 encounters the person to include more information describing the person's clothing, facial structure, voice, and any other identifying features. In another embodiment, when the mapping module 500 detects a person in the environment, the mapping module 500 creates a temporary fingerprint using the representation of the clothing the person is currently wearing and uses the temporary fingerprint to track and follow a person in case this person interacts with the autonomous vacuum 100, for example, by telling the autonomous vacuum 100 to "follow me." Embodiments using temporary fingerprints allow the autonomous vacuum 100 to track people in the environment even without visual data of their faces or other defining characteristics of their appearance.

The mapping module 500 updates the mapping of objects within these levels as it gathers more visual data about the environment over time. In some embodiments, the mapping module 500 only updates the long-term level and the intermediate level while the autonomous vacuum 100 is at the docking station, but updates immediate level as the autonomous vacuum 100 moves around the environment. For objects in the long-term level, the mapping module 500 may determine a probabilistic error value about the movement of the object indicating the chance that the object moved within the environment and store the probabilistic error value in the map database 515 in association with the object. For objects in the long-term map with a probabilistic error value over a threshold value, the mapping module 500 characterizes the object in the map and an area that the object has been located in the map as ambiguous.

In some embodiments, the (optional) object module 505 detects and segments various objects in the environment. Some examples of objects include tables, chairs, shoes, bags, cats, and dogs. In one embodiment, the object module 505 uses a pre-trained neural network to detect and segment objects. The neural network may be trained on a labeled set of data describing an environment and objects in the environment. The object module 505 also detects humans and any joint points on them, such as knees, hips, ankles, wrists, elbows, shoulders, and head. In one embodiment, the object module 505 determines these joint points via a pre-trained neural network system on a labeled dataset of humans with joint points.

In some embodiments, the mapping module 500 uses the optional 3D module 510 to create a 3D rendering of the map. The 3D module 510 uses visual data captured by stereo cameras on the autonomous vacuum 100 to create an estimated 3D rendering of a scene in the environment. In one embodiment, the 3D module 510 uses a neural network with an input of two left and right stereo images and learns to produce estimated 3D renderings of videos using the neural network. This estimated 3D rendering can then be used to find 3D renderings of joint points on humans as computed by the object module 505. In one embodiment, the estimated 3D rendering can then be used to predict the ground plane for the mapping module 500. To predict the ground plane, the 3D module 510 uses a known camera position of the stereo cameras (from the hardware and industrial design layout) to determine an expected height ground plane. The 3D module 510 uses all image points with estimated 3D coordinates at the expected height as the ground plane. In another embodiment, the 3D module 510 can use the estimated 3D rendering to estimate various other planes in the environment, such as walls. To estimate which image points are on a wall, the 3D module 510 estimates clusters of image points that are vertical (or any expected angle for other planes) and groups connected image points into a plane.

In some embodiments, the mapping module 500 passes the 3D rendering through a scene-classification neural network to determine a hierarchical classification of the home. For example, a top layer of the classification decomposes the environment into different room types (e.g., kitchen, living room, storage, bathroom, etc.). A second layer decomposes each room according to objects (e.g., television, sofa, and vase in the living room and bed, dresser, and lamps in the bedroom). The autonomous vacuum 100 may subsequently use the hierarchical model in conjunction with the 3D rendering to understand the environment when presented with tasks in the environment (e.g., "clean by the lamp"). It is noted that the map ultimately may be provided for rendering on a device (e.g, wirelessly or wired connected) with an associated screen, for example, a smartphone, tablet, laptop or desktop computer. Further, the map may be transmitted to a cloud service before being provided for rendering on a device with an associated screen.

The detection module 530 detects messes within the environment, which are indicated by pixels in real-time visual data that do not match the surface type. As the autonomous vacuum 100 moves around the environment, the camera system 420 collects a set of visual data about the environment and sends it to the detection module 530. From the visual data, the detection module 530 determines the surface type for an area of the environment, either by referencing the map or by comparing the collected visual data to stored visual data from a surface database. In some embodiments, the detection module 530 may remove or disregard objects other than the surface in order to focus on the visual data of the ground that may indicate a mess. The detection module 530 analyzes the surface in the visual data pixel-by-pixel for pixels that do not match the pixels of the surface type of the area. For areas with pixels that do not match the surface type, the detection module 530 segments out the area from the visual data using a binary mask and compares the segmented visual data to the long-term level of the map. In some embodiments, since the lighting when the segmented visual data was taken may be different from the lighting of the visual data in the map, the detection module 530 may normalize the segmented visual data for the lighting. For areas within the segmented visual data where the pixels do not match the map, the detection module 530 flags the area as containing a mess and sends the segmented visual data, along with the location of the area on the map, to the task module 540, which is described below. In some embodiments, the detection module 530 uses a neural network for detecting dust in the segmented visual data.

For each detected mess, the detection module 530 verifies that the surface type for the area of the mess matches the tagged surface type in the map for that area. In some embodiments, if the surface types do not match to within a confidence threshold, the detection module 530 re labels the surface in the map with the newly detected surface type. In other embodiments, the detection module 530 requests that the autonomous vacuum 100 collect more visual data to determine the surface type to determine the surface type of the area.

The detection module 530 may also detect messes and requested cleaning tasks via user interactions from a user in the environment. As the autonomous vacuum 100 moves around the environment, the sensor system 175 captures ambient audio and visual data using the microphone 430 and the camera system 420 that is sent to the detection module 530. In one embodiment, where the microphone 430 is an array of microphones 430, the detection module 430 may process audio data from each of the microphones 430 in conjunction with one another to generate one or more beamformed audio channels, each associated with a direction (or, in some embodiments, range of directions). In some embodiments, the detection module 530 may perform image processing functions on the visual data by zooming, panning, de-warping.

When the autonomous vacuum 100 encounters a person in the environment, the detection module 530 may use face detection and face recognition on visual data collected by the camera system 420 to identify the person and update the person's fingerprint in the fingerprint database 540. The detection module 530 may use voice print identification on a user speech input a person (or user) to match the user speech input to a fingerprint and move to that user to receive further instructions. Further, the detection module 530 may parse the user speech input for a hotword that indicates the user is requesting an action and process the user speech input to connect words to meanings and determine a cleaning task. In some embodiments, the detection module 530 also performs gesture recognition on the visual data to determine the cleaning task. For example, a user may ask the autonomous vacuum 100 to "clean up that mess" and point to a mess within the environment. The detection module 530 detects and processes this interaction to determine that a cleaning task has been requested and determines a location of the mess based on the user's gesture. To detect the location of the mess, the detection module 530 obtains visual data describing the user's hands and eyes from the object module 505 and obtains an estimated 3D rendering of the user's hands and eyes from 3D module 510 to create a virtual 3D ray. The detection module 530 intersects the virtual 3D ray with an estimate of the ground plane to determine the location the user is pointing to. The detection module 540 sends the cleaning task (and location of the mess) to the task module 540 to determine a mess type, surface type, actions to remove the mess, and cleaning settings, described below. The process of analyzing a user speech input is further described in relation to FIG. 15.

In some embodiments, the detection module 530 may apply a neural network to visual data of the environment to detect dirt in the environment. In particular, the detection module 530 may receive real-time visual data captured by the sensor system 175 (e.g., camera system and/or infrared system) and input the real-time visual data to the neural network. The neural network outputs a likelihood that the real-time visual data includes dirt, and may further output likelihoods that the real-time visual data includes dust and/or another mess type (e.g., a pile or spill) in some instances. For each of the outputs from the neural network, if the likelihood for any mess type is above a threshold, the detection module 530 flags the area as containing a mess (i.e., an area to be cleaned).

The detection module 530 may train the neural network on visual data of floors. In some embodiments, the detection module 530 may receive a first set of visual data from the sensor system 175 of an area in front of the autonomous vacuum 100 and a second set of visual data of the same area from behind the autonomous vacuum 100 after the autonomous vacuum 100 has cleaned the area. The autonomous vacuum 100 can capture the second set of visual data using cameras on the back of the autonomous vacuum or by turning around to capture the visual data using cameras on the front of the autonomous vacuum. The detection module 530 may label the first and second sets of visual data as "dirty" and "clean," respectively, and train the neural network on the labeled sets of visual data. The detection module 530 may repeat this process for a variety of areas in the environment to train the neural network for the particular environment or for a variety of surface and mess types in the environment.

In another embodiment, the detection module 530 may receive visual data of the environment as the autonomous vacuum 100 cleans the environment. The detection module 530 may pair the visual data to locations of the autonomous vacuum 100 determined by the mapping module 500 as the autonomous vacuum moves to clean. The detection module 530 estimates correspondence between the visual data to pair visual data of the same areas together based on the locations. The detection module 530 may compare the paired images in the RGB color space (or any suitable color or high-dimensional space that may be used to compute distance) to determine where the areas were clean or dirty and label the visual data as "clean" or "dirty" based on the comparison. Alternatively, the detection module 530 may compare the visual data to the map of the environment or to stored visual data for the surface type shown in the visual data. The detection module 530 may analyze the surface in the visual data pixel-by-pixel for pixels that do not match the pixels of the surface type of the area and label pixels that do not match as "dirty" and pixels that do match as "clean." The detection module 530 trains the neural network on the labeled visual data to detect dirt in the environment.

In another embodiment, the detection module 530 may receive an estimate of the ground plane for a current location in the environment from the 3D module 510. The detection module 530 predicts a texture of the floor of the environment based on the ground plane as the autonomous vacuum 100 moves around and labels visual data captured by the autonomous vacuum 100 with the floor texture predicted while the autonomous vacuum 100 moves around the environment. The detection module 530 trains the neural network on the labeled visual data to predict if a currently predicted floor texture maps to a previously predicted floor texture. The detection module 530 may then apply the neural network to real-time visual data and a currently predicted floor texture, and if the currently predicted floor texture does not map a previously predicted floor texture, the detection module 530 may determine that the area being traversed is dirty.

The task module 540 determines cleaning tasks for the autonomous vacuum 100 based on user interactions and detected messes in the environment. The task module 540 receives segmented visual data from the detection module 530 the location of the mess from the detection module 530. The task module 540 analyzes the segmented visual data to determine a mess type of the mess. Mess types describe the type and form of waste that comprises the mess and are used to determine what cleaning task the autonomous vacuum 100 should do to remove the mess. Examples of mess types include a stain, dust, a liquid spill, a solid spill, and a smudge and may be a result of liquid waste, solid waste, or a combination of liquid and solid waste.

The task module 540 retrieves the surface type for the location of the mess from the map database and matches the mess type and surface type to a cleaning task architecture that describes the actions for the autonomous vacuum 100 to take to remove the mess. In some embodiments, the task module 540 uses a previous cleaning task from the task database for the given mess type and surface type. In other embodiments, the task module 540 matches the mess type and surfaces to actions the autonomous vacuum 100 can take to remove the mess and creates a corresponding cleaning task architecture of an ordered list of actions. In some embodiments, the task module 540 stores a set of constraints that it uses to determine cleaning settings for the cleaning task. The set of constraints describe what cleaning settings cannot be used for each mess type and surface type and how much force to apply to clean the mess based on the surface type. Cleaning settings include height of the cleaning head 105 and rotation speed of the brush roller 135 and the use of solvent 160. For example, the set of constraints may indicate that the solvent 160 can be used on wood and tile, but not on carpet, and the height of the cleaning head 105 must be at no more than 3 centimeters off the ground for cleaning stains in the carpet but at least 5 centimeters and no more than 7 centimeters off the ground to clean solid waste spills on the carpet.

Based on the determined actions and the cleaning settings for the mess, the task module 540 adds a cleaning task for each mess to task list database 550. The task list database 550 stores the cleaning tasks in a task list. The task list database 550 may associate each cleaning task with a mess type, a location in the environment, a surface type, a cleaning task architecture, and cleaning settings. For example, the first task on the task list in the task list database 550 may be a milk spill on tile in a kitchen, which the autonomous vacuum 100 may clean using solvent 160 and the brush roller 135. The cleaning tasks may be associated with a priority ranking that indicates how to order the cleaning tasks in the task list. In some embodiments, the priority ranking is set by a user via a client device 410 or is automatically determined by the autonomous vacuum 100 based on the size of the mess, the mess type, or the location of the mess. For example, the autonomous vacuum 100 may prioritize cleaning tasks in heavily trafficked areas of the environment (i.e., the living room of a house over the laundry room) or the user may rank messes with liquid waste with a higher priority ranking than messes with solid waste.

In some embodiments, the task module 540 adds cleaning tasks to the task list based on cleaning settings entered by the user. The cleaning settings may indicate which cleaning tasks the user prefers the autonomous vacuum 100 to complete on a regular basis or after a threshold amount of time has passed without a mess resulting in that cleaning task occurring. For example, the task module 540 may add a carpet deep cleaning task to the task list once a month and a hard wood polishing task to the task list if the hard wood has not been polished in more than some predetermined time period, e.g., 60 days.

The task module 540 may add additional tasks to the task list if the autonomous vacuum 100 completes all cleaning tasks on the task list. Additional tasks include charging at the docking station 185, processing visual data for the map via the mapping module 500 at the docking station 185, which may be done in conjunction with charging, and moving around the environment to gather more sensor data for detecting messes and mapping. The task module 540 may decide which additional task to add to the task list based on the amount of charge the battery 180 has or user preferences entered via a client device 410.

The task module 540 also determines when the autonomous vacuum 100 needs to be charged. If the task module 540 receives an indication from the battery 180 that the battery is low on power, the task module adds a charging task to the task list in the task list database 550. The charging task indicates that the autonomous vacuum 100 should navigate back to the docking station 185 and dock for charging. In some embodiments, the task module 540 may associate the charging task with a high priority ranking and move the charging task to the top of the task list. In other embodiments, the task module 540 may calculate how much power is required to complete each of the other cleaning tasks on the task list and allow the autonomous vacuum 100 to complete some of the cleaning tasks before returning to the docking station 185 to charge. The charging process is further described in relation to FIG. 12.

The navigation module 560 determines the location of the autonomous vacuum 100 in the environment. Using real-time sensor data from the sensor system 175, the navigation module 560 matches the visual data of the sensor data to the long-term level of the map to localize the autonomous vacuum 100. In some embodiments, the navigation module 560 uses a computer vision algorithm to match the visual data to the long-term level. The navigation module 560 sends information describing the location of the autonomous vacuum 100 to other modules within the storage medium 460. For example, the detection module 530 may use the location of the autonomous vacuum 100 to determine the location of a detected mess.

The navigation module 560 uses the immediate level of the map to determine how to navigate the environment to execute cleaning tasks on the task list. The immediate level describes the locations of objects within a certain vicinity of the autonomous vacuum 100, such as within the field of view of each camera in the camera system 420. These objects may pose as obstacles for the autonomous vacuum 100, which may move around the objects or move the objects out of its way. The navigation module interlays the immediate level of the map with the long-term level to determine viable directions of movement for the autonomous vacuum 100 based on where objects are not located. The navigation module 560 receives the first cleaning task in the task list database 550, which includes a location of the mess associated with the cleaning task. Based on the location determined from localization and the objects in the immediate level, the navigation module 100 determines a path to the location of the mess. In some embodiments, the navigation module 560 updates the path if objects in the environment move while the autonomous vacuum 100 is in transit to the mess. Further, the navigation module 560 may set the path to avoid fragile objects in the immediate level (e.g., a flower vase or expensive rug).

The logic module 570 determines instructions for the processor 470 to control the autonomous vacuum 100 based on the map in the map database 515, the task list database 550, and the path and location of the autonomous vacuum 100 determined by the navigation module 560. The instructions describe what each physical feature of the autonomous vacuum 100 should do to navigate an environment and execute tasks on the task list. Some of the physical features of the autonomous vacuum 100 include the brush motor 140, the side brush motor 150, the solvent pump 175, the actuator assembly 125, the vacuum pump 115, and the wheels 210. The logic module 570 also controls how and when the sensor system 175 collects sensor data in the environment. For example, logic module 570 may receive the task list from the task list database 550 and create instructions on how to navigate to handle the first cleaning task on the task list based on the path determined by the navigation module, such as rotating the wheels 210 or turning the autonomous vacuum 100. The logic module may update the instructions if the navigation module 560 updates the path as objects in the environment moved. Once the autonomous vacuum 100 has reached the mess associated with the cleaning task, the logic module 570 may generate instructions for executing the cleaning task. These instructions may dictate for the actuator assembly 125 to adjust the cleaning head height, the vacuum pump 115 to turn on, the brush roller 135 and/or side brush roller 145 to rotate at certain speeds, and the solvent pump 120 to dispense an amount of solvent 160, among other actions for cleaning. The logic module 570 may remove the cleaning task from the task list once the cleaning task has been completed and generate new instructions for the next cleaning task on the task list.

Further, the logic module 570 generates instructions for the processor 470 to execute the flowcharts and behavior tree of FIGS. 12-15. The instructions may include internal instructions, such as when to tick a clock node or gather sensor data, or external instructions, such as controlling the autonomous vacuum 100 to execute a cleaning task to remove a mess. The logic module 570 may retrieve data describing the map of the environment stored in the map database 515, fingerprint database 520, and task list database 550, or from other modules in the storage medium 460, to determine these instructions. The logic module 570 may also receive alerts/indications from other components of the autonomous vacuum 100 or from an external client device 410 that it uses to generate instructions for the processor 470.

It is appreciated that although FIG. 5 illustrates a number of modules according to one embodiment, the precise modules and resulting processes may vary in different embodiments. For example, in some embodiments, the storage medium 460 may include a cleaning module that controls the autonomous vacuum 100 to complete cleaning tasks. The cleaning module may control functions of the cleaning head 105, such as controlling the brush motor 140 and the side brush motor 150 to change the speed of the brush roller 135 and side brush roller 145, respectively. The cleaning module may also control a speed of the autonomous vacuum 100 and speed of the solvent pump 120. The cleaning module may also control how the autonomous vacuum 105 moves to clean up a mess and ingest waste 155 and move the autonomous vacuum 105 to retrieve any waste 155 that may have moved during execution of the cleaning task.

Camera System

Figure 6:
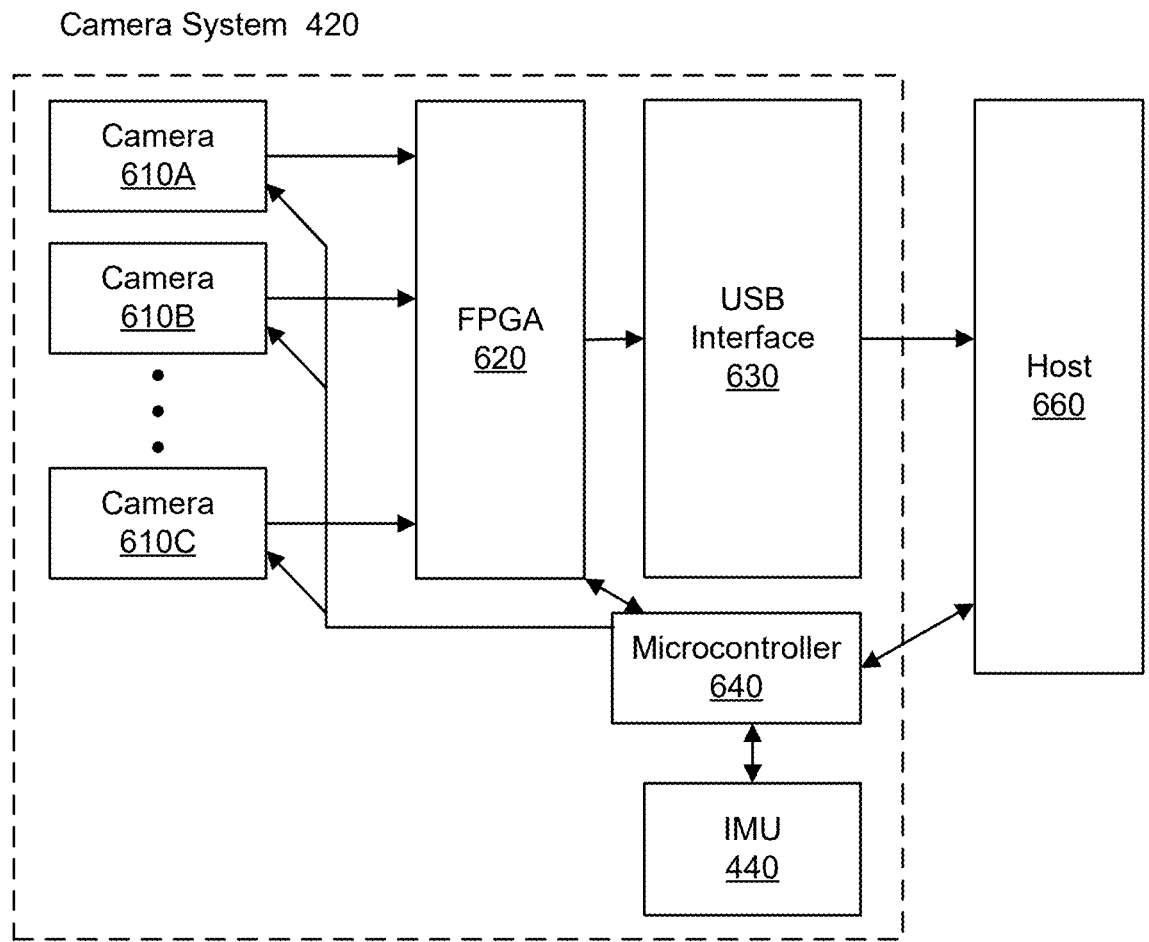
FIG. 6 illustrates a block diagram of a camera system, according to one example embodiment.

FIG. 6 illustrates a block diagram of a camera system 420, according to one embodiment. To improve accuracy of the visual-inertial data gathered by the sensor system 175, the camera system 420 synchronizes a plurality of cameras via a common clock and an IMU 550 via a common clock. In some embodiments, the camera system 420 includes more than the three cameras 610 shown in FIG. 6. In other embodiments, the camera system 420 only includes two cameras 610. The cameras 610 are connected to a field programmable gate array 620 (or FPGA). A microcontroller 640 coordinates the setup and timing of the cameras 610, FPGA 620, and inertial measurement unit 650. The camera system 420 communicates with a host 660 via a USB interface 630 connected to the FPGA 620. The camera system 420 may gather visual-inertial data at set time steps, and, in some embodiments, may handle frame drops by dropping sampled visual-inertial data if the host 660 has not downloaded the visual-inertial data before the camera system 620 gathers new visual-inertial data at a new time. The sensor system 175 may use the visual-inertial data from the camera system 620 for localizing the autonomous vacuum 100 in the environment based on the map.

In some embodiments, the camera system includes a photodiode for detecting lighting and LED lights around each camera 610 for illuminating the environment. Because mapping is difficult in low light, the camera system 420 may illuminate the LED lights around one or more of the cameras 610 based on where the autonomous vacuum 100 is moving to improving the mapping capabilities.

In further embodiments, each camera 610 includes a polarizing filter to remove excess light from shiny floors or glass in the environment. Each polarizing filter may be positioned to remove light in the horizontal direction or may be attached to a motor for rotating the polarizing filter to remove different directions of light. For this, the camera system 420 may include photodiodes for detecting light and use data from the photodiodes to determine rotations for each polarizing filter.

Figure 7:
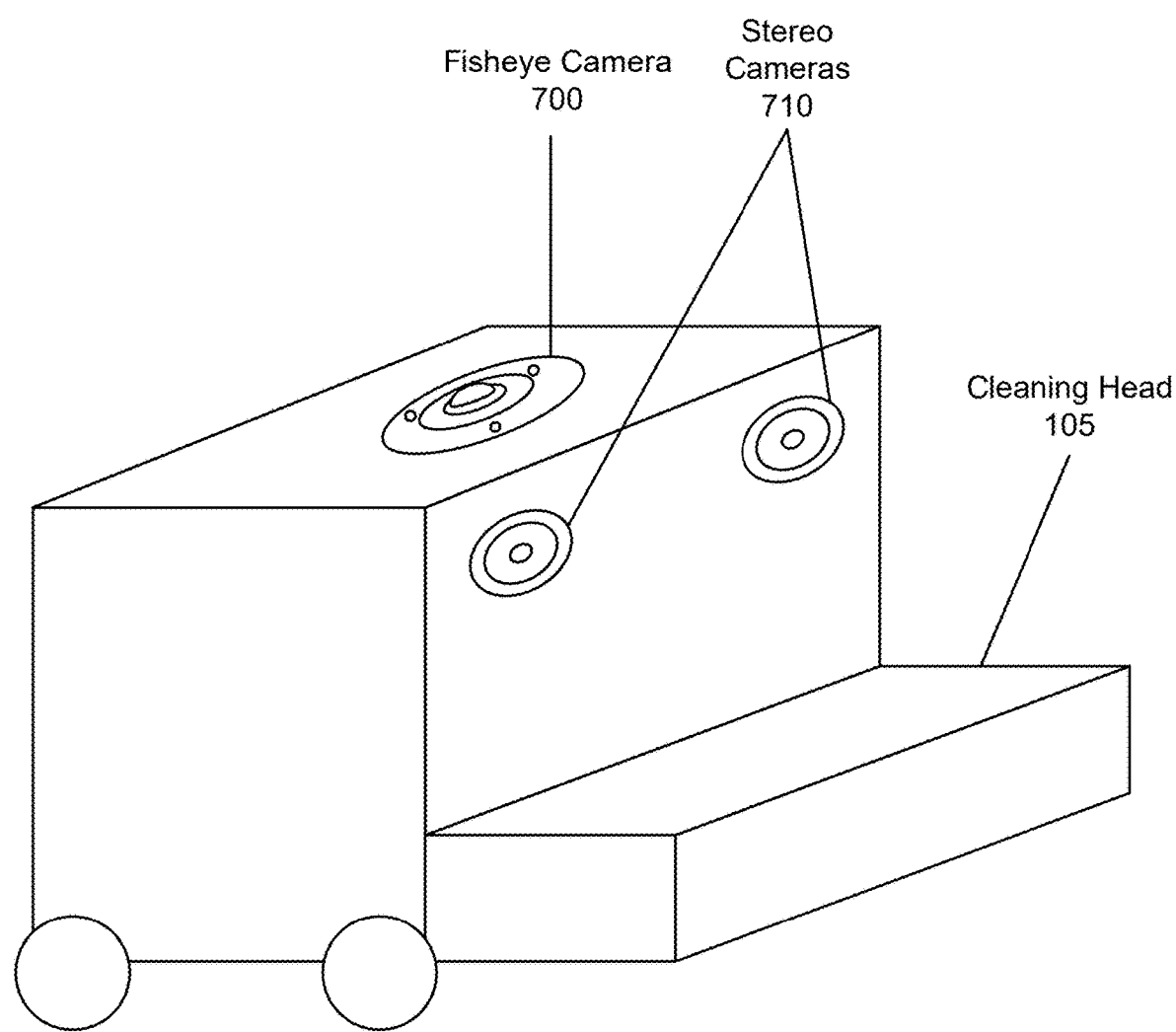
FIG. 7 illustrates a positioning of cameras on the autonomous vacuum, according to one example embodiment.

FIG. 7 illustrates a positioning of cameras 610 on the autonomous vacuum 100, according to one embodiment. In this embodiment, the autonomous vacuum 100 includes a fisheye camera 700 on the top of the autonomous vacuum 100 and stereo cameras 710 on the front and back of the autonomous vacuum 100. The fisheye camera may be used to detect the position of the autonomous vacuum 100 in the environment based on localization using visual data describing the ceiling of the environment. The stereo cameras 710 may be used to gather visual data from in front of and behind the autonomous vacuum 100. In some embodiments, the stereo cameras 710 may also be used to detect the position of the autonomous vacuum 100 in the environment based on key points determined by the mapping module 500. In other embodiments, autonomous vacuum 100 may have more cameras 610 on the sides, or may use different types of cameras than the ones shown in the figure.

Perception

Figure 8:
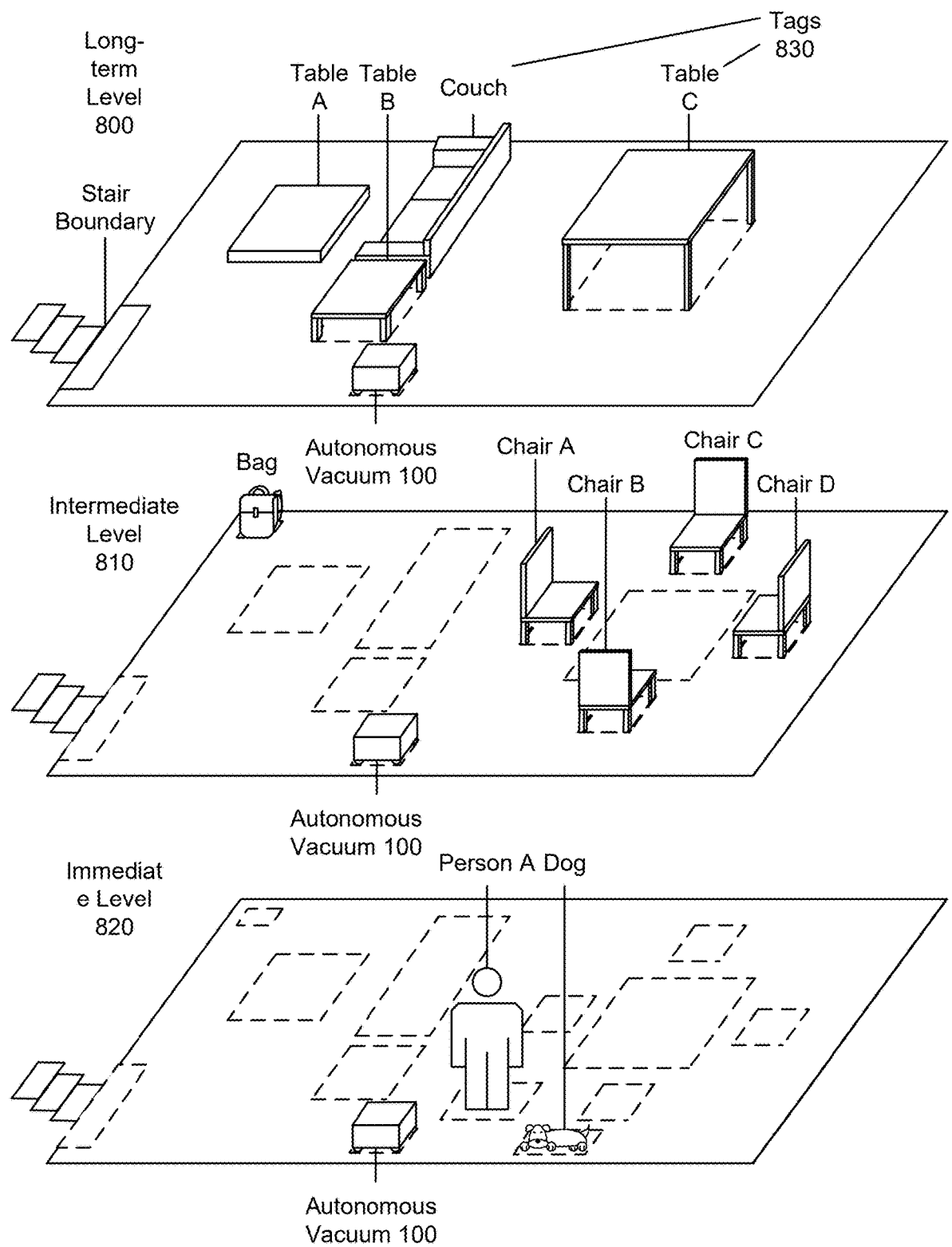
FIG. 8 illustrates levels of a map used by the autonomous vacuum, according to one example embodiment.

FIG. 8 illustrates levels of a map used by the autonomous vacuum 100, according to one example embodiment. The levels include a long-term level 800, an intermediate level 810, and an immediate level 820. Each level contains mappings of objects in the environment that are tagged 830 with labels describing the objects. The long-term level 800 contains objects that are static or do not move often in the environment, and in some embodiments, the long-term level includes walls in the environment. The intermediate level 810 contains objects that change position within the environment often. In some embodiments, the mapping module 500 determines a level for an object based on how much time has passed since the object moved. For example, objects that have not moved in 10 days or more may be mapped to the long-term level 800, while other objects are mapped to the intermediate level. In this embodiment, the immediate level 820 only includes objects within a certain vicinity of the autonomous vacuum 100 that are consistently dynamic, like living beings such as a person or pet, but in other embodiments, the immediate level includes any object within a certain vicinity of the autonomous vacuum 100. This embodiment is further described in relation to FIG. 9.

Figure 9:
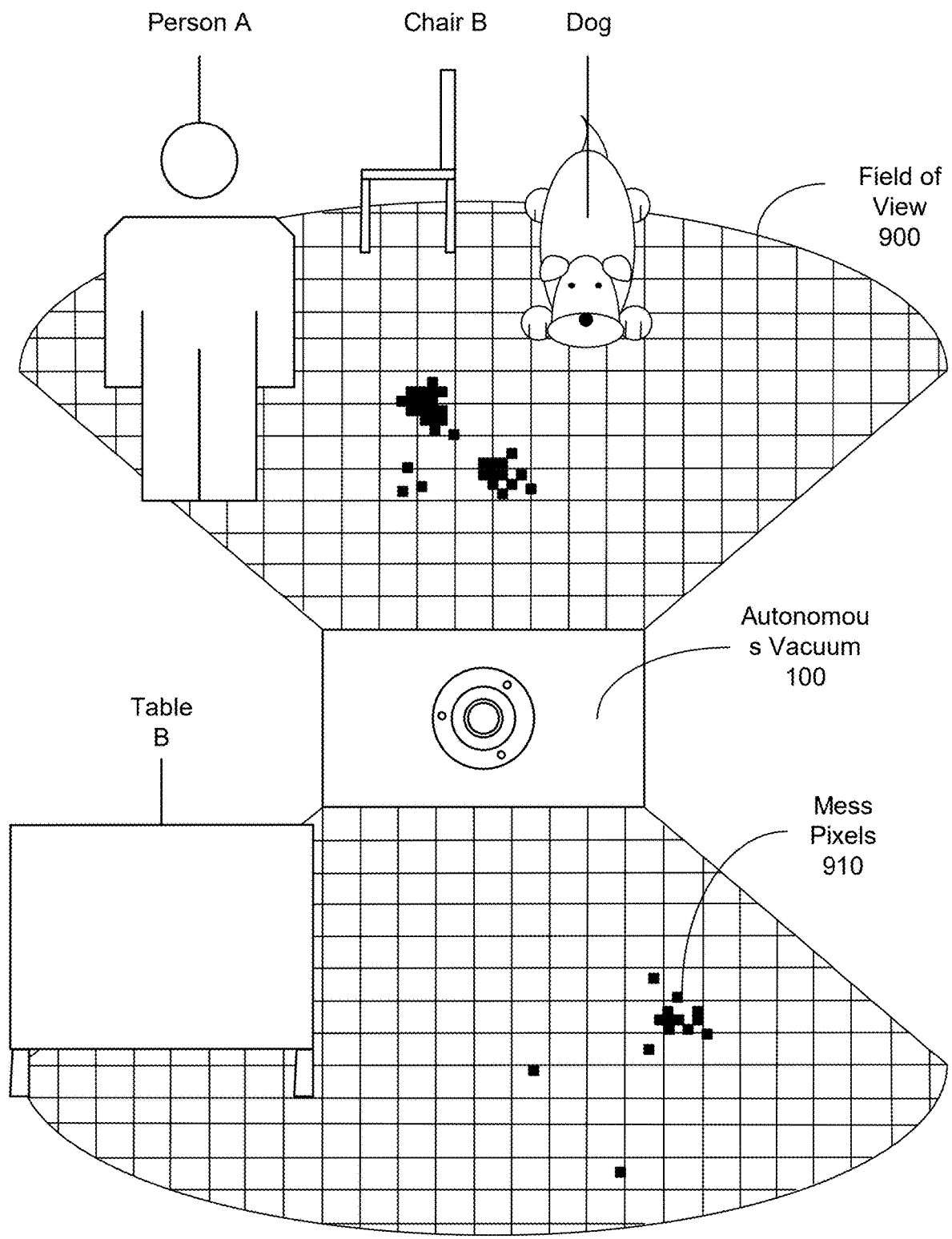
FIG. 9 illustrates an immediate mapping by the autonomous vacuum, according to one example embodiment.

FIG. 9 illustrates an immediate level 820 of the autonomous vacuum 100, according to one embodiment. In this embodiment, the only objects included in the immediate level 820 are within the field of view 900 of the cameras on the front and back of the autonomous vacuum 100, such as "Person A," "Chair B," "Dog," and "Table B." The autonomous vacuum 100 analyzes the pixels from visual data in the field of view 900 to find mess pixels 910 that do not match the expectations for the area of the environment. Based on these mess pixels 910, the autonomous vacuum 100 may determine that a mess exists and add a cleaning task to the task list to address the mess.

Figure 10A:
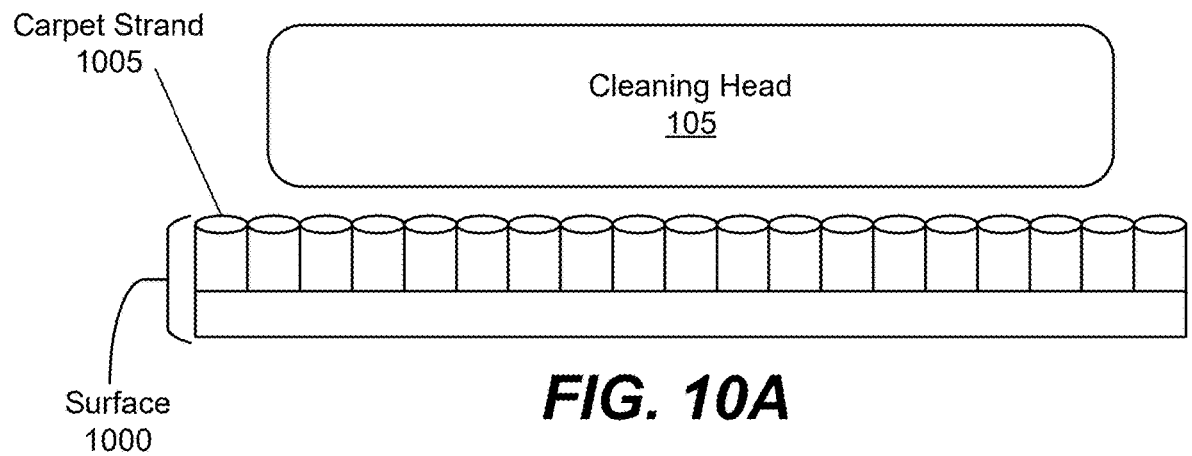
FIGS. 10A-10C illustrate cleaning head positions, according to one example embodiment.
Figure 10B:
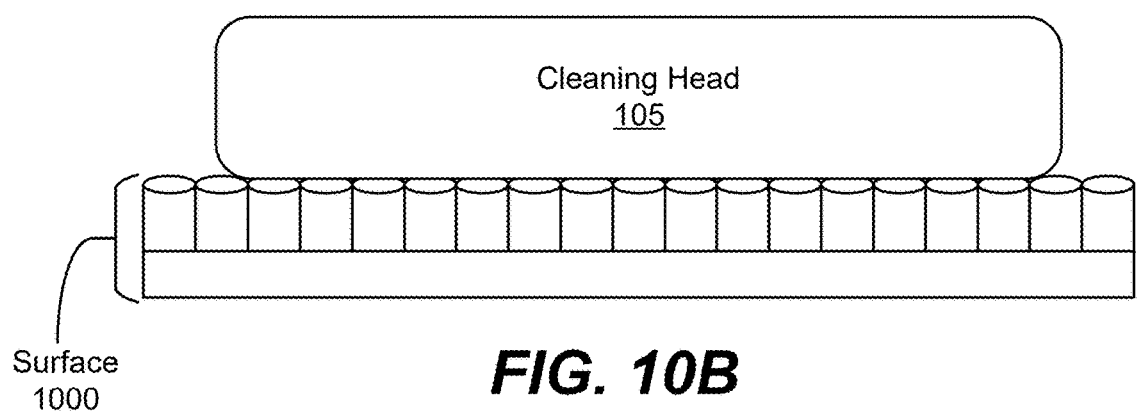
Figure 10C:
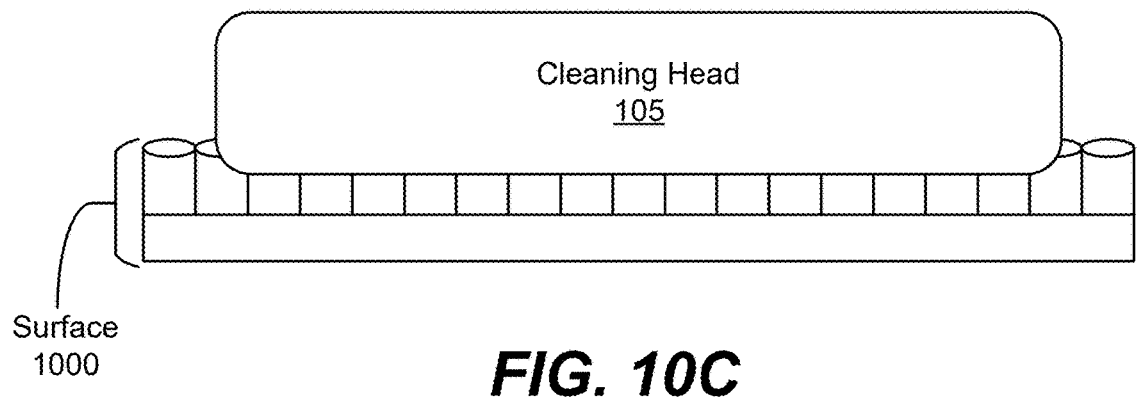

FIGS. 10A-10C illustrate cleaning head 105 positions, according to one embodiment. The autonomous vacuum 100 may position the cleaning head 105 according to a surface type of the surface 1000. Each surface type may be associated with a different height for the cleaning head 105 to properly clean a mess on that surface 1000. For example, the cleaning head 105 may need to be positioned exactly against carpet to clean it properly, while it should be just above wood to clean with wood without scratching the wood. In addition, carpet is thicker than wood, so the height may change depending on the thickness of the surface 1000. In the embodiment shown by FIGS. 10A-10C, the surface 1000 is a carpet composed of carpet strands 1005. FIG. 10A illustrates the cleaning head 105 positioned too high above the surface 1000 for proper cleaning. In this position, the cleaning head 105 may not be able to contact the mess and could leave waste 155 behind after cleaning. FIG. 10B illustrates the cleaning head 105 positioned at the proper height for cleaning the surface 1000, and FIG. 10C illustrates the cleaning head 105 positioned too low on the surface 1000 for proper cleaning, which could result in the autonomous vacuum 100 merely pushing waste 155 further into the surface 1000 rather than removing the waste 155 or becoming stuck due to high resistance to motion from the waste.

Example Waste Bag

To account for all types of waste that the autonomous vacuum 100 may encounter while cleaning, FIGS. 11A-11E illustrates waste bags (also referred to as a waste collection bag) that employ an absorbent for congealing liquid waste in the waste bag. The absorbent may be distributed in the waste bag in various ways to create a semi-solid when mixed with liquid waste. The absorbent may have a particle size larger than the pore of the waste bag such that the waste bag may still filter air out while retaining waste inside of the waste bag. In some embodiments, the absorbent is sodium polyacrylate, which has the ability to absorb 300-800 times its mass in water, depending upon its purity.

The waste bag may be composed of filtering material that is porous or nonporous. The waste bag may be placed in a cavity of the autonomous vacuum 100, such as in the waste volume 350B or the waste container 200, which may include a hinged side that opens to access the cavity and waste bag. The waste bag may be removed and disposed of when fill of waste or may be cleaned out and reused. Further, in some embodiments, the waste bag may be replaced by a structured waste enclosure that is within or is the cavity of the autonomous vacuum 100.

The waste bag may include the absorbent in various fashions to ensure that liquid waste is congealed inside of the waste bag, preventing tearing or other issues with the waste bag. In some embodiments, the absorbent is distributed throughout the waste bag. In other embodiments, the absorbent may be incorporated into the plies of the waste bag. The absorbent may be layered between nonwoven polypropylene and polyethylene, or any other flexible filtration materials used for the waste bag.

Figure 11A:
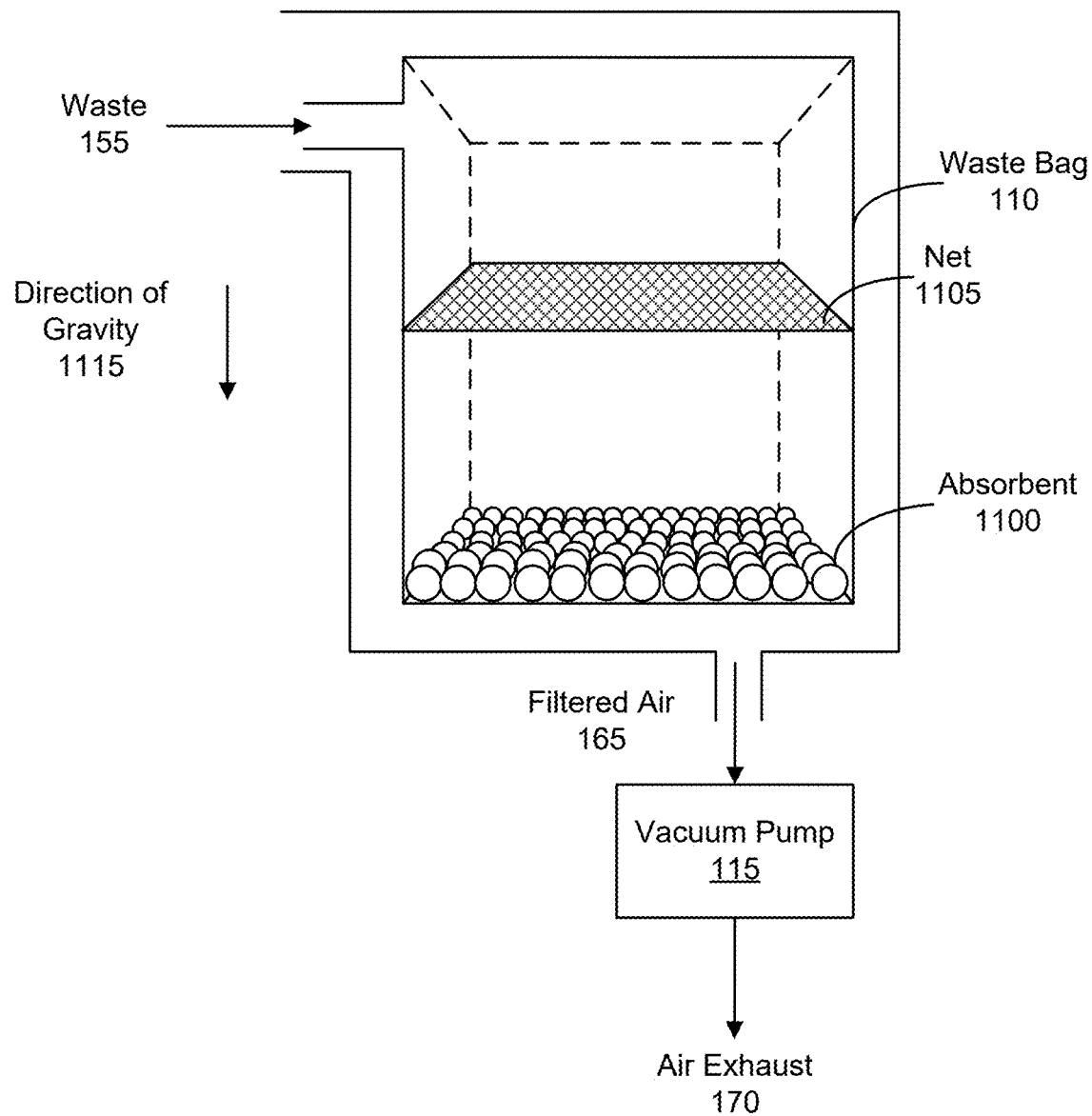
FIG. 11A illustrates a waste bag with a liquid-solid filter system, according to one example embodiment.

FIG. 11A illustrates a waste bag 110 with a liquid-solid filter system, according to one embodiment. As waste 155 from a mess enters the waste bag 110, a net 1105 captures solid waste moving in the direction of gravity 1115 while allowing liquid waste to fall through to the bottom of the waste bag 110 where the absorbent 1100 is. The absorbent 1100 may congeal with the liquid waste to form a semi solid so that the vacuum pump 115 only pulls filtered air 165 out from the waste bag 110 that is expelled as air exhaust 170.

Figure 11B:
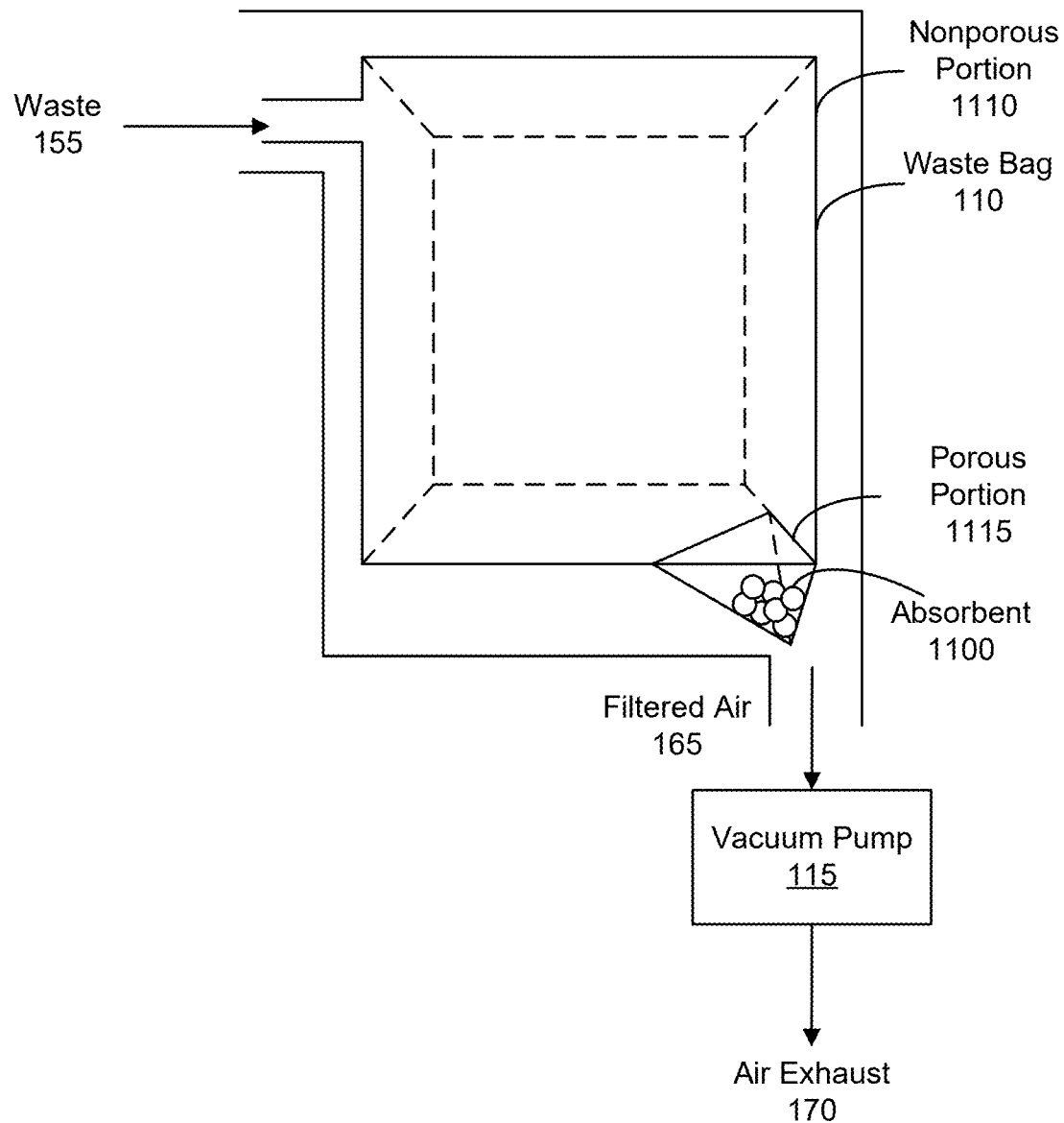
FIG. 11B illustrates a waste bag with porous and nonporous portions, according to one example embodiment.

FIG. 11B illustrates a waste bag 110 with porous and nonporous portions, according to one example embodiment. Waste 155 falls to the bottom of the bag from upon entering the autonomous vacuum 100. As the vacuum pump works to pull filtered air 165 out of the waste bag 110 through the porous portion 1115, the liquid waste can move to the porous portion 1115 where the absorbent 1100 is located while the solid waste is captured by the nonporous portion 1110. The absorbent 1100 may congeal with the liquid waste to form a semi solid so that the vacuum pump 115 only pulls filtered air, and not the absorbent or the liquid waste, out from the porous portion 1115 of the waste bag 110 and expels the filtered air 165 as air exhaust 170.

Figure 11C:
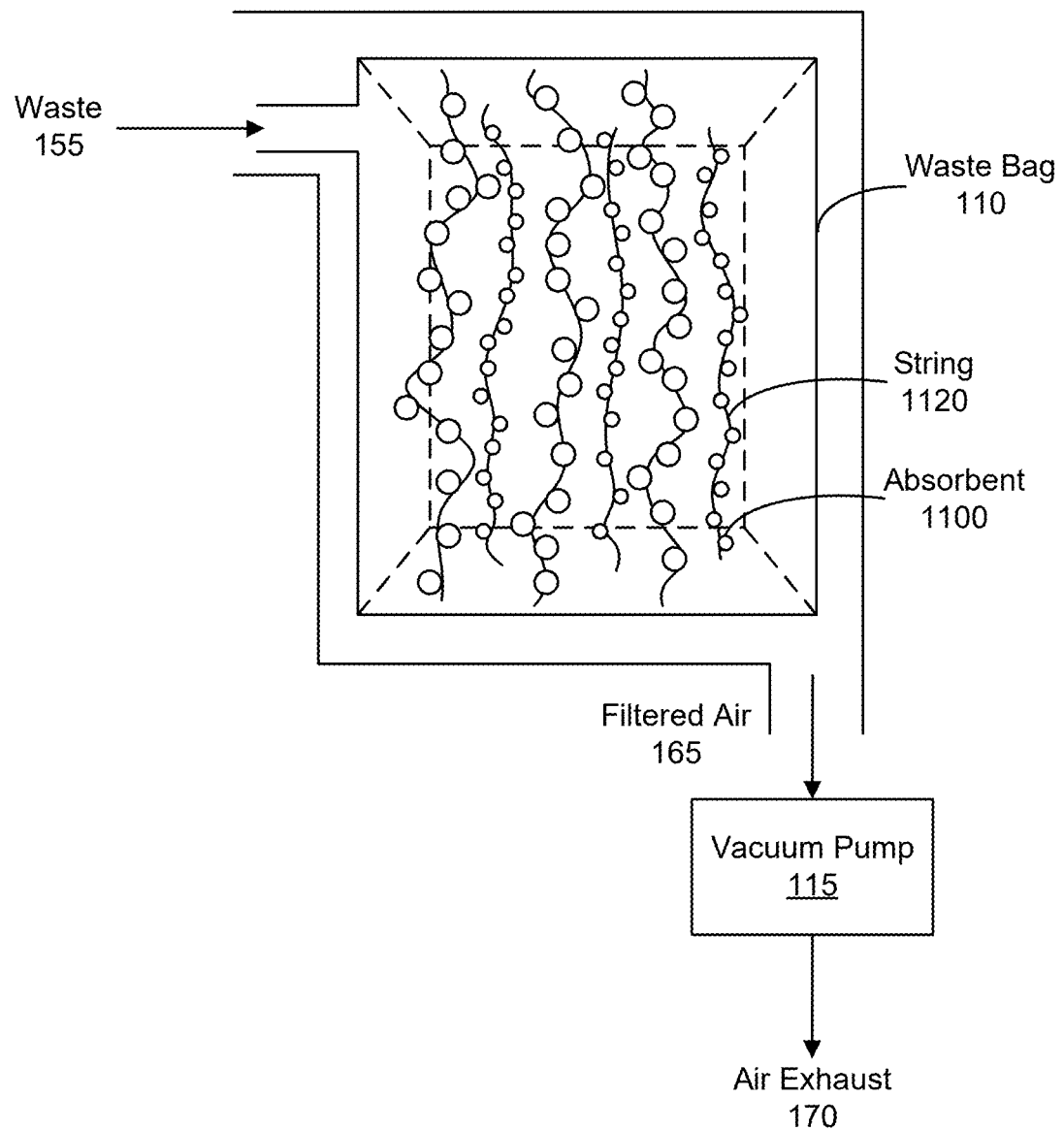
FIG. 11C illustrates a waste bag interlaced with absorbent strings, according to one example embodiment.

FIG. 11C illustrates a waste bag 110 interlaced with absorbent strings, according to one example embodiment. The waste bag is composed of a porous membrane. In some embodiments, the absorbent 1100 is made into strings 1120 that traverse the waste bag 110 from top to bottom. In other embodiments, the strings 1120 are cloth, paper, or any other flexible material and are coated with the absorbent 1100. This coating may be one layer of absorbent 1100 distributed across the strings 1120 or groupings of the absorbent 1100 at various points on the strings, as depicted in FIG. 11C. As waste 155 enters the waste bag 110, the waste intermingles with the strings 1120 such that the absorbent may interact with liquid waste to congeal as it moves through the waste bag 110. The vacuum pump 115 may pull out filtered air 165 without removing the congealed liquid waste and expel the filtered air 165 as air exhaust 170.

Figure 11D:
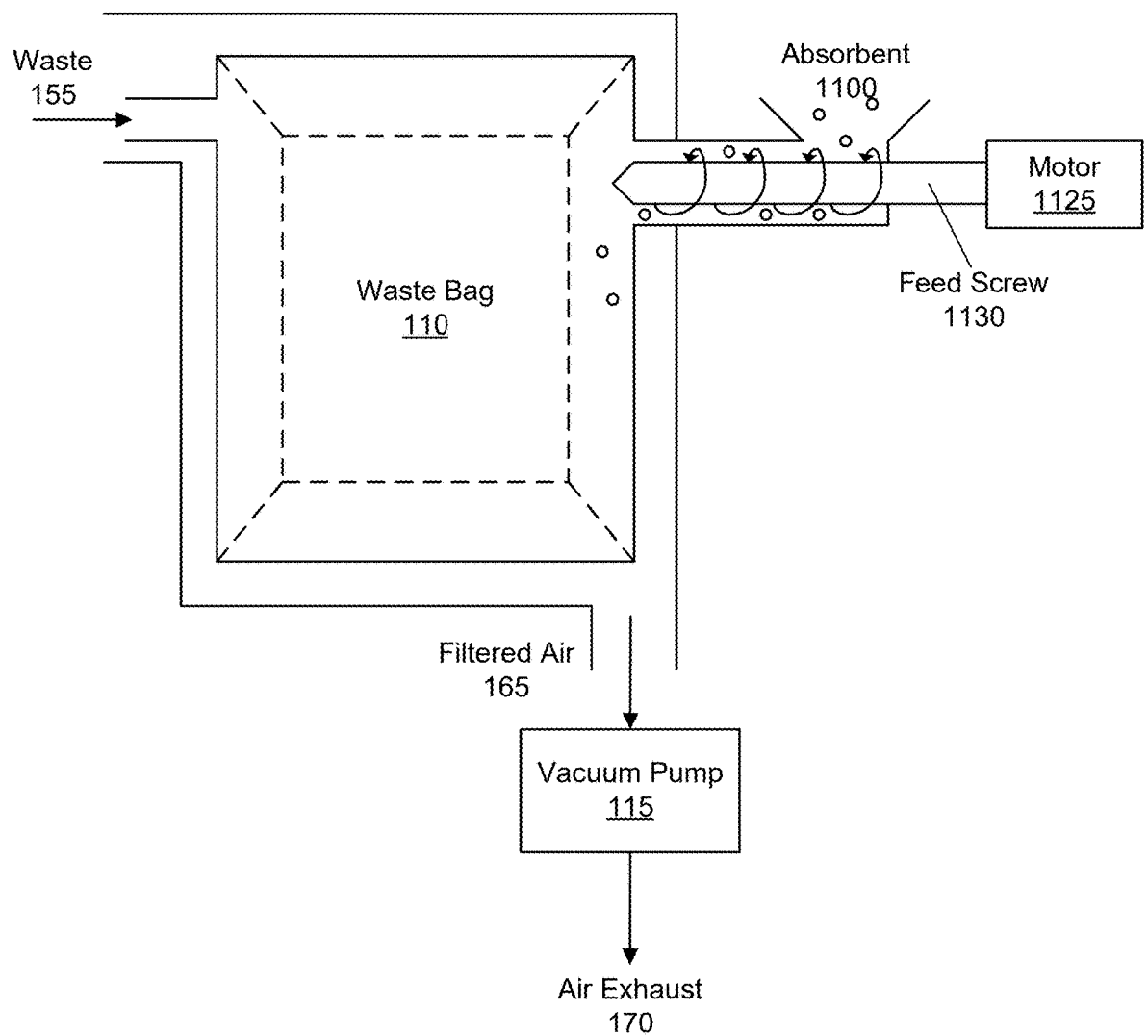
FIG. 11D illustrates a waste bag with an absorbent dispensing system, according to one example embodiment.

FIG. 11D illustrates a waste bag 110 with an absorbent dispensing system, according to one example embodiment. In this embodiment, a motor 1125 expels absorbent 1100 around a feed screw 1130 into the waste bag 110 as waste 155 enters the waste bag 110. In some embodiments the motor may be attached to a processor that analyzes sensor data about waste 155 entering the waste bag 110 to determine how much absorbent to expel. The motor 1125 may be activated when the autonomous vacuum 100 is cleaning or only when the autonomous vacuum 100 detects liquid waste. In some embodiments, the autonomous vacuum 100 detects the amount of liquid waste such that the motor 1125 activates to express a specific amount of absorbent 100 proportional to the waste 155. The liquid waste can then congeal with the absorbent 1100 so only filtered air 165 is pumped out of the waste bag by the vacuum pump 115 into air exhaust 170.

Figure 11E:
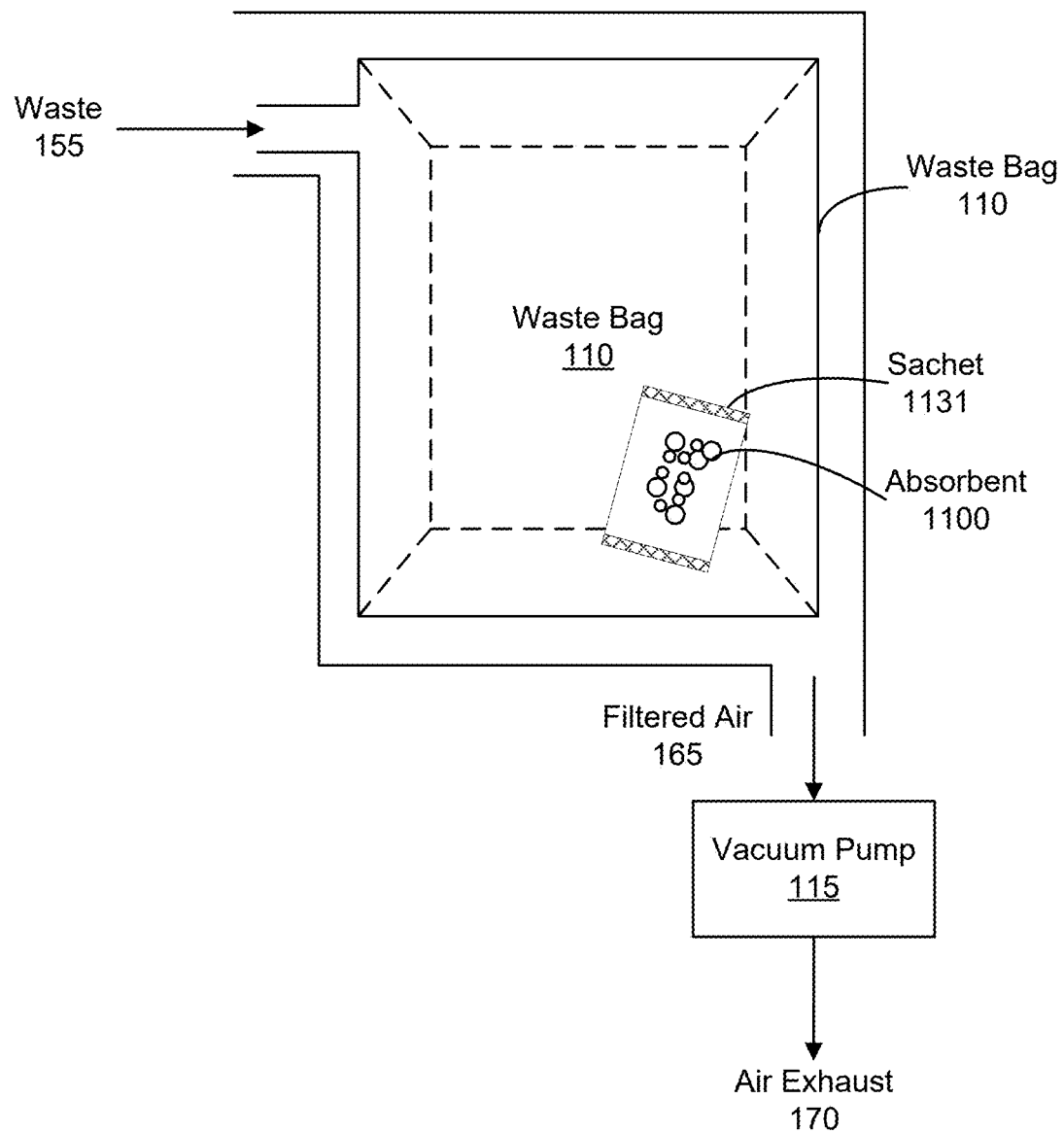
FIG. 11E illustrates an enclosed sachet in a waste bag enclosure, according to one embodiment.

FIG. 11E illustrates an enclosed sachet in a waste bag 110, according to one embodiment. The waste bag is composed of a porous membrane. The sachet 1131 is composed of dissolvable material and filled with the absorbent 1100. The exterior of the sachet 1131 dissolves to expose the absorbent material when exposed to liquid. The absorbent material "captures" the liquid waste that enters the waste bag 110 and begins to form a congealed mass of the liquid waste that the absorbent contacts.

The sachet 1131 may be tethered or otherwise attached to a portion of the waste bag 110 from which material (e.g., liquid) enters (e.g., lower portion of the bag). Alternately, the sachet 1131 may may sit in the waste bag 110 without being attached to the waste bag 110, and hence, may settle along a lower portion of the bag, which is where liquid may drop to as it initially enters the bag.

As waste 155 enters the waste bag 110, the waste 155 intermingles with the sachet 1131. If the waste includes liquid waste, the sachet 1131 dissolves upon coming in contact with the liquid waste, which is absorbed by the absorbent 1100 and turned into congealed liquid waste. The vacuum pump 115 may pull out filtered air 165 without removing the congealed liquid waste and expel the filtered air 165 as air exhaust 170. In some embodiments, the waste bag 110 may include more than one sachet 1131 attached to different sections of an inner portion of the waste bag 110. It is noted that once the absorbent material within the sachet is exposed, it may allow for continued congealing of liquid waste until a particular density or ratio threshold is reached between the chemical priorities of the absorbant and the liquid waste is reached at which point no further congealing may occur. Hence, the bag may allow for multiple periodic uses of picking up liquid waste before having to be discarded and thereafter replaced.

Example Waste Bag Enclosure (or Cavity)

Figure 11F:
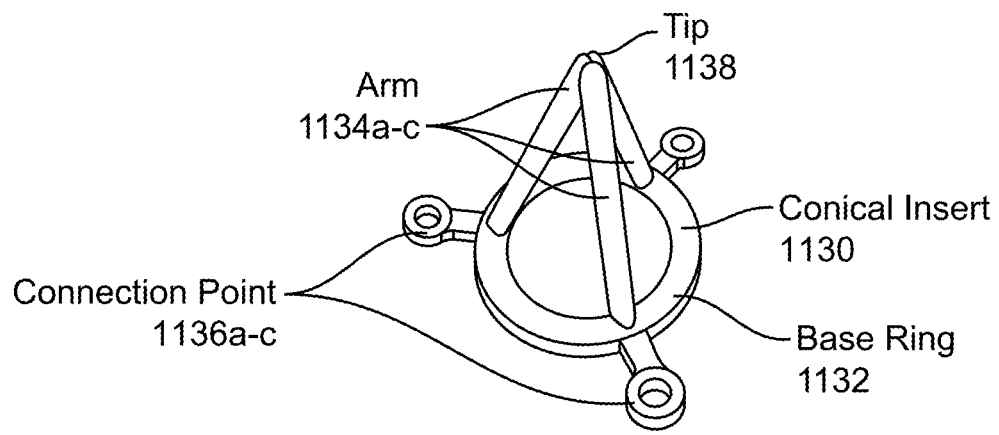
FIG. 11F illustrates a conical insert for use with a waste bag, according to one embodiment.

FIG. 11F illustrates a conical insert 1130 for use with a waste bag 110, according to one example embodiment. The conical insert 1130 includes a base ring 1132 and three protruding arms 1134a-c. Each arm is a rigid member (e.g., a hardened plastic or metal). A first end of the arm 1134a-c connects equidistance from each other along a circumference of the base ring 1132. A second end for each arm 1134a-c is opposite the first end of each arm 1134a-c and converges at a tip 1138. The base ring 1132 may include one or more connection points 1136a-c. An opening formed by the base ring optionally may be covered with a mesh (or screen) that may prevent certain particles from entering the air outlet. The connection points 1136a-c may be used to fasten to a surface such that the base ring 1132 is positioned around an opening of an air outlet of the autonomous vacuum 100. The tip 1138 protrudes outward from the air outlet and the overall rigidity of the conical insert 1130 prevents collapse of a malleable vacuum bag from blocking the air outlet.

Figure 11G:
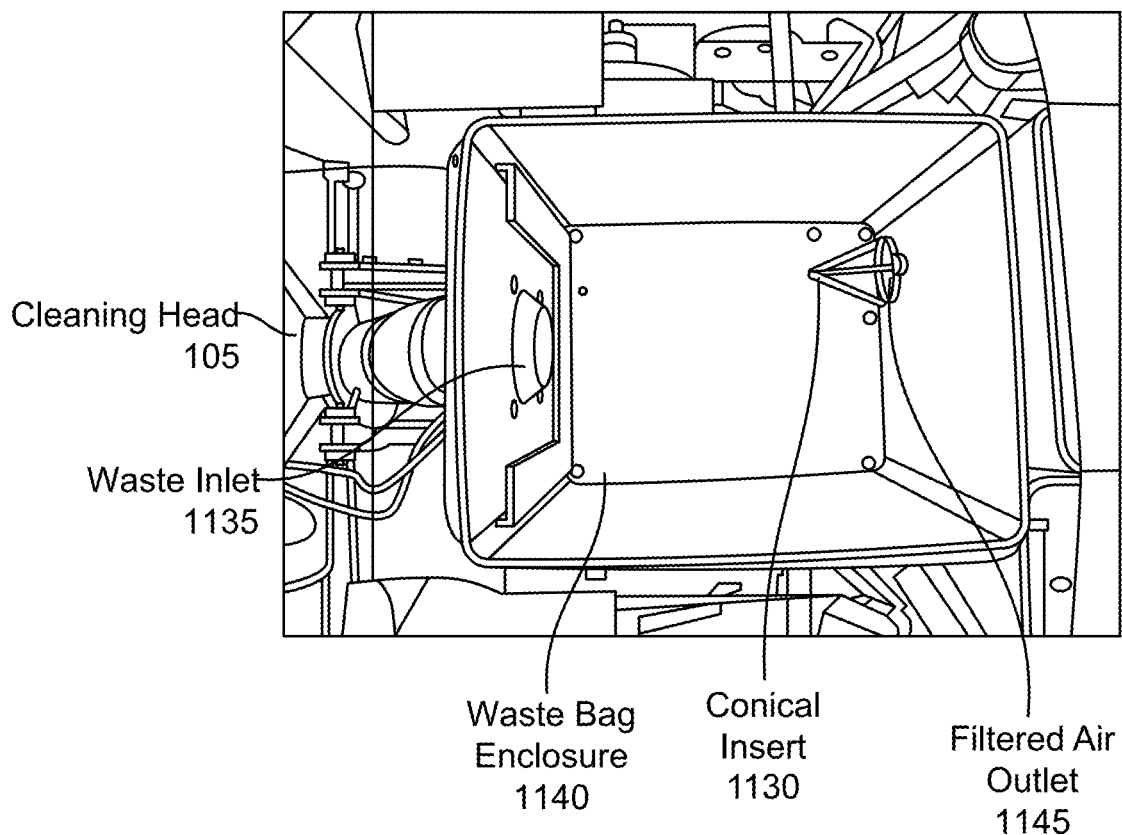
FIG. 11G illustrates a conical insert in a waste bag enclosure, according to one embodiment.

FIG. 11G illustrates a conical insert 1130 in a waste bag enclosure 1140, according to one example embodiment. The waste bag enclosure 1140 is the portion of the autonomous vacuum 100 the waste bag is contained within and includes a waste inlet 1135 from the cleaning head 105 that waste 155 enters the waste bag 110 through and a filtered air outlet 1145 that the vacuum pump 115 pulls filtered air 165 through. By placing the conical insert in front of the filtered air outlet 1145, as shown in FIG. 11G where the connection points 1135a-c attach to a wall of the inside surface and the base ring 1132 surrounds the air outlet, the conical insert 1130 rigidity keeps the waste bag 110, which is malleable, from being pulled into the filtered air outlet 1145 while the vacuum pump 115 is in operation. This allows the waste bag 110 to not clog the filtered air outlet 11145 and fill up the waste bag enclosure 1140, maximizing the amount of waste 155 the waste bag 110 can hold.

Though referred to as a conical insert 1130 in this description, in other embodiments, the conical insert 1130 may be cylindrically shaped, spherically shaped, or a combination of a cylinder and a sphere. The conical insert 1130 may be placed inside of the autonomous vacuum 100 near the waste bag 110 to prevent the bag from becoming stuck in an outlet for filtered air 165 as the vacuum pump 115 operates.

Charging Process

Figure 12:
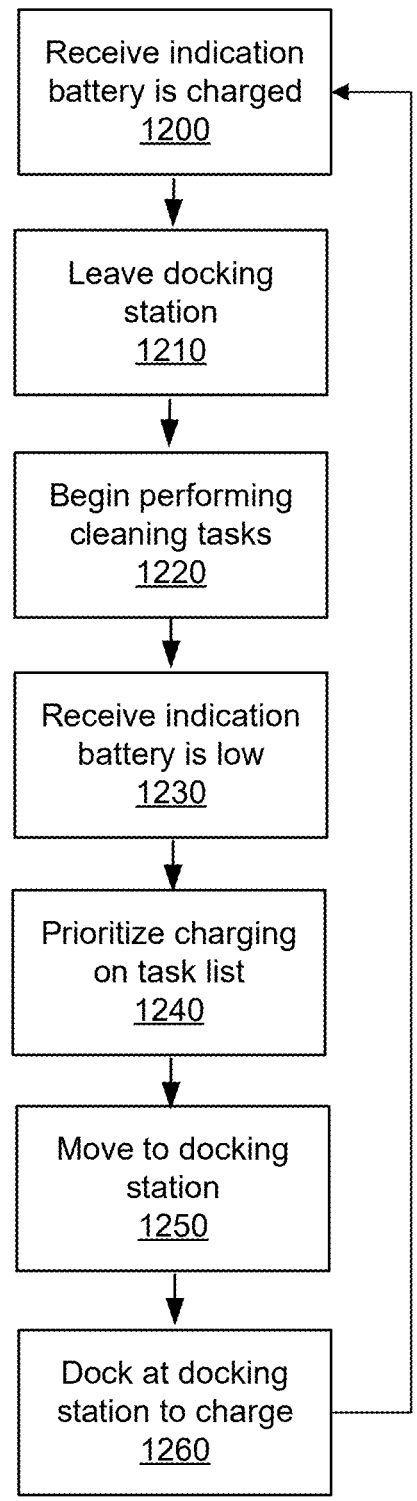
FIG. 12 is a flowchart illustrating a charging process for the autonomous vacuum, according to one example embodiment.

FIG. 12 is a flowchart illustrating a charging process for the autonomous vacuum 100, according to one example embodiment. While charging at the docking station 185, the autonomous vacuum 100 receives 1200 an indication that the battery 180 is charged. The autonomous vacuum 100 leaves 1210 the docking station and automatically begins 1220 performing cleaning tasks on the task list. In some embodiments, the autonomous vacuum 100 may add more cleaning tasks to the task list as it detects messes or user interactions in the environment. In some embodiments, the autonomous vacuum 100 may move around the environment to gather sensor data if the task list does not have any more cleaning tasks or may dock at the docking station for processing sensor data. If the autonomous vacuum 100 receives 1230 an indication that the battery 180 is low when the autonomous vacuum 100 is not at the docking station, the autonomous vacuum 100 adds and prioritizes 1240 charging on the task list. The autonomous vacuum 100 moves 1250 to the docking station and docks at the docking station to charge the battery 1260 until receiving 1200 an indication that the battery is charged.

Though FIG. 12 illustrates a number of interactions according to one embodiment, the precise interactions and/or order of interactions may vary in different embodiments. For example, in some embodiments, the autonomous vacuum 100 may leave 1210 the docking station once the battery 180 is charged enough to complete the cleaning tasks on the task list, rather than once the battery 180 is fully charged. Further, the docking station may be configured to use a handshake system with the autonomous vacuum 100. In such a configuration, the docking station 185 may keep a key corresponding to a particular autonomous vacuum 100, and the autonomous vacuum 100 will keep a reciprocal key. The docking station 185 may be configured to only charge an autonomous vacuum 100 if it matches the reciprocal key. Further, the docking station 185 can track multiple autonomous vacuums 100 where there may be more than one using a key system as described and/or a unique identifier tracker where a unique identifier for an autonomous vacuum 100 is kept in a memory of the docking station 185. The key and/or unique identifier configurations can allow for tracking of autonomous vacuum activity that can be uploaded to the cloud (e.g., activity of cleaning and area cleaned for further analysis) and/or downloading of information (e.g., firmware or other instructions) from the cloud to the autonomous vacuum 100.

Cleaning Processes

Figure 13:
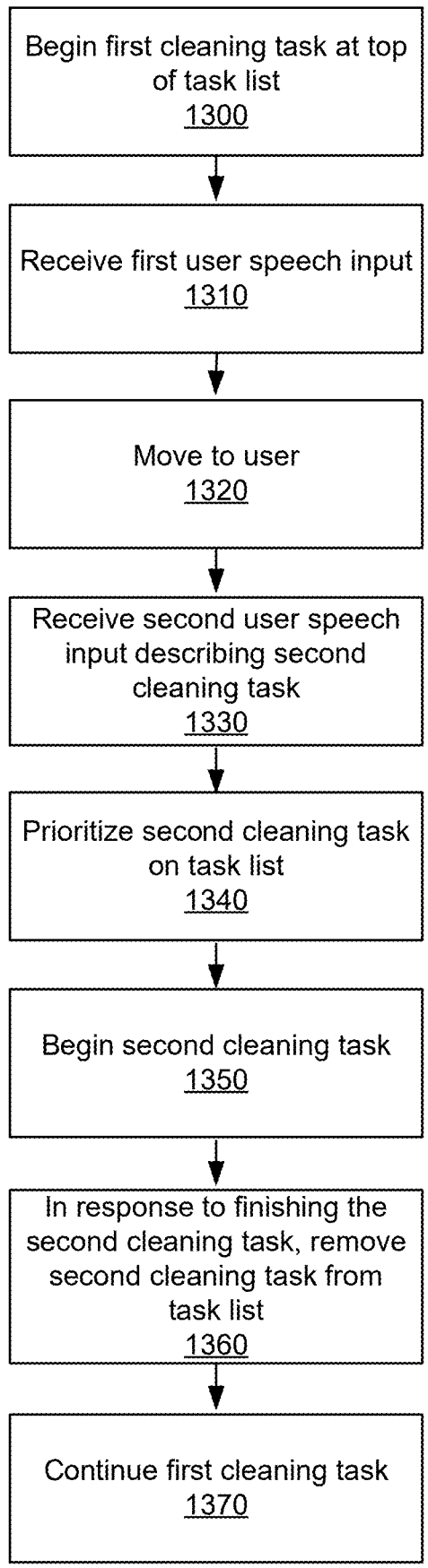
FIG. 13 is a flowchart illustrating a cleaning process for the autonomous vacuum, according to one example embodiment.

FIG. 13 is a flowchart illustrating a cleaning process for the autonomous vacuum, according to one embodiment. In this embodiment, the cleaning process involves user speech input indicating a cleaning task for the autonomous vacuum 100, but other cleaning processes may not involve user speech input. The autonomous vacuum 100 begins 1300 the first cleaning task at the top of the task list. To begin 1300 the cleaning task, the autonomous vacuum 100 may navigate to the mess associated with the cleaning task or may ingest waste 155 or spray solvent 160. The autonomous vacuum 100 receives 1320 a first user speech input via real-time audio data from the microphone 430. In some embodiments, since the audio data may include ambient audio signals from the environment, the autonomous vacuum 100 analyzes the audio data for a hotword that indicates that a user is speaking to the autonomous vacuum 100. The autonomous vacuum 100 determines where the user who delivered the first user speech input is in the environment and moves 1320 to the user.

The autonomous vacuum 100 receives a second user speech input describing a second cleaning task. In some embodiments, the second user speech input may indicate multiple cleaning tasks. In other embodiments, the user speech input is coupled with a gesture. The gesture may indicate some information about the second cleaning task, such as where the task is. The autonomous vacuum 100 prioritizes 1340 the second cleaning task on the task list by moving the second cleaning task to the top of the task list and moving the first cleaning task down in the task list to below the second cleaning task. In some embodiments, if the autonomous vacuum 100 receives a user speech input indicating multiple cleaning tasks, the autonomous vacuum 100 may determine priorities for each of the cleaning tasks based on the mess types, surface types, and locations of the mess for the cleaning tasks in the environment. The autonomous vacuum 100 begins 1350 the second cleaning task and, in response to finishing the second cleaning task, removes the second cleaning task from the task list and continues 1370 with the first cleaning task. This process may repeat if the autonomous vacuum 100 receives more user speech inputs.

Though FIG. 13 illustrates a number of interactions according to one example embodiment, the precise interactions and/or order of interactions may vary in different embodiments. For example, in some embodiments, the autonomous vacuum 100 rotates to face the user rather than moving 1320 to the user to receive 1330 the second user speech input.

Figure 14:
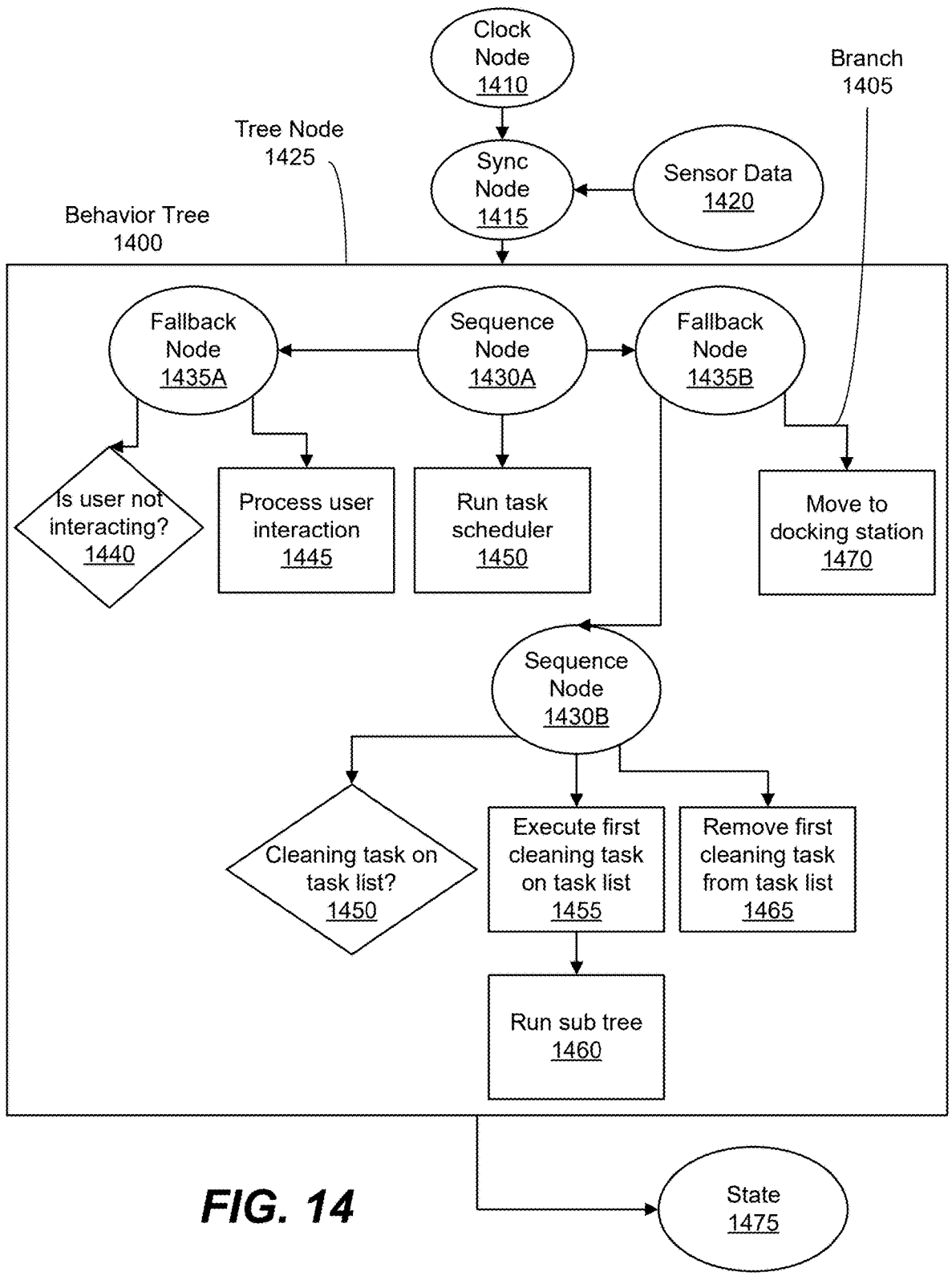
FIG. 14 illustrates a behavior tree used to determine the behavior of the autonomous vacuum 100, according to one example embodiment.

FIG. 14 illustrates a behavior tree 1400 used to determine the behavior of the autonomous vacuum 100, according to one example embodiment. The behavior tree 1400 consists of branches 1405 of nodes, tasks, and conditions. The logic module 570 uses the behavior tree to generate instructions to control the autonomous vacuum 100 to execute tasks within an environment, such as cleaning tasks or charging tasks. The behavior tree 1400 takes synchronized sensor data 1420 as input from a sync node 1410. The sync node 1415 stores sensor data 1420 from the sensor system 175 for a time interval dictated by a clock node 1405, which ticks at regular time intervals. With each tick, the sync node stores new sensor data 1415 taken as the clock node 1405 ticks to be used as input to the behavior tree 1400.

The behavior tree 1400 is encompassed in a tree node 1420. The tree node 1420 sends sensor data 1415 from the sync node 1410 to other nodes in the behavior tree 1400 from left to right in the behavior tree 1400. The behavior tree 1400 also includes other nodes that dictate the flow of decisions through the behavior tree 1400. A sequence node 1430 executes branches 1405 connected to the sequence node 1430 from left to right until a branch fails (i.e., a task is not completed or a condition is not met). A fallback node 1435 executes branch 1405 connected to the fallback node 1435 from left-to right until a branch succeeds (i.e., a task is completed or a condition is met). The logic module 570 cycles through the branches 1405 of the behavior tree 1400 until it reaches a charging task, which causes the logic module 570 to instruct the autonomous vacuum 100 to move 1470 to the docking station 185.

For a tick of the click node 1410 with synchronized sensor data 1420 from the sync node 1415, the logic module 570 cycles through the behavior tree 1400. For example, starting at sequence node 1430A, the logic module 570 moves down the left-most branch 1405 connected to the sequence node 1430A since sequence nodes 1430 indicate for the logic module 570 to execute connected branches 1405 until a branch fails. The left-most branch connected to sequence node 1430A is fallback node 1435A. Fallback nodes 1435 indicate for the logic module 570 to execute the branches 1405 connected to the fallback node 1435A from left to right until a connected branch 1405 succeeds. At the fallback node 1435A, the logic module 570 cycles between determining if a user is not interacting 1440, which is a condition, and processing 1445 the user interaction until one the branches 1405 succeeds (i.e., the user is not interaction with the autonomous vacuum 100). Examples of user interactions include user speech input or a user's gestures.

The logic module 570 moves to the next branch connected to sequence node 1430B, which indicates for the autonomous vacuum 100 to run 1450 the task scheduler. The task scheduler is internal to the logic module 570 and retrieves the next cleaning task in the task list database 550, along with a location in the environment, a cleaning task architecture, and cleaning settings. The task scheduler converts the cleaning task architecture, which lists the actions for the autonomous vacuum 100 to take to remove the mess associated with the cleaning task, into a sub tree. For each new cleaning task, the task scheduler generates a new sub tree and inserts the sub tree into the behavior tree 1400.

The logic module 570 moves to fallback node 1435B and executes the branches 1405 from fallback node 1435B from left to right until a branch 1405 connected to fallback node 1435B succeeds. The left-most branch 1405 is connected to sequence node 1430B, which executes its connected branches 1405 from left to right until a connected branch 1405 fails. The logic module 570 determines if there is a cleaning task on the task list 1450, as determined by the task scheduler. If not, the branch 1405 has failed since the condition of a cleaning task being on the task list 1450 was not met, and the autonomous vacuum 100 moves 1470 to the docking station 185 to charge. In some embodiments, if the first task on the task list is a charging task, the branch fails so the autonomous vacuum 100 can move 1470 to the docking station 185 for charging.

If the task list has a cleaning task on it, the logic module 570 generates instructions for the autonomous vacuum 100 to execute 1455 the first cleaning task on the task list. In some embodiments, if the autonomous vacuum 100 is not already located at the mess associated with the cleaning task, logic module 570 generates instructions for the autonomous vacuum 100 to move to the location of the mess. The logic module 570 runs 1460 the sub tree retrieved by the task scheduler to clean the mess and removes 1465 the first cleaning task from the task list. The logic module 570 repeats cycling through these branches stemming from sequence node 1430B until there are no more cleaning tasks on the task list. The logic module 570 then generates instructions for the autonomous vacuum 100 to move 1470 to the docking station 185.

Once the logic module 570 has finished executing the behavior tree 1400, the logic module 570 receives a state 1475 of the autonomous vacuum 100. The state includes the synchronized sensor data 1420 used for executing the behavior tree 1400, as well as new sensor data collected as the autonomous vacuum 100 performed the cleaning tasks. This new sensor data may include linear and angular velocities from the autonomous vacuum's 100 movement as it completed the cleaning tasks and an angle relative to the direction of the autonomous vacuum 100 before the behavior tree 1400 was executed. In some embodiments, the synchronized sensor data 1420 and the new sensor data are sent to a client device 410 associated with the autonomous vacuum 100, which may display graphs describing the movement and cleaning tasks completed by the autonomous vacuum 100.

In some embodiments, the behavior tree 1400 includes more nodes and tasks than shown in FIG. 14. For example, in one embodiment, the behavior tree includes a branch before the last branch of fallback node 1435B that indicates for the logic module 570 to generate instructions for the autonomous vacuum 100 to roam the environment to detect messes and map the environment.

Figure 15:
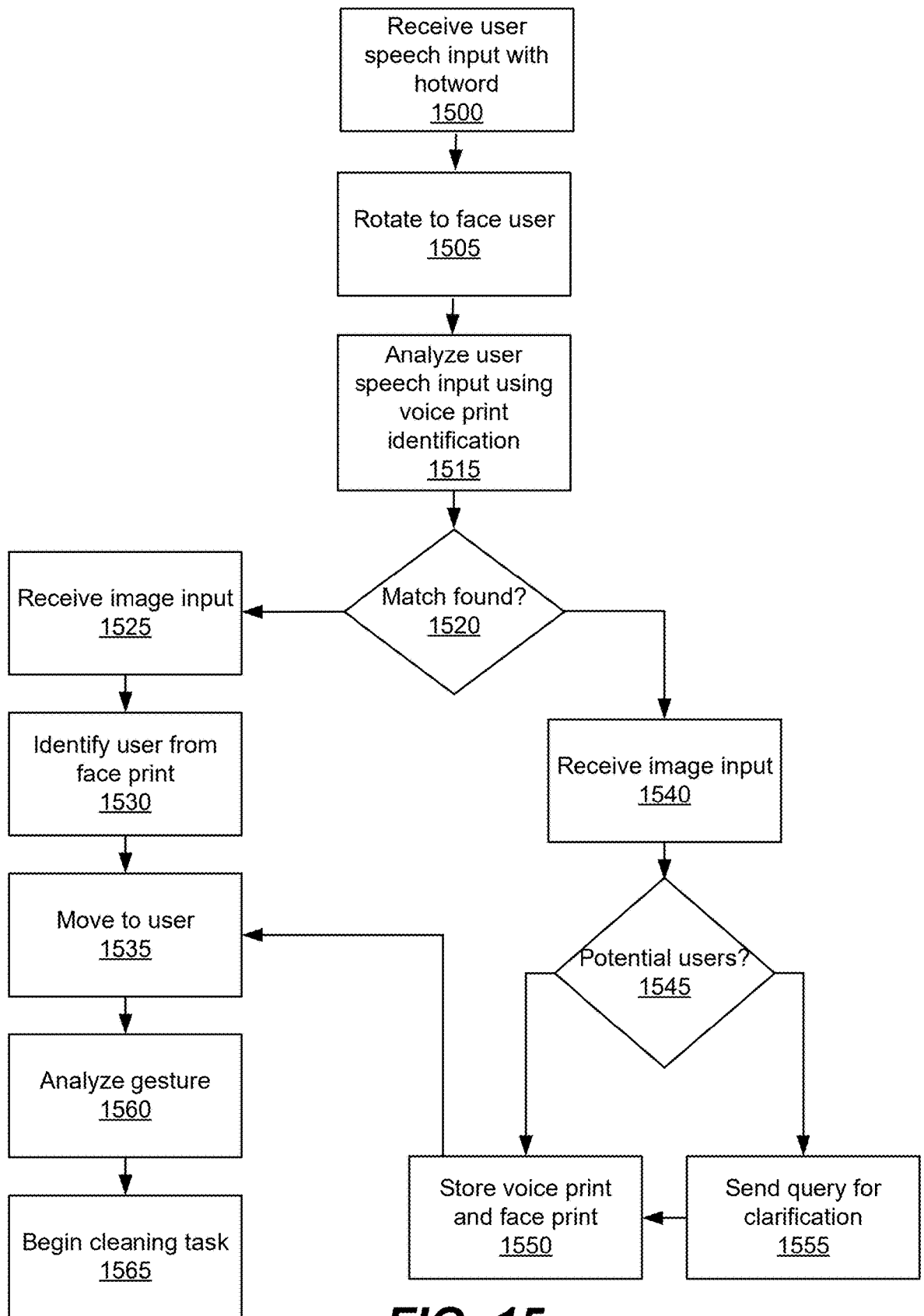
FIG. 15 is a flowchart illustrating an example process for beginning a cleaning task based on user speech input, according to one example embodiment.

FIG. 15 is a flowchart illustrating an example process for beginning a cleaning task based on a user speech input and gesture, according to one example embodiment. The autonomous vacuum 100 receives 1500 a user speech input via the microphone 430 including a hotword. The hotword may be a word or phrase set by the user or may be a name attributed to the autonomous vacuum 100, such as "Jarvis." In embodiments with more than one microphone 430, the autonomous vacuum determines the direction the user speech input came from by using beam-forming of the multiple microphones 430 to compute the approximate location of the origin of the user speech input. The autonomous vacuum 100 then detects people in visual data from the fish-eye camera 700 and uses the angle provided by beam-forming (assuming ±10-15° error in beam-forming) as the estimated range for the direction of the user speech input. In embodiments with multiple people in the estimated range, the autonomous vacuum 100 can prompt users to instruct which person to give control of the autonomous vacuum 100. The autonomous vacuum 100 then rotates 1505 to face the user. In yet another embodiment, the autonomous vacuum 100 analyzes the user speech input using voice print identification to determine if the voice print of the user speech input matches that of a fingerprint in the fingerprint database 520. If a match exists in the fingerprint database 520, the autonomous vacuum 100 receives 1525 an image input of visual data including the user. The autonomous vacuum 100 extracts out a face print from the image input and identifies 1530 the user from the face print using face prints stored as fingerprints in the fingerprint database 520. Once the user has been identified 1530, the autonomous vacuum 100 moves 1535 to the user.

If a match was not found in the fingerprint database 520, the autonomous vacuum 100 receives 1540 an image input of the user and extracts information from the image input such as body print, face print, and a representation of the clothing the person is wearing. The autonomous vacuum 100 uses this information, along with the voice print from the user speech input, to attempt to match the user to potential users 1545 already stored in the fingerprint database 520. If a matching fingerprint is identified, the autonomous vacuum 100 stores the voice print and the face print as part of the fingerprint in the fingerprint database 520 and moves 1535 to the user. In some embodiments, the autonomous vacuum 100 also stores the body print and representation of the clothing with the fingerprint. If no potential user 1545 is found, the autonomous vacuum 100 sends 1555 a query to the user for clarification of who the user is. In some embodiments, the autonomous vacuum 100 sends 1555 the query through a client device 410 associated with the autonomous vacuum 100 and receives the clarification from a message from the client device 410. In other embodiments, the autonomous vacuum 100 outputs the query through an internal speaker in the sensor system 175 and receives a user speech input for the clarification. Once clarified, the autonomous vacuum 100 stores the voice print and the face print as part of the fingerprint in the fingerprint database 520 and moves 1535 to the user.

The autonomous vacuum 100 receives more visual data of the user and analyzes a gesture from the user with the user speech input to determine a cleaning task. For example, a user speech input of "Jarvis, clean up that mess" along with a gesture pointing to a location in the environment would indicate to the autonomous vacuum 100 that there is a mess at that location. In some embodiments, if not indicated by the user speech input, the autonomous vacuum 100 self-determines a mess type, surface type, and location of the mess and creates a cleaning task for the mess. The autonomous vacuum 100 adds the cleaning task to the top of the task list and begins 1565 the cleaning task.

Though FIG. 15 illustrates a number of interactions according to one embodiment, the precise interactions and/or order of interactions may vary in different embodiments. For example, in some embodiments, the autonomous vacuum 100 only receives 1500 a user speech input and does not analyze 1560 a gesture from the user 1560 to determine and begin 1565 a cleaning task.

User Interfaces

Control of the autonomous vacuum 100 may be affected through interfaces that include, for example, physical interface buttons on the autonomous vacuum 100, a touch sensitive display on the autonomous vacuum 100, and/or a user interface on a client device 410 (e.g., a computing device such as a smartphone, tablet, laptop computer or desktop computer). Some or all of the components of an example client device 410 are illustrated in FIGS. 16-19. Some or all of the components of the client device 410 may be used to execute instructions corresponding to the processes described herein, including generating and rendering (or enabling rendering of) user interfaces to interact with the autonomous vacuum 100.

Referring now to FIGS. 16-21, the figures illustrate example user interfaces and methods of using user interfaces presented via one or more client devices 410 to instruct the autonomous vacuum 100. A user may interact with the user interfaces via a client device 410 to perform (or execute) particular tasks. Some of the tasks may be performed in conjunction with the autonomous vacuum 100. For example, the user interface of the client device 410 may render a view (actual image or virtual) of a physical environment, a route of the autonomous vacuum 100 in the environment, obstacles in the environment, and messes encountered in the environment. A user may also interact with the user interfaces to direct the autonomous vacuum 100 with cleaning tasks. Further examples of these are described herein.

Figure 16A:
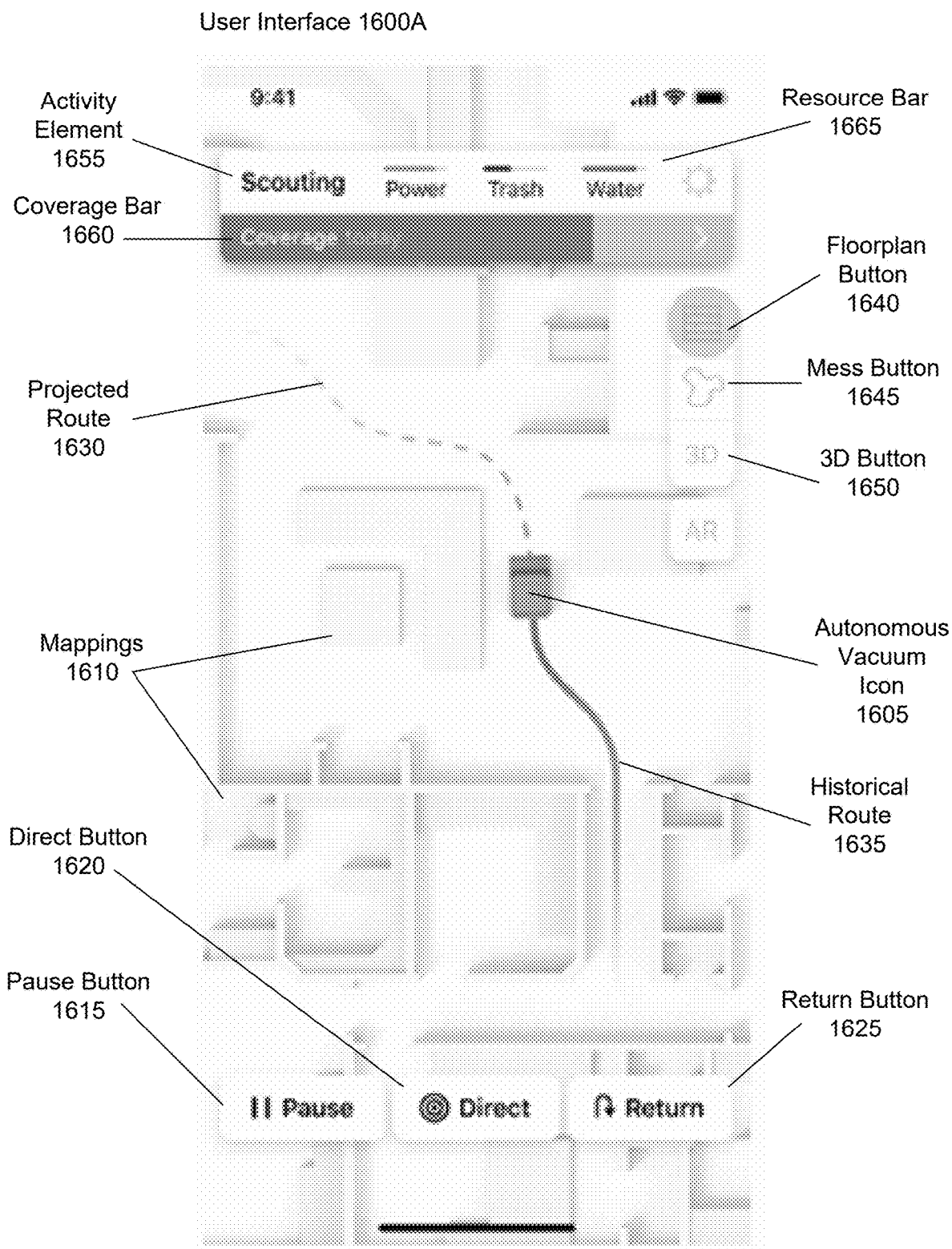
FIG. 16A illustrates a user interface depicting a virtual rendering of the autonomous vacuum scouting an environment, according to one example embodiment.

Turning first to FIG. 16A, it illustrates an example user interface 1600A that may be rendered (or enabled for rendering) on the client device 410. The user interface 1600A depicts a virtual rendering of the autonomous vacuum 1605 scouting an environment, according to one example embodiment. In the example, the autonomous vacuum 100 is represented by an autonomous vacuum icon 1605 in the user interface 1600A. When the autonomous vacuum 100 is scouting (e.g., traversing the environment looking for messes), the user interface 1600A may depict the autonomous vacuum 1605 scouting in real-time in the rendering of the environment. In this example, the user interface 1600A shows a virtual rendering. For ease of discussion, it will herein be referred to as a "rendering." Here, the rendering in the user interface 1600A displays mappings 1610 of physical objects and images within the environment, as determined by the mapping module 500. In some embodiments, the user interface 1600A displays objects mapped to different levels within the environment in different colors. For example, objects in the long-term level may be shown in gray, while objects in the immediate level may be displayed in red. In other embodiments, the user interface 1600A only depicts the long-term level of the map of the environment. Further, the user interface 1600A may display the rendering with texture mapping matching one or more floorings of the environment.

The user interface 1600A displays (or enables for display, e.g., on a display screen apart from the client device 410), in the rendering of the environment, a historical route 1635 of where the autonomous vacuum 100 traveled in the environment and a projected route 1630 of where the autonomous vacuum 100 is going within the environment. In some embodiments, the user interface 1600A displays the movement of the autonomous vacuum 100 in real-time. The user interface 1600A shows that the autonomous vacuum 100 is "scouting" in the activity element 1655 of the resource bar 1665, which also displays statistics about the amount of power and water the autonomous vacuum 100 has left and the amount of trash the autonomous vacuum 100 has collected. The user interface 1600A also displays a coverage bar 1660 that indicates a percentage of the environment that the autonomous vacuum 100 has covered in the current day.

It is noted that data corresponding to the user interface may be collected by the autonomous vacuum 100 via some or all of the components of the sensor system 175. This data may be collected in advance (e.g., initial set) and/or collected/updated as the autonomous vacuum 410 is in operation. That data may be transmitted directly to the client device 410 or to a cloud computing system for further processing. The further processing may include generating a map and corresponding user interface, for example, as shown in FIG. 16A. If the data is processed in the cloud system it may be provided (or enabled), e.g., transmitted, to the client device 410 for rendering.

Continuing with the user interface 1600A, it comprises a plurality of interactive elements, including a pause button 1615, a direct button 1620, a return button 1625, a floorplan button 1640, a mess button 1645, and a 3D button 1650. When the user interface 1600A receives an interaction with the pause button 1615, the autonomous vacuum 100 stops its current activity (e.g., scouting). The user interface 1600A may then receive an interaction command, e.g., via the direct button 1620, which directs the autonomous vacuum 100 to navigate to a location within the environment. Further, when the user interface 1600A receives an interaction with the return button 1625, the autonomous vacuum 100 navigates the environment return to the docking station 185 and charge.

Interactions via the user interface 1600A with the floorplan button 1640, mess button, and 3D button 1650 alter the rendering of the environment and the display of mappings 1610. For instance, receiving an interaction via the user interface 1600A with the floorplan button 1640 causes the user interface 1600A to display a rendering of the environment at a bird's-eye view, as shown in FIG. 16A.

Figure 16B:
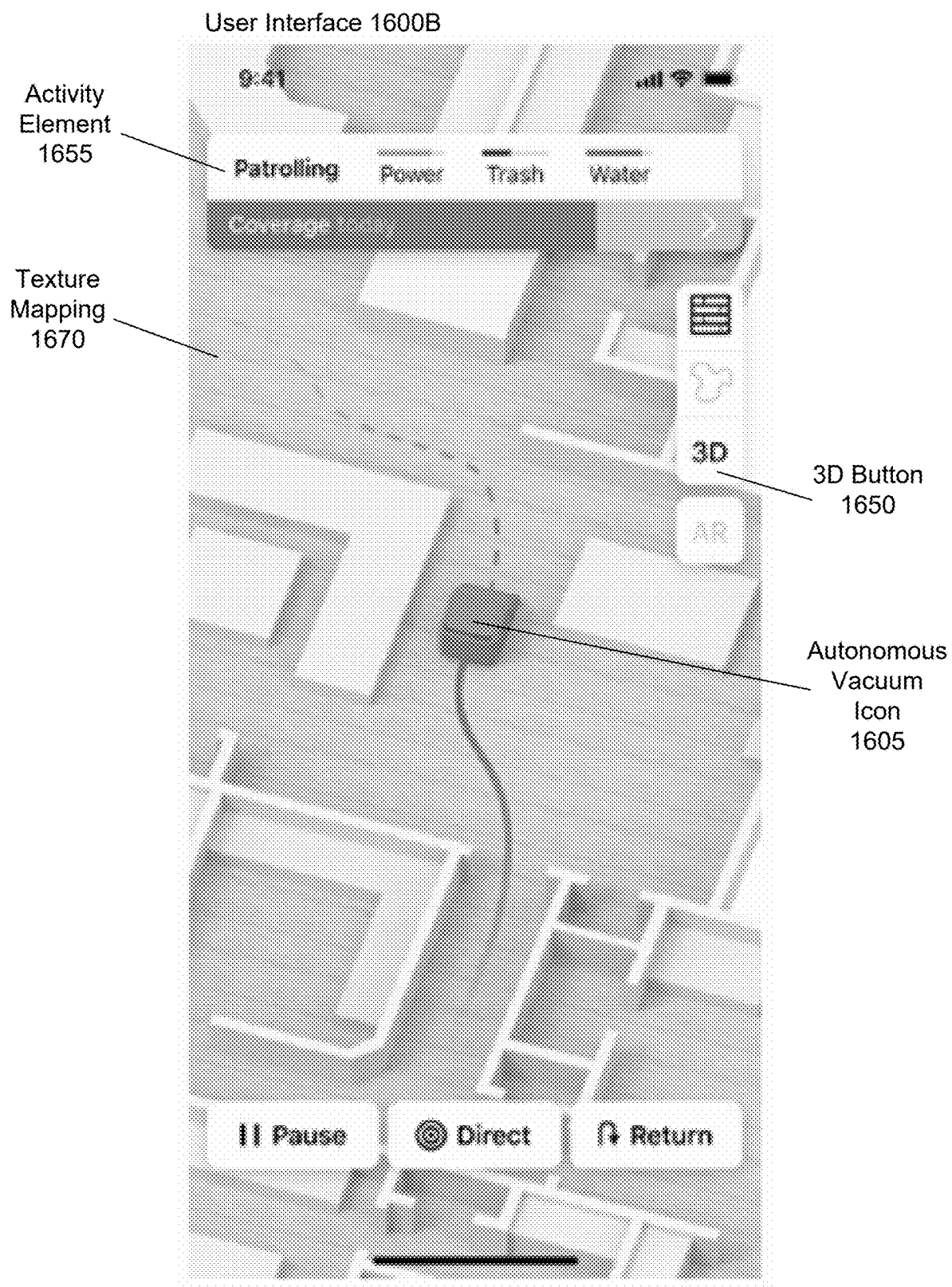
FIG. 16B illustrates a user interface depicting a 3D rendering of an environment, according to one example embodiment.

Turning now to FIG. 16B, it illustrates an example user interface 1600B for display that depicts a 3D rendering of the environment, according to one embodiment. In this example embodiment, the rendering of the environment includes with texture mapping 1670 matching the flooring of the environment. The texture data may be prestored, e.g., in a cloud computing system database. The texture data may augment the data collected by the autonomous vacuum 100 corresponding to the physical environment. For example, the autonomous vacuum 100 sensor system 175 may collect data on a hard floor surface. This data may be further processed, such as by the cloud computing system or client device 410, to identify the type of hard floor surface (e.g., tile, hardwood, etc.). Once processed, texture data may be retrieved from a texture database for that hard floor surface to generate the rendering showing the texture.

Continuing with the example of FIG. 16B, the activity element 1655 of the user interface 1600B indicates that the autonomous vacuum 100 is patrolling in the environment by moving around the environment and looking for cleaning tasks to complete. Further, the user interface 1600B received an interaction with the 3D button 1650, so the user interface 1600B displays a 3D rendering of the environment determined by the 3D module 310. For instance, in the 3D rendering, the mappings 1610 of objects, such as furniture and built-in features, are shown in 3D. The additional data on furniture may be through processing of the sensor and/or image data collected by the autonomous vacuum 100 and combined with data from a database for generating the rendering with the furniture in the user interface.

Figure 16C:
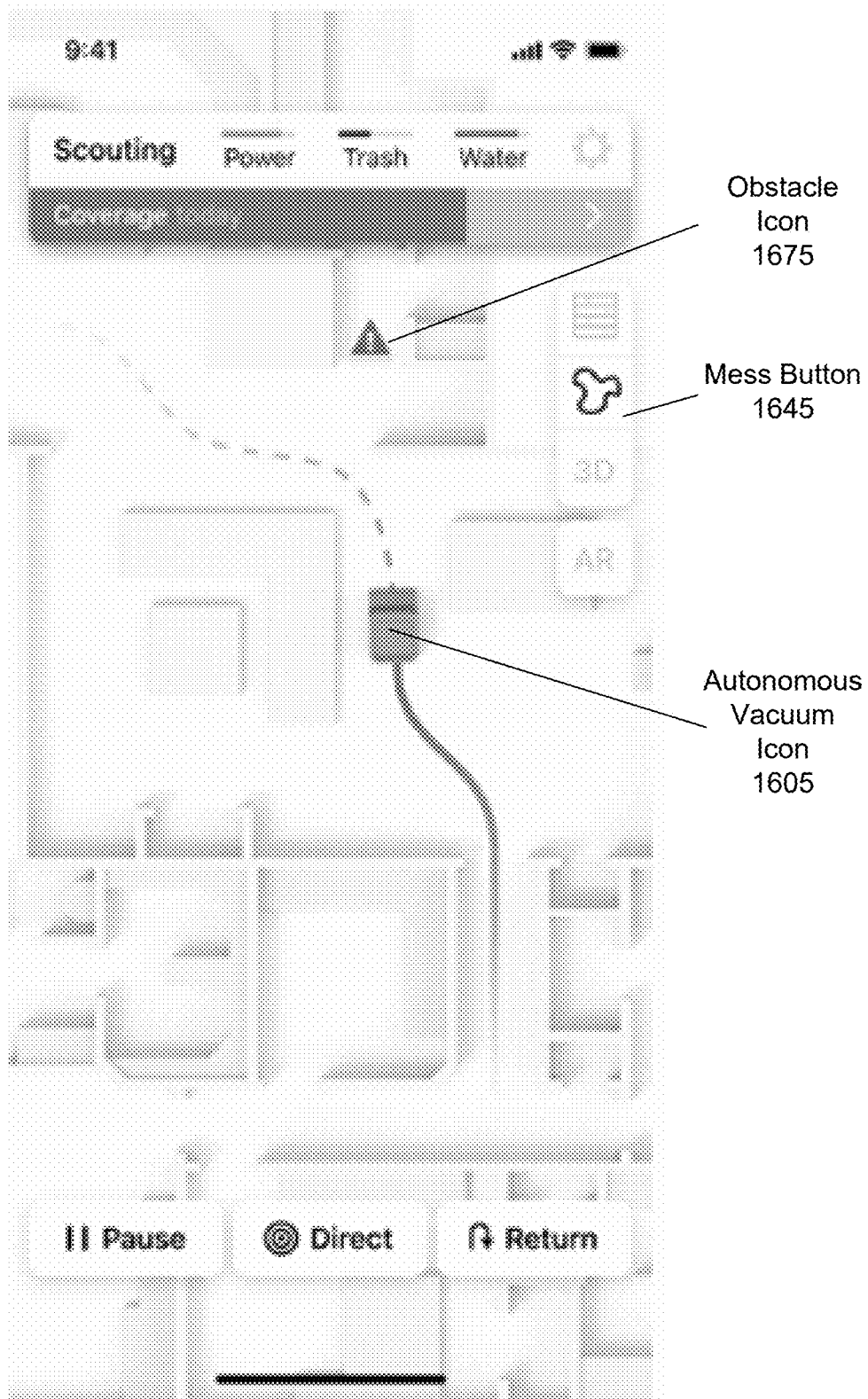
FIG. 16C illustrates a user interface depicting an obstacle icon in a rendering of an environment, according to one example embodiment.

Next, FIG. 16C illustrates a user interface 1600C for display on a screen depicting an obstacle icon 1675 in the rendering of the environment, according to one example embodiment. In this embodiment, the user interface 1600B received an interaction with the mess button 1645, so the user interface 1600C displays a rendering of the environment including obstacle icons 1675 representing locations of obstacles in the environment. In some embodiments, the rendering may further include mess areas detected as the autonomous vacuum 100 scouted in the environment. A mess area is an area in the environment in which the autonomous vacuum 100 detected, via the sensor system 175, messes, such as dirt, dust, and debris. The autonomous vacuum 100 may only register an area with a percentage of mess above a threshold level as a mess area. For example, if autonomous vacuum 100 determines that an area is 1% covered in dust, the autonomous vacuum 100 may not label the area as a mess area whereas the autonomous vacuum 100 may label an area that is 10% covered in dirt as a mess area to be displayed in the user interface 1600C.

Figure 17A:
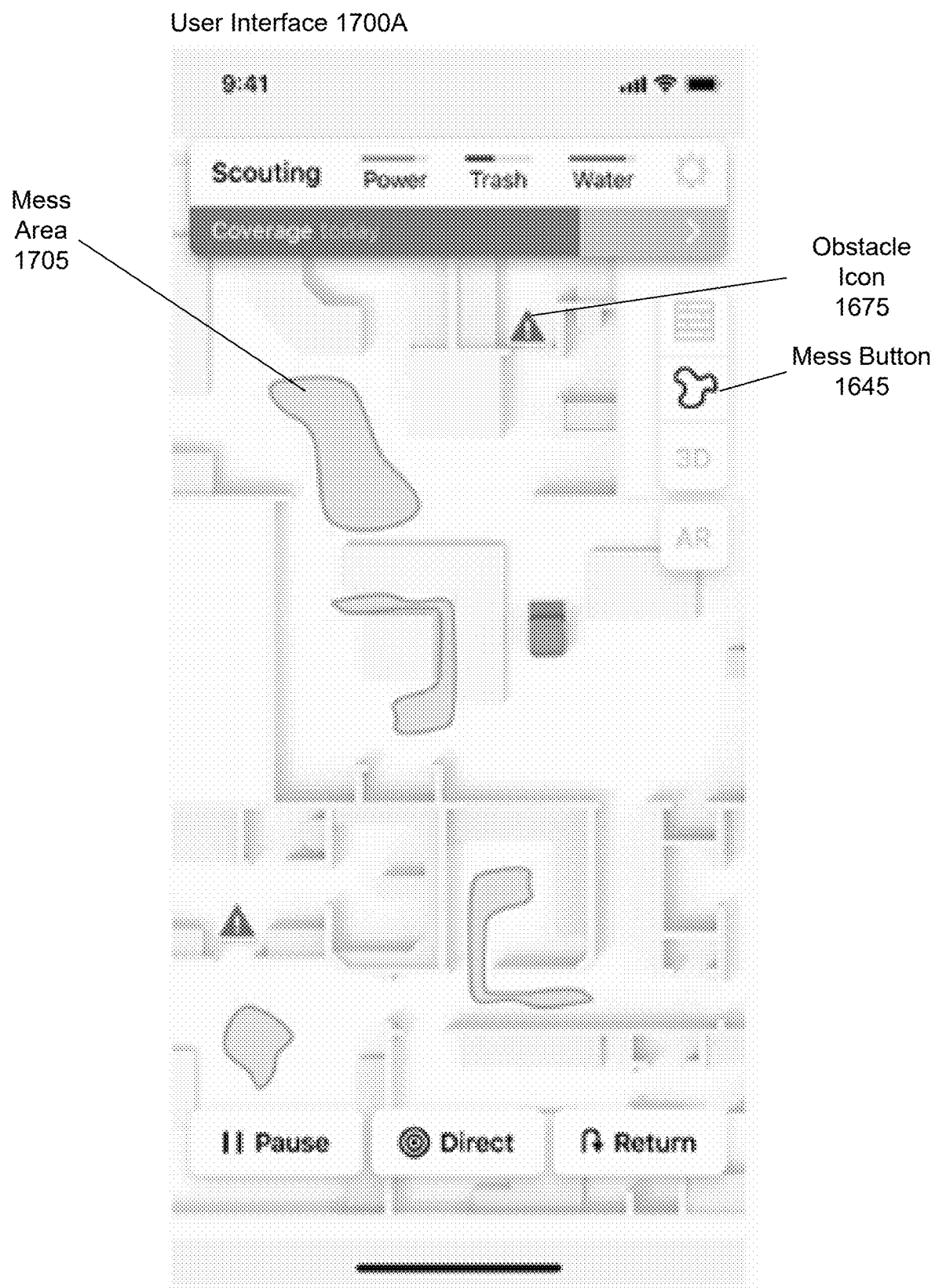
FIG. 17A illustrates a user interface depicting locations of detected messes and obstacles in an 54environment, according to one example embodiment.
Figure 17B:
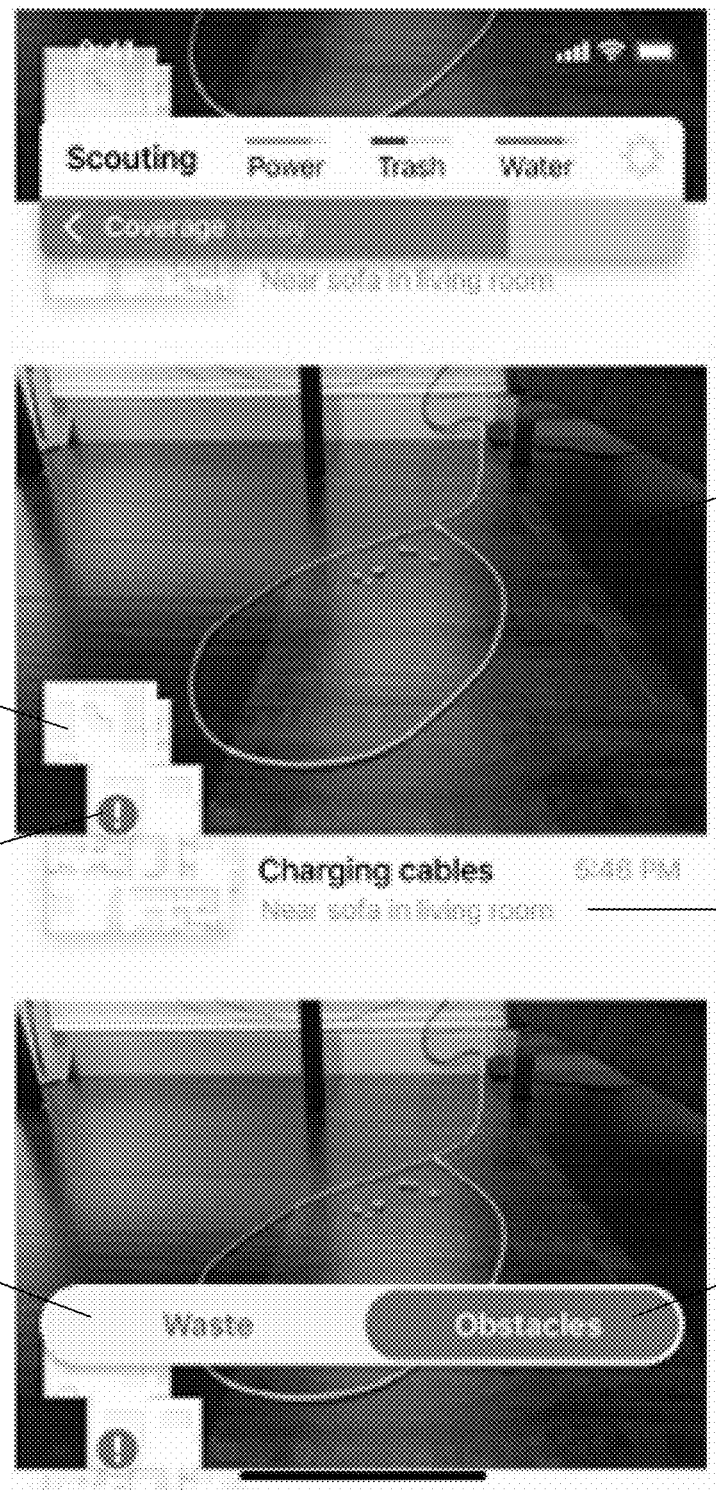
FIG. 17B illustrates a user interface depicting an obstacle image, according to one example embodiment.

FIG. 17A illustrates a user interface 1700A for display on a screen that depicts locations of detected messes and obstacles in the environment, according to one example embodiment. In this embodiment, the user interface 1700A depicts both obstacle icons 1675 and mess areas 1705. When the user interface 1700A receives in interaction with an obstacle icon 1675, the user interface 1700B displays an obstacle image 1710 captured by the camera system 420 while the autonomous vacuum 100 was scouting, as shown in FIG. 17B. The user interface 1700B may depict multiple obstacle images 1710 of obstacles in the environment, ordered either chronologically as the autonomous vacuum 100 encountered them or by size of the area the obstacle obstructs. Each obstacle image 1710 is associated with an environment map 1720 that depicts a location of the obstacle in the environment and an obstacle description 1730 describing what the obstacle is (e.g., "Charging cables") and the obstacle location (e.g., "Near sofa in living room"). In some embodiments, the user interface 1700B may further include an interactive element that, upon interaction, indicates to the autonomous vacuum that the obstacle has been removed.

The user interface 1700B also includes a waste toggle 1735 and an obstacle toggle 1740. When the obstacle toggle 1740 is activated, like in FIG. 17B, the user interface 1700B displays obstacle images 1710 whereas when the waste toggle 1735 is activated, the user interface 1700B displays images of waste in mess areas 1705, such as trash, spills, dirt, dust, or debris.

Figure 18A:
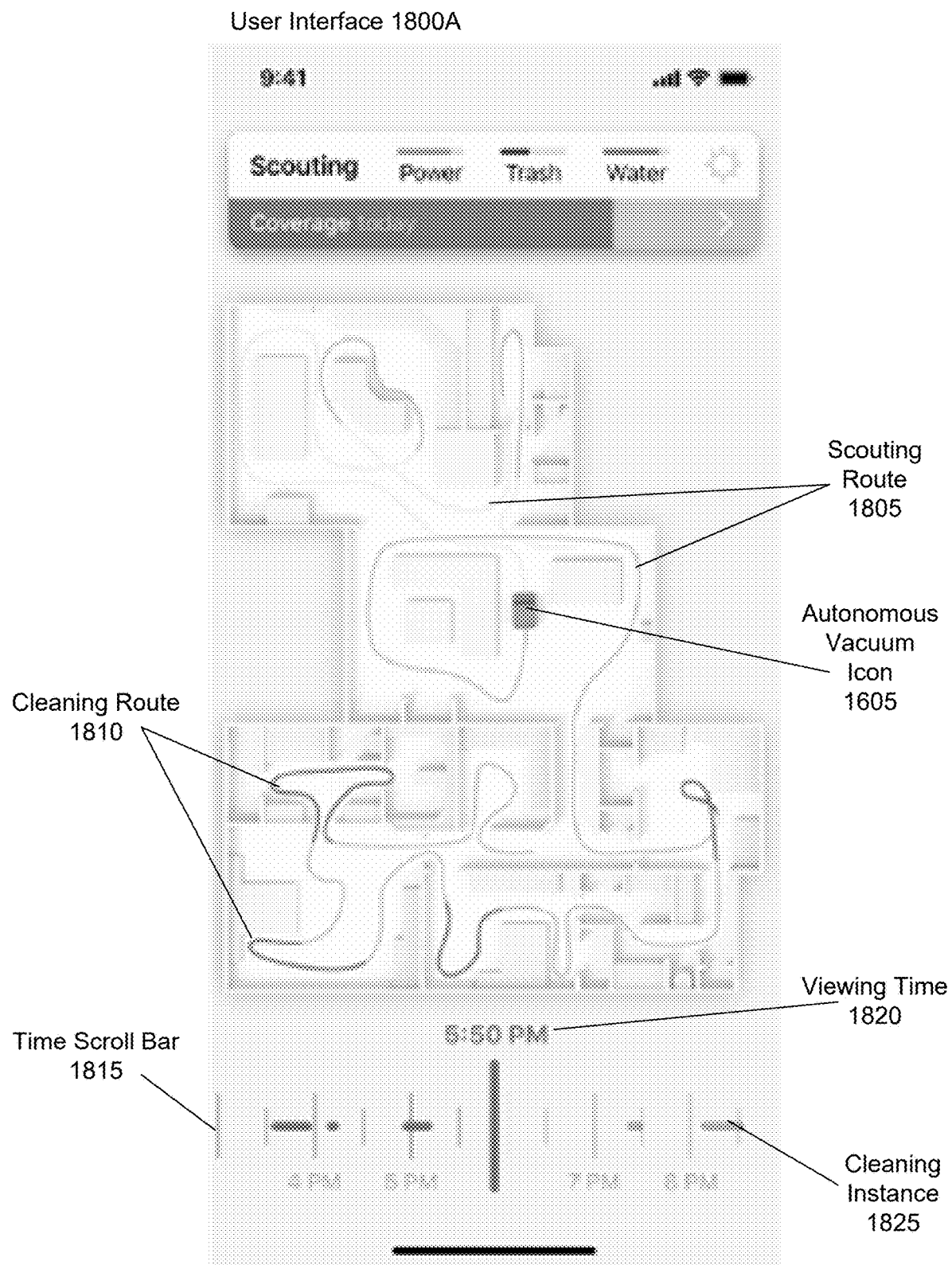
FIG. 18A illustrates a user interface depicting a route of an autonomous vacuum in an environment, according to one example embodiment.

FIG. 18A illustrates a user interface 1800A for display on a screen depicting a route of the autonomous vacuum 100 in the environment, according to one example embodiment. The route is divided into a scouting route 1805 and a cleaning route 1810. The scouting route 1805 depicts where the autonomous vacuum 100 moved in the environment while scouting for messes, and the cleaning route 1810 depicts where the autonomous vacuum 100 moved as it cleaned (e.g., activated the vacuum pump 115). The autonomous vacuum 100 may alternate between scouting and cleaning as it moves about the environment, as shown in FIG. 18A. The user interface 1800A also includes a time scroll bar 1815 that represents a time range of a current day. Upon receiving an interaction with the time scroll bar 1815 that sets a viewing time 1820, the user interface 1800A displays the autonomous vacuum icon 1605 at a location in the rendering corresponding to the location of the autonomous vacuum 100 in the environment at the viewing time 1820. Further, the time scroll bar 1815 is interspersed with cleaning instances 1825 that indicate time periods that the autonomous vacuum 100 was cleaning in the environment.

Figure 18B:
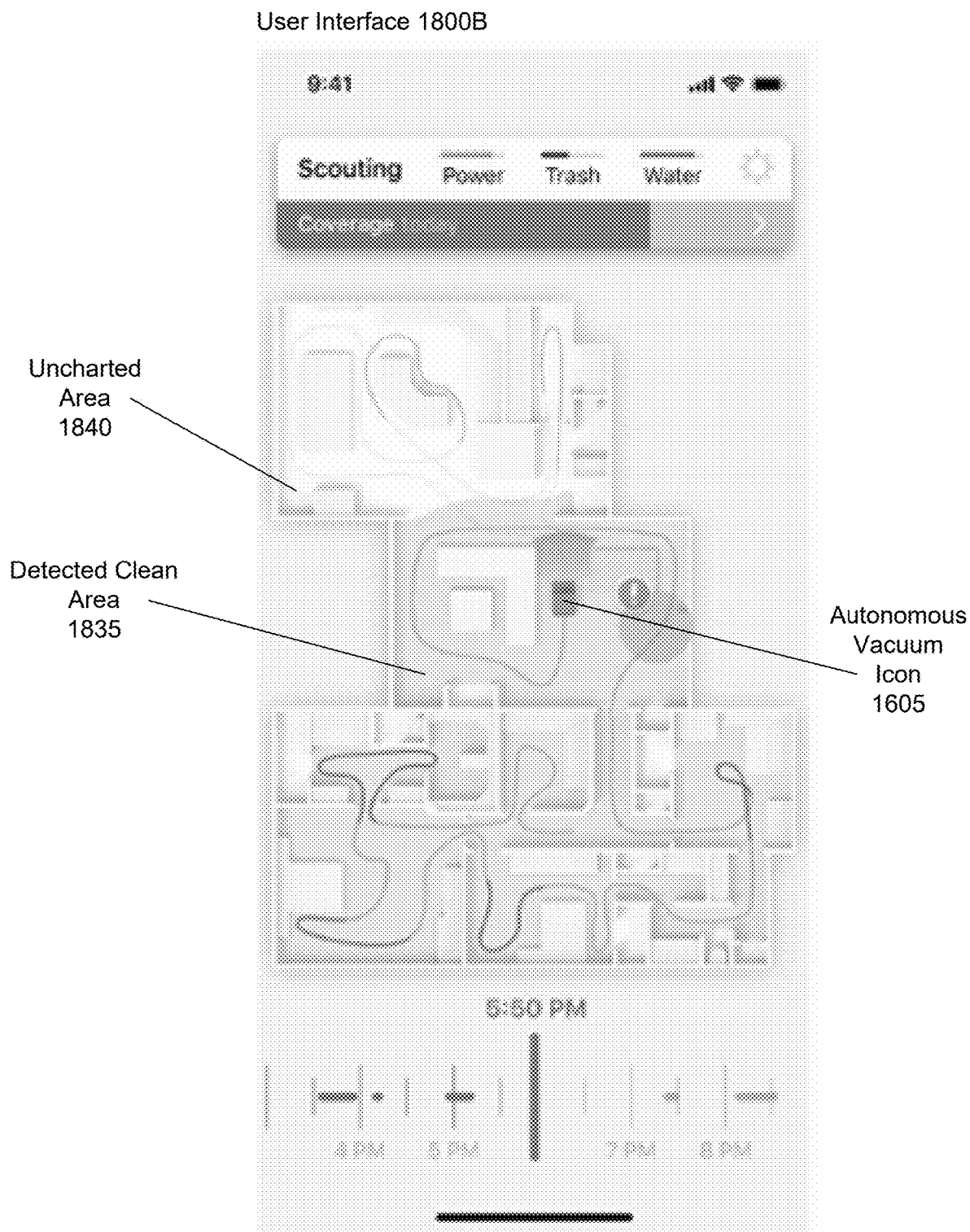
FIG. 18B illustrates a user interface depicting detected clean areas in an environment, according to one example embodiment.

FIG. 18B illustrates a user interface 1800B for display on a screen that depicts detected clean areas 1835 in the environment, according to one example embodiment. In this embodiment, the user interface 1800B illustrated detected clean areas 1840 in gray shading. Detected clean areas 1840 are areas in the environment that the autonomous vacuum 100 has traversed and determined, using the sensor system 175, are clean (e.g., free of dirt, dust, debris, and stains). The user interface 1800B also illustrated uncharted areas 1840 are areas in the environment that the autonomous vacuum 100 has not yet traversed or determined, using the sensor system 175, are not clean.

Figure 19A:
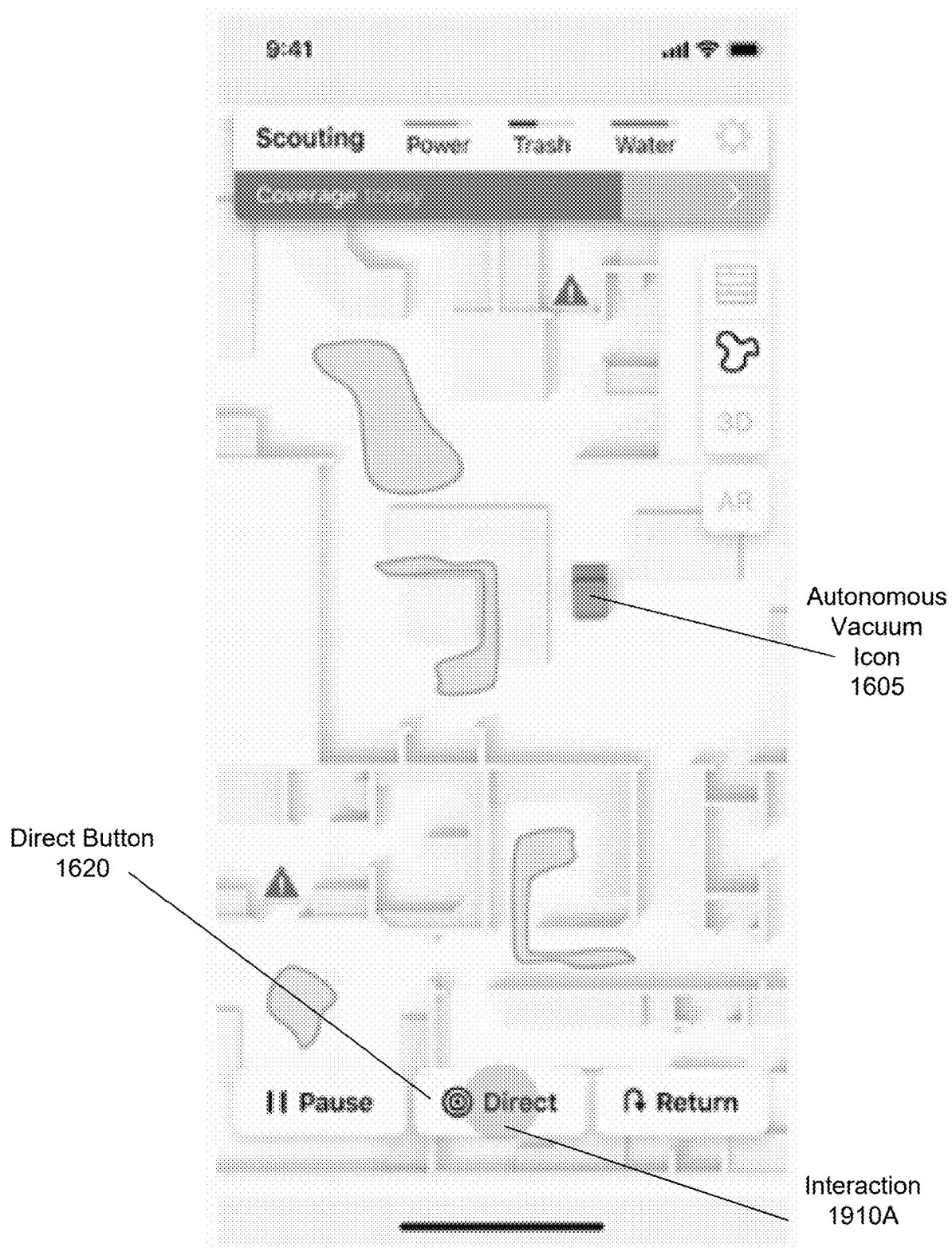
FIG. 19A illustrates an interaction with a user interface with a direct button, according to one example embodiment.
Figure 19B:
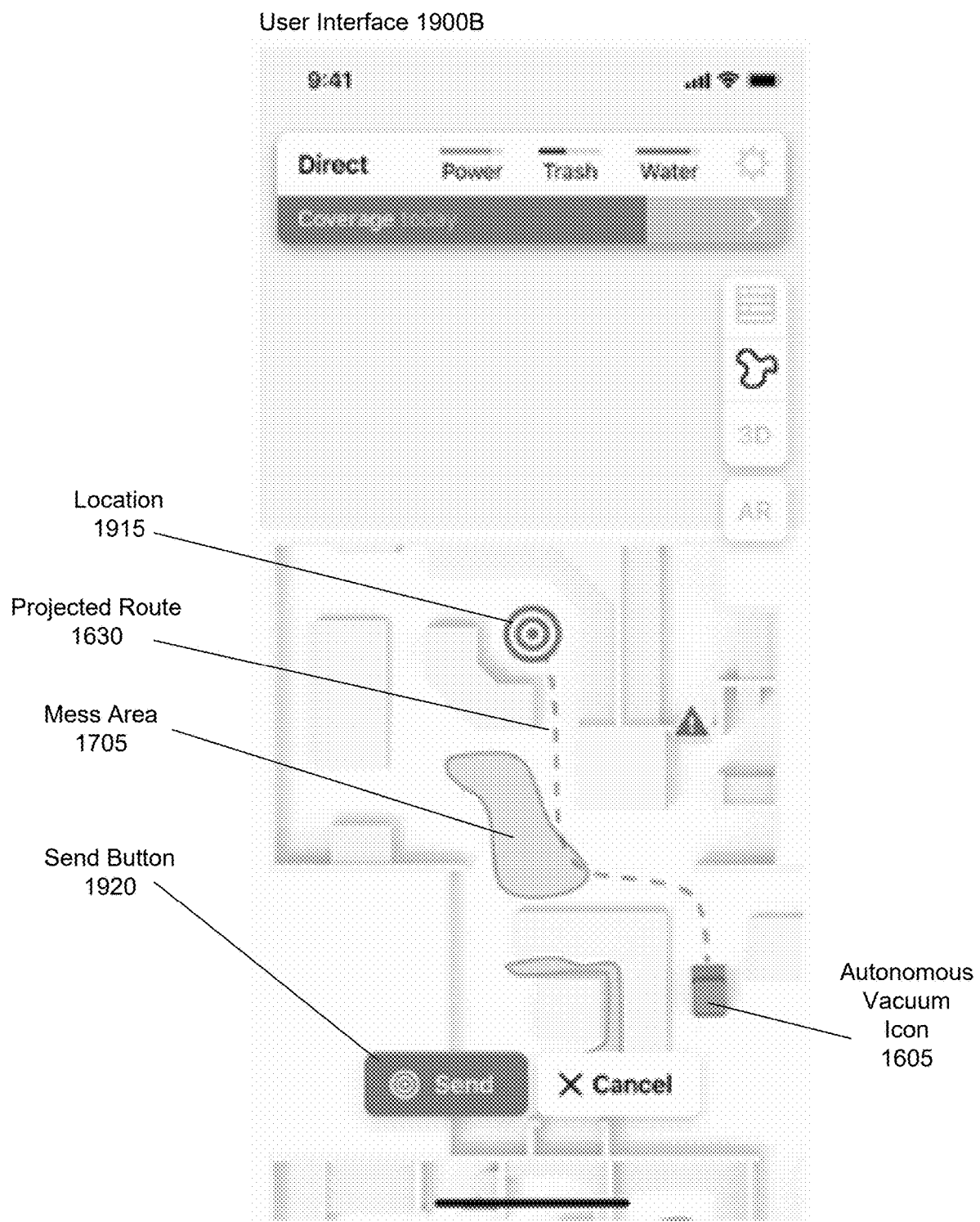
FIG. 19B illustrates selecting a location in a rendering of an environment via a user interface according to one example embodiment.

FIG. 19A illustrates an interaction 1910A with a user interface 1900A with the direct button 1620 for display on a screen, according to one example embodiment. The interaction 1910A is represented by a gray-shaded circle on the direct button 1620. A user interacting with the user interface 1900A may interact with the direct button 1620 and select a location 1915 in the rendering corresponding to a location in the environment for the autonomous vacuum 100 to travel to and clean, as shown in FIG. 19B. In some embodiments, instead of interacting with the location 1915, a user may select, via the user interface 1900B, a mess area for the autonomous vacuum 100 to travel to and clean. Once a location 1915 in the environment has been selected via the user interface 1900B, the user interface 1900B may depict a projected route 1630 corresponding to a path in the environment that the autonomous vacuum 100 will take to reach the location. Upon receiving an interaction with the send button 1920 via the user interface 1900B, the autonomous vacuum 100 travels to the location.

Figure 19C:
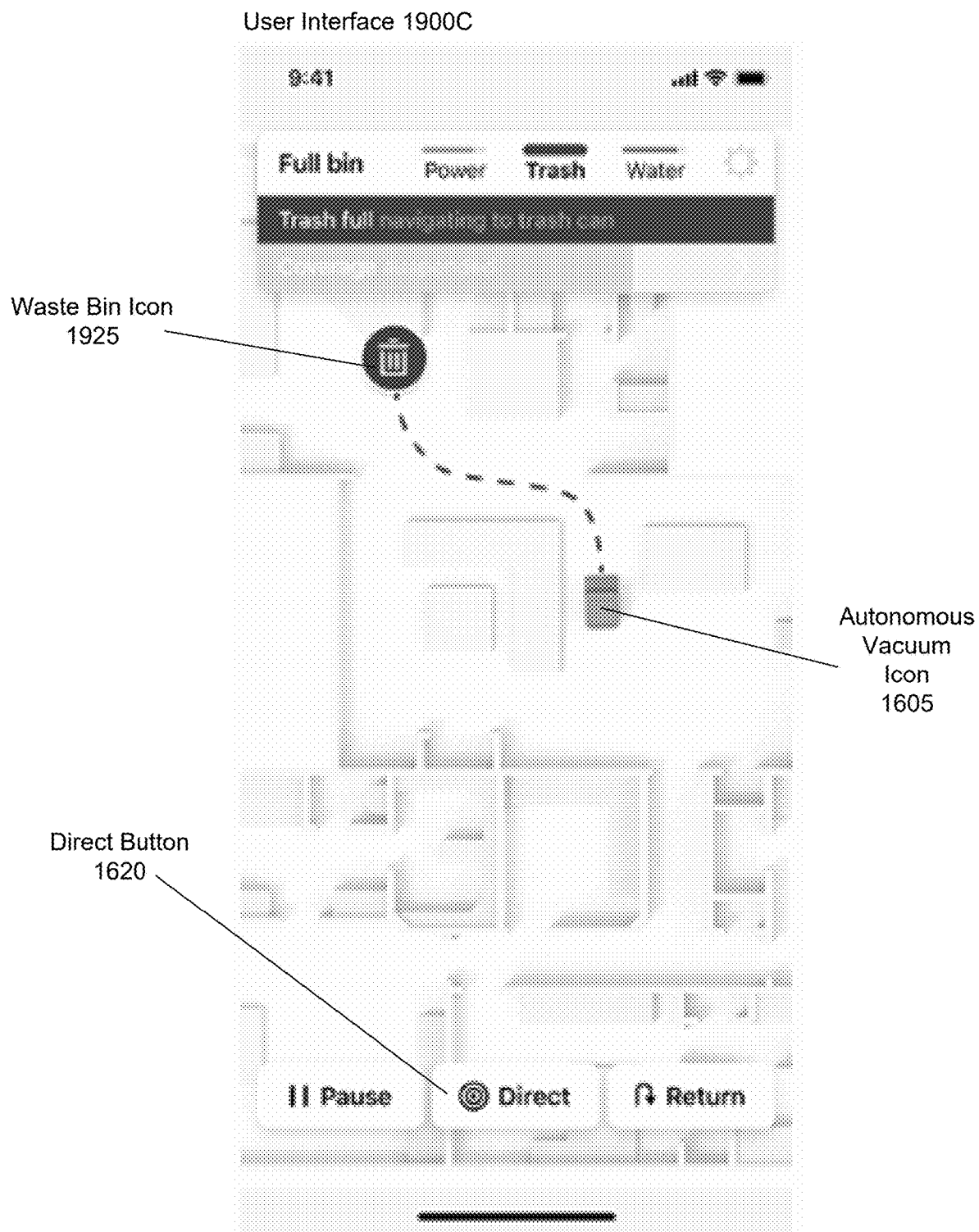
FIG. 19C illustrates a waste bin icon in a user interface, according to one example embodiment.
Figure 19D:
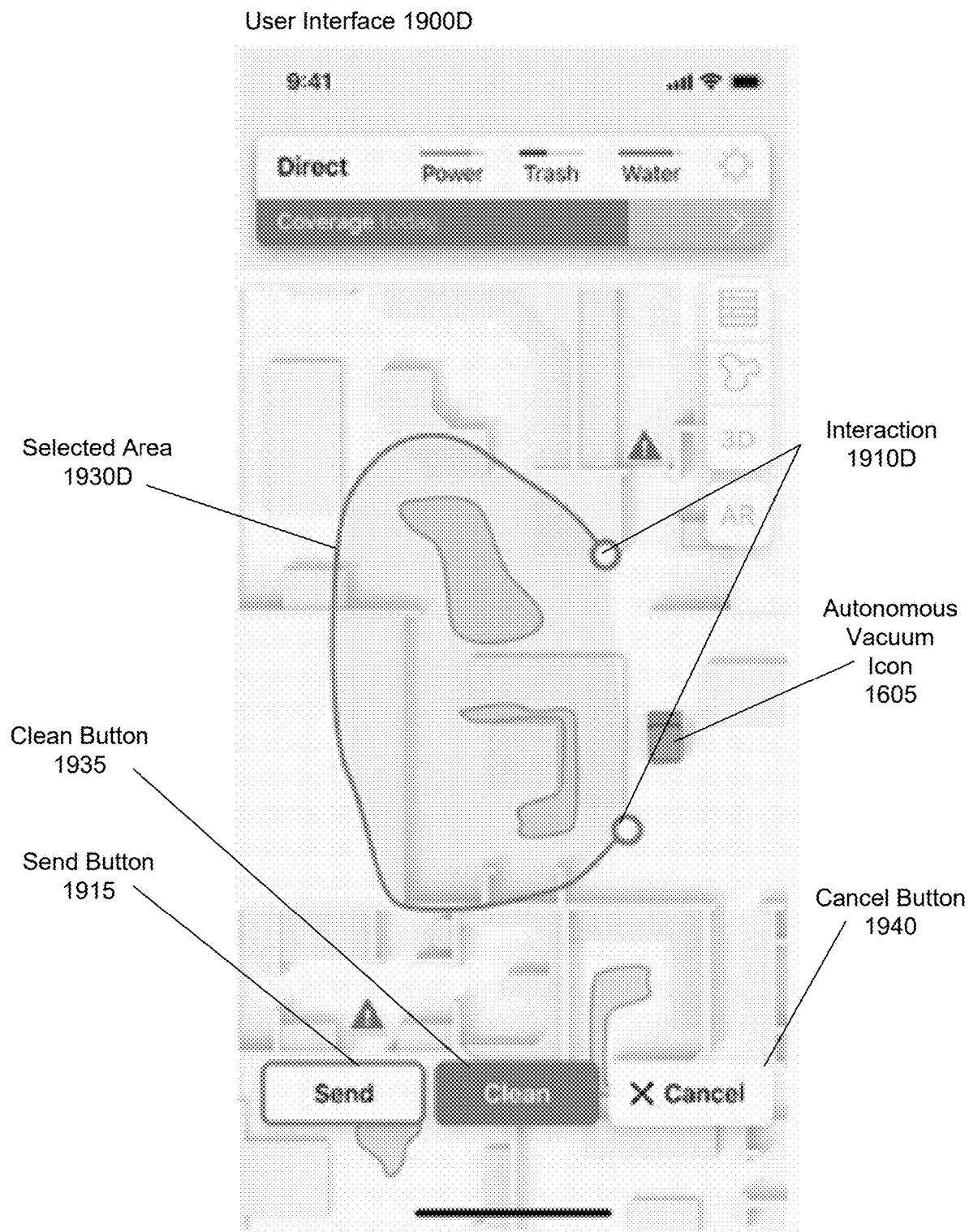
FIG. 19D illustrates a selected area in a user interface, according to one example embodiment.

Further interactions with the user interface 1900 may cause the autonomous vacuum 100 to travel through the environment to specific locations. For example, as shown in FIG. 19C, upon receiving an interaction with a waste bin icon 1925 via the user interface 1900C, which represents the location of the waste bin in the environment, the autonomous vacuum 100 may travel to the waste bin for emptying. In another example, shown in FIG. 19D, an interaction may indicate a selected area 1930D for the autonomous vacuum 100 to clean. The selected area may be "free drawn" by a user via the user interface 1900D (e.g., the user may select an area by circling or otherwise outlining an area within the rendering). After the user interface 1900D has received the interaction 1910D, an interaction with the send button 1915 sends the autonomous vacuum 100 to the area in the environment corresponding to the selected area 1930D, and an interaction with the clean button 1935 sends the autonomous vacuum 100 to the area in the environment corresponding to the selected area 1930D to clean the area. An interaction with the cancel button 1940 cancels the interaction 1910D.

Figure 19E:
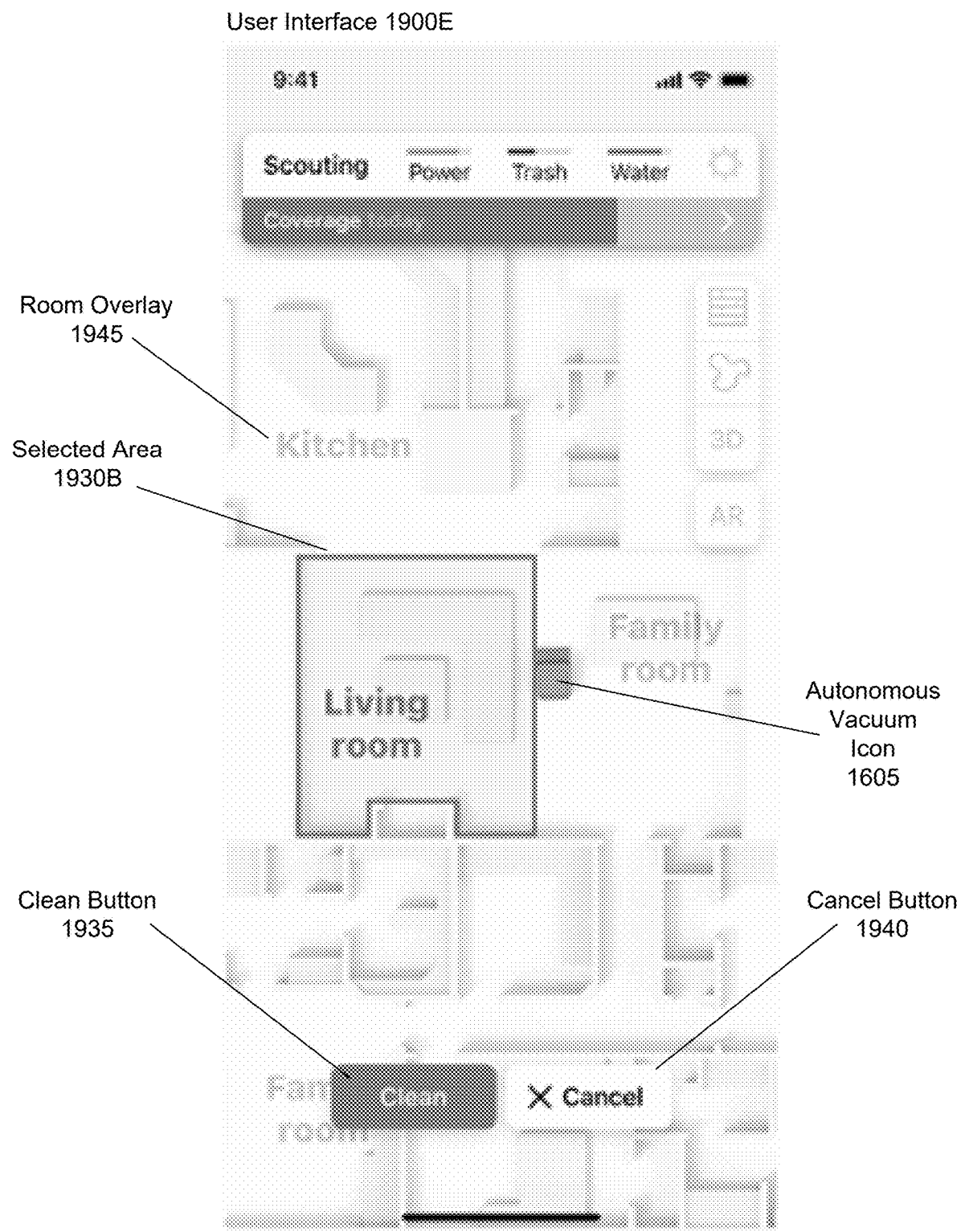
FIG. 19E illustrates a selected area in a user interface including a rendering with room overlays, according to one example embodiment.

In some embodiments, the user interface 1900E may display on a screen the rendering of the environment with room overlays 1945, as shown in FIG. 19E. In this embodiment, the mapping module 500 may determine locations of typical rooms (e.g., kitchen, living room, etc.) based on barriers within the environment and label the rendering in the user interface 1900E with room overlays indicating which areas correspond to typical rooms. Alternatively, a user may input the room overlays for the rendering via the user interface 1900E. A user may interact with the user interface 1900E to pick a selected area 1930B for the autonomous vacuum 100 to clean.

Figure 20A:
FIG. 20A illustrates a user interface depicting instructions for giving an autonomous vacuum voice commands, according to one example embodiment.

FIG. 20A illustrates a user interface 20000A for display on a screen depicting instructions for giving the autonomous vacuum voice commands, according to one example embodiment. As indicated in the user interface 2000A, a user may speak voice commands to the autonomous vacuum 100. For example, a user may direct a voice command in the direction of the autonomous vacuum 100 stating "Go to the waste bin," and the autonomous vacuum 100 will, in response, traverse the environment to travel to the waste bin. In another example, a user may direct the autonomous vacuum 100 with a command, e.g., "Come to me," and if the autonomous vacuum 100 does not detect the user in visual data or directional audio data, the autonomous vacuum 100 may navigate to a location of a client device displaying the user interface (e.g., the approximate location of the user) or may use beam-forming with one or more microphones 430 to determine a location of the user to navigate to. In some embodiments, the user may also give visual commands to the autonomous vacuum 100, such as pointing to a mess or may enter commands via the user interface.

Figure 20B:
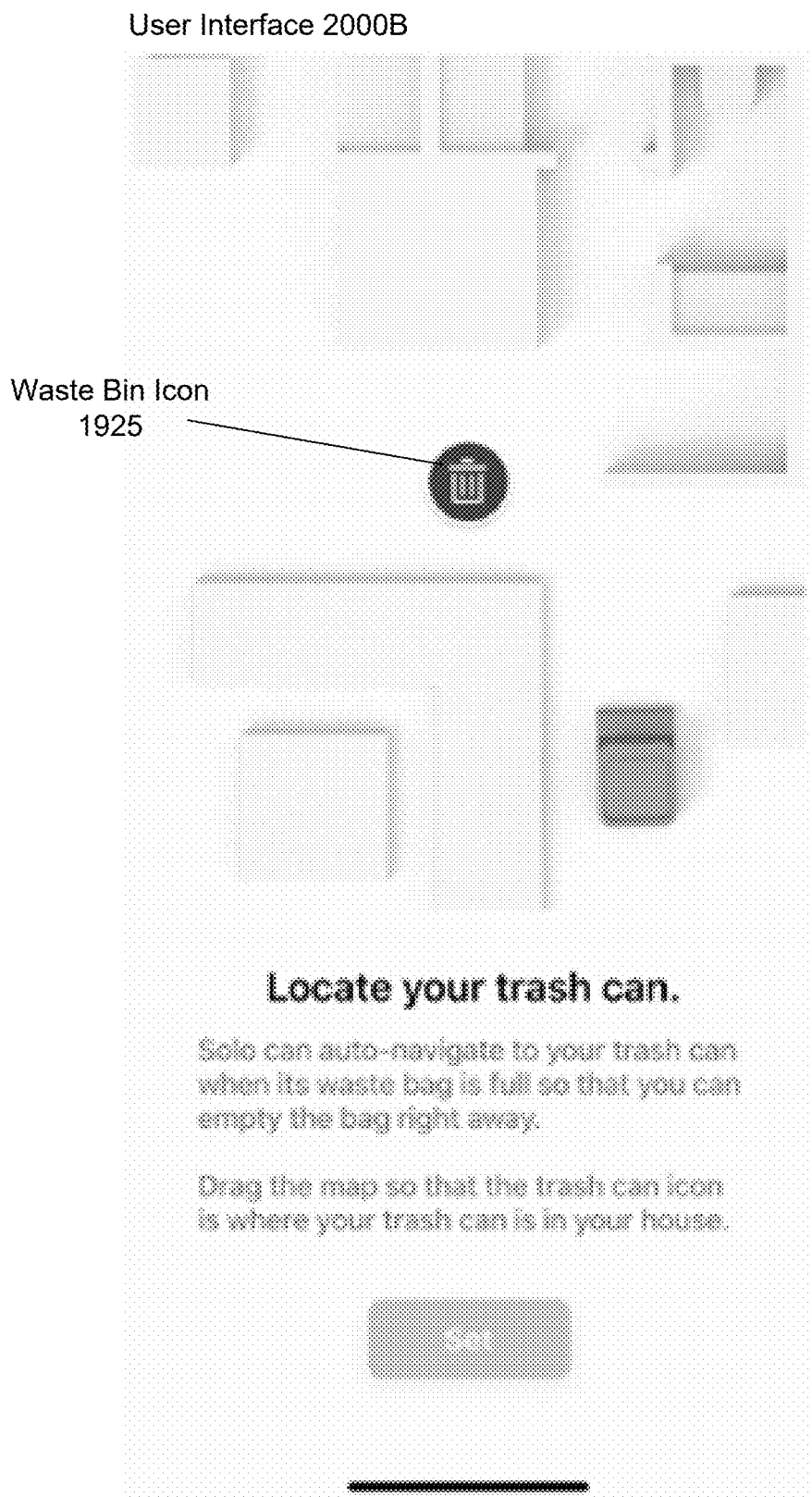
FIG. 20B illustrates a user interface depicting instructions for setting a waste bin icon in a rendering of an environment, according to one example embodiment.

FIG. 20B illustrates a user interface 2000B for display on a screen depicting instructions for setting the waste bin icon 1925 in the rendering, according to one example embodiment. A user may interact with the user interface 2000B to move the waste button icon 1925 in the rendering to a location corresponding to the location of the waste bin in the environment. The autonomous vacuum 100 may move to the location corresponding to the waste bin when the waste bag 100 is full, such that a user may efficiently empty the waste bag 110.

Figure 20C:
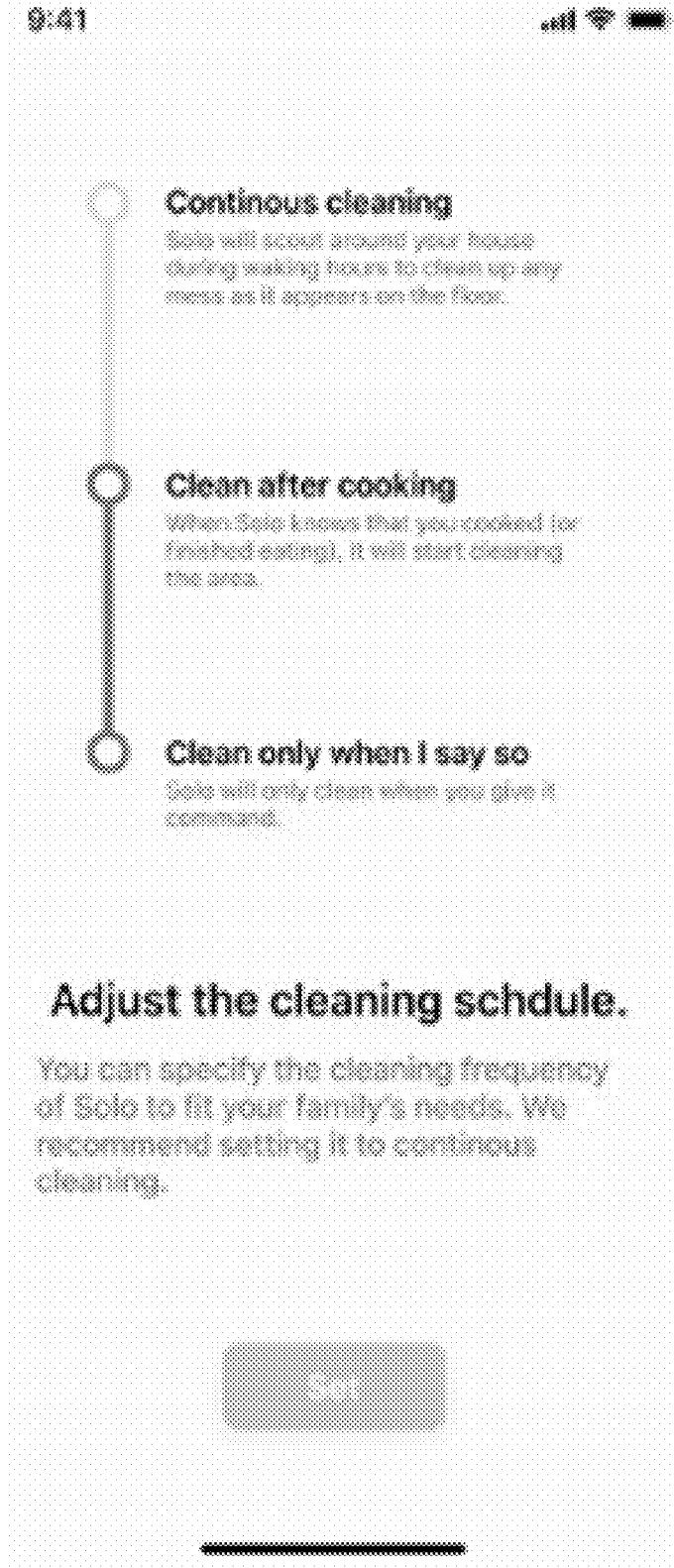
FIG. 20C illustrates a user interface depicting instructions for adjusting a cleaning schedule of an autonomous vacuum, according to one example embodiment.

FIG. 20C illustrates a user interface 2000C for display on a screen depicting instructions for adjusting a cleaning schedule of an autonomous vacuum, according to one example embodiment. In this embodiment, the user interface 2000C displays instructions describing how a user may set a cleaning schedule for the autonomous vacuum 100 via the user interface 2000C, such that the autonomous vacuum 100 may continuously scout in the environment, clean after cooking has occurred in the environment, or clean only when directly instructed. In other embodiments, a user may select specific cleaning times via the user interface 100.

Figure 21:
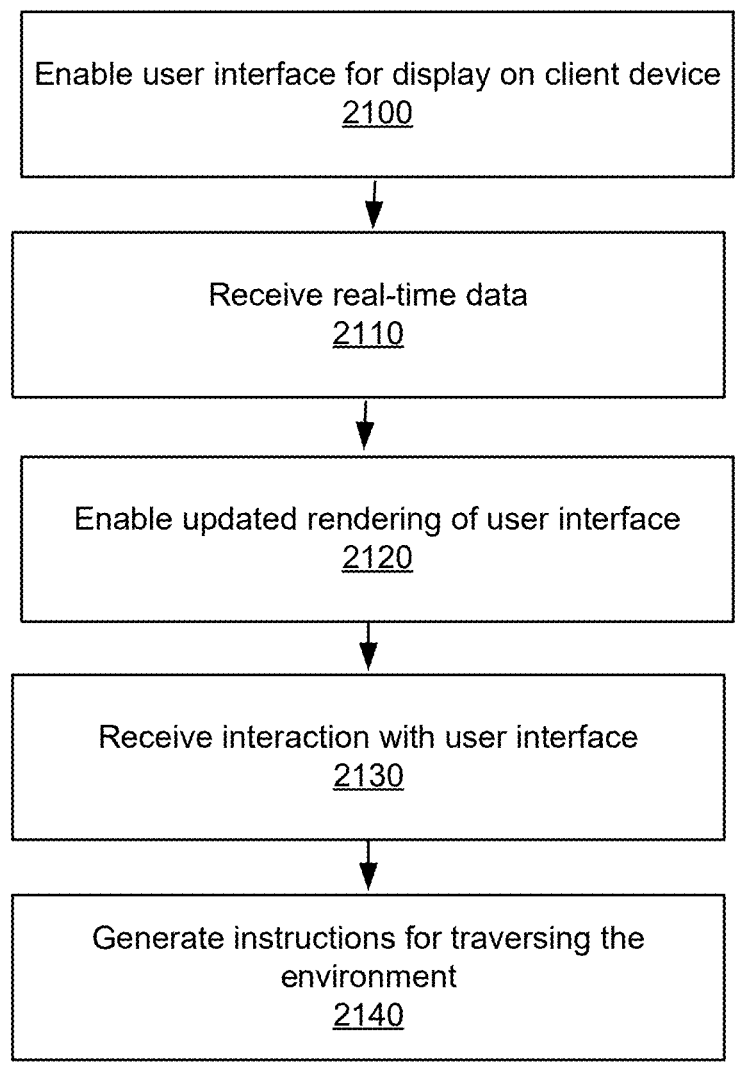
FIG. 21 is a flowchart illustrating an example process for rendering a user interface for an autonomous vacuum traversing a physical environment, according to one example embodiment.

FIG. 21 is a flowchart illustrating an example process for rendering a user interface for display on a screen according to one example embodiment. The process for rendering corresponds to an autonomous vacuum 100 traversing a physical environment. In some embodiments, the autonomous vacuum 100 may transmit sensor data (which may include some or all of the data from the sensor system 175 components) to the client device 410 and/or a cloud computing system, which further processes the received data to enable the user interface for display on the client device 410. Enabling may include generating data and/or instructions that are provided to the client device 410 such that the client device 410 may process the received data and/or instructions to render the user interface on a screen using the information within. The user interface comprises a virtual rendering of the physical environment, and the virtual rendering includes a current location of the autonomous vacuum 100 in the physical environment. The user interface is described in detail in FIGS. 16-20.

The processor 470 receives 2110 real-time data describing the physical environment from the sensor system 175. The data may be used to enable 2120, for display on the client device 410, an updated rendering of the user interface depicting entities indicative of activities and messes in the environment. The entities may include a mess in the environment at a first location, as specified by the real-time data, a portion of a historical route 1635 of the autonomous vacuum 100, an area of the physical environment detected as clean by the sensor system 175, and/or an obstacle in the environment at a second location.

The processor 470 receives 2130, from the client device 410, an interaction with the user interface rendered for display on the client device 410. The interaction may correspond to an action for the autonomous vacuum 100 to take relative to the physical environment, such as cleaning, scouting, or moving to a location. Examples of interactions include selecting the direct button 1620, scrolling the time scroll bar 1815, or toggling the obstacle toggle 1740. The processor 470 generates 2140 instructions for the autonomous vacuum 100 to traverse the physical environment based on the interaction.

Example Mop Roller

Figure 22:
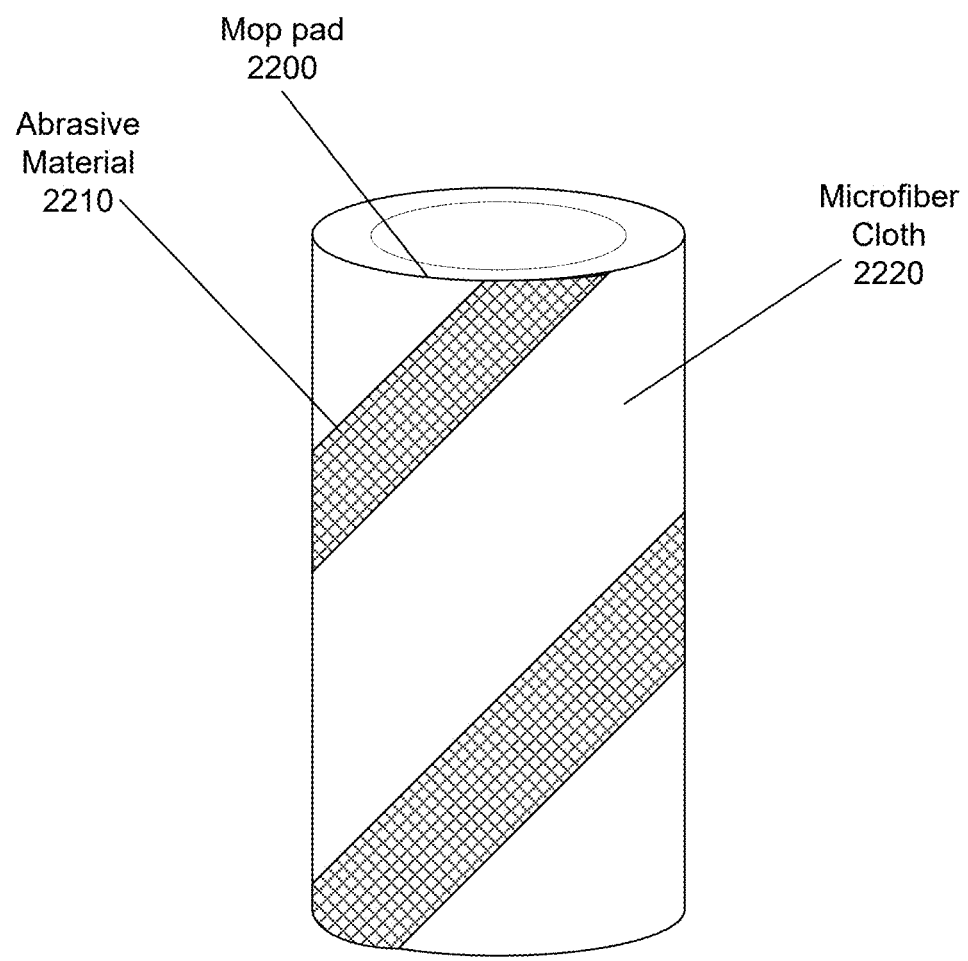
FIG. 22 is a mop roller, according to one example embodiment.

FIG. 22 is a mop roller 385, according to one example embodiment. The mop roller 385 may be located in the cleaning head 105 of the autonomous vacuum 100. The mop roller is a cylindrical structure and may have diagonal strips of alternating microfiber cloth 2200 (or other absorbent material) and abrasive (or scrubbing) material 2210 attached around the outer surface of the cylindrical structure (e.g., in a diagonal configuration). Collectively, the microfiber cloth 2220 and the abrasive material may be referred to as the mop pad. In other embodiments, the mop pad may only comprise absorbent material. The mop pad may be a unitary constructed piece that attaches to a cylindrical roller (not shown) that is the cleaning head 105. It is noted that the cleaning head 105 may be a cylindrical structure that is rotatable by the autonomous vacuum 100. The mop pad also may be a unitary constructed piece that is removably attached with the cleaning head 105.

The microfiber cloth 2220 absorbs liquid and may be used to scrub surfaces to remove messes such as dirt and debris. The abrasive material 2210 is unable to retain water but may be used to effectively scrub tough stains, due to its resistance to deformation. The abrasive material 2210 may be scouring pads or nylon bristles. Together, the microfiber cloth 2220 and abrasive material 2210 allow the mop roller to both absorb liquid mess and effectively scrub stains.

The mop roller 385 uses the mop pad to scrub surfaces to remove messes and stains. The mop roller 385 may be able to remove "light" messes (e.g. particulate matter such as loose dirt) by having the autonomous vacuum 100 pass over the light stain once, whereas the mop roller may need to pass over "tough" messes (e.g., stains that are difficult to clean such as coffee or ketchup spills) multiple times. In some embodiments, the autonomous vacuum 100 may leverage the sensor system 175 to determine how many times to pass the mop roller 385 over a mess to remove it.

The autonomous vacuum 100 uses contact between the mop roller 385 and the floor of the environment to effectively clean the floor. In particular, the autonomous vacuum 100 may create high friction contact between the mop roller 385 and surface to fully remove a mess, which may require a threshold pressure exerted by the mop roller 385 to achieve. To ensure that the mop roller 385 exerts at least the threshold pressure when cleaning, the mop roller 385 may be housed in a heavy mopping system mounted to the autonomous vacuum 100 via a suspension system that allows a vertical degree of freedom. This mounting results in rotational variance of the mopping system, which may affect the cleaning efficacy and water uptake of the autonomous vacuum 100 when mopping. For instance, water uptake of the autonomous vacuum 100 is low when there is high compression in the mop pad, causing water to squeeze out of the mop pad. Furthermore, high friction between the mop pad and the floor improves cleaning efficacy.

The rotational variance of the mopping system described herein results in a plurality of effects. For example, when the autonomous vacuum 100 tilts such that the mopping system is lifted, mopping results in low cleaning efficacy but high water uptake. In another example, when the autonomous vacuum 100 tilts such that the mopping system is pushed into the ground, mopping results in high cleaning efficacy but low water uptake. In some embodiments, to leverage these effects, the autonomous vacuum 100 may lift the mopping system when moving forward and push the mopping system into the floor when moving backwards. Thus, the autonomous vacuum 100 may move forward to clean light messes and move backwards to clean tough messes, followed by moving forward to remove excess liquid from the floor.

Figure 23A:
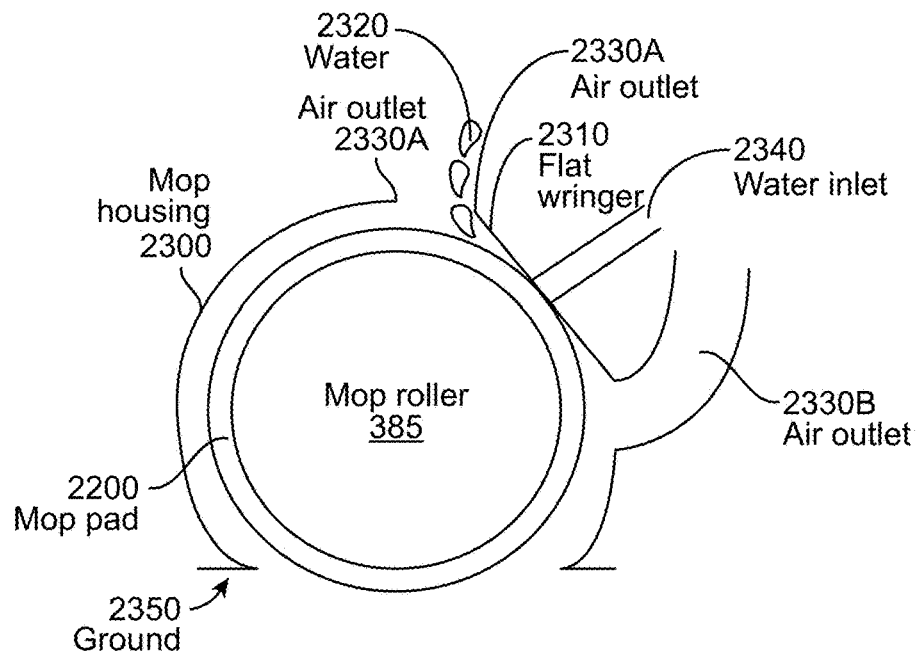
FIG. 23A illustrates a mop roller being wrung, according to one example embodiment.

FIG. 23A illustrates operation of a mop roller 385 according to one example embodiment. In this figure, the mop roller 385 is being wrung as the cleaning head 105 rotates, for example, along a surface. As the autonomous vacuum 100 moves around an environment, the autonomous vacuum 100 presses the mop pad 2200 of the mop roller 385 to the ground 2350 (or surface or floor) to pick up dust and dirt such that the mop pad 2200 is in contact with the ground 2350 along the length of the cylindrical structure. The mop pad 2200 rotates on an axis parallel to the ground 2350 and perpendicular to a direction of motion of the autonomous vacuum 100, and the autonomous vacuum may release water through a water inlet 2340 onto the mop pad 2200 for cleaning. The water 2320 acts as a solvent for dirt and stains on the ground 2350.

When cleaning with water 2320 or another liquid, the mop pad 2200 will eventually reach a saturation point at which it will only spread around dirt and dust without being cleaned, which may require user interaction. To combat this effect, the autonomous vacuum 100 may self-wring the mop pad 2200 of the mop roller 385. The mop roller 385 is enclosed in a mop housing 2300 with a flat wringer. The flat wringer 2310 is a substantially planar plate that sits perpendicular to the radius of the mop roller 385. The planar plate may be smooth or textured. The flat wringer 2310 interferes with the mop pad 2200 in that it creates a friction surface relative to the mop pad 2200. While abutted against the mop roller 385, as shown in FIG. 23, the flat wringer 2310 extends slightly out from its contact point with the mop roller 385 to prevent the mop roller 385 from catching on the flat wringer 2310. Further, the flat wringer 2310 requires less torque to wring the mop pad 2200 than a wringer that is triangular or rectangular, and the mop roller 385 can rotate in either direction to wring the mop pad 2200, giving the autonomous vacuum 100 more flexibility for wringing. This structural configuration wrings water 2320 or other liquids from the mop pad 2200 as the mop roller 385 rotates.

The flat wringer 2310 includes a water inlet 2340 that allows water 2320 to flow through the center of the flat wringer 2310 and exit onto a compressed portion of the mop pad 2200. In some embodiments, the water inlet 2340 may expel other liquids, such as cleaning solutions, onto the mop pad 2200. The flat wringer 2310 is positioned to exert pressure on the mop pad 2200 of the mop roller 385 such that when the mop roller 385 spins against the flat wringer 2310, water 2320 and dissolved dirt captured by the mop pad 2200 are wrung from the mop pad 2200 and sucked into air outlets 2330 on either side of the flat wringer 2310. The air outlets 2330 may be connected to the vacuum pump 115, which draws air and liquids through the air outlets 2330. The positioning of the air outlets 2330 on either side of the flat wringer 2310 allow the air outlets 2330 to capture water 2320 expelled from the mop pad 2200 regardless of the direction the mop roller 385 is spinning. Wringing the mop pad 2200 with this combination of flat wringer 2310, air outlets 2330, and water inlet 2340 keeps the mop pad 2200 clean of dirt and dust and extends the amount of time between necessary user cleanings of the mop pad 2200.

Figure 23B:
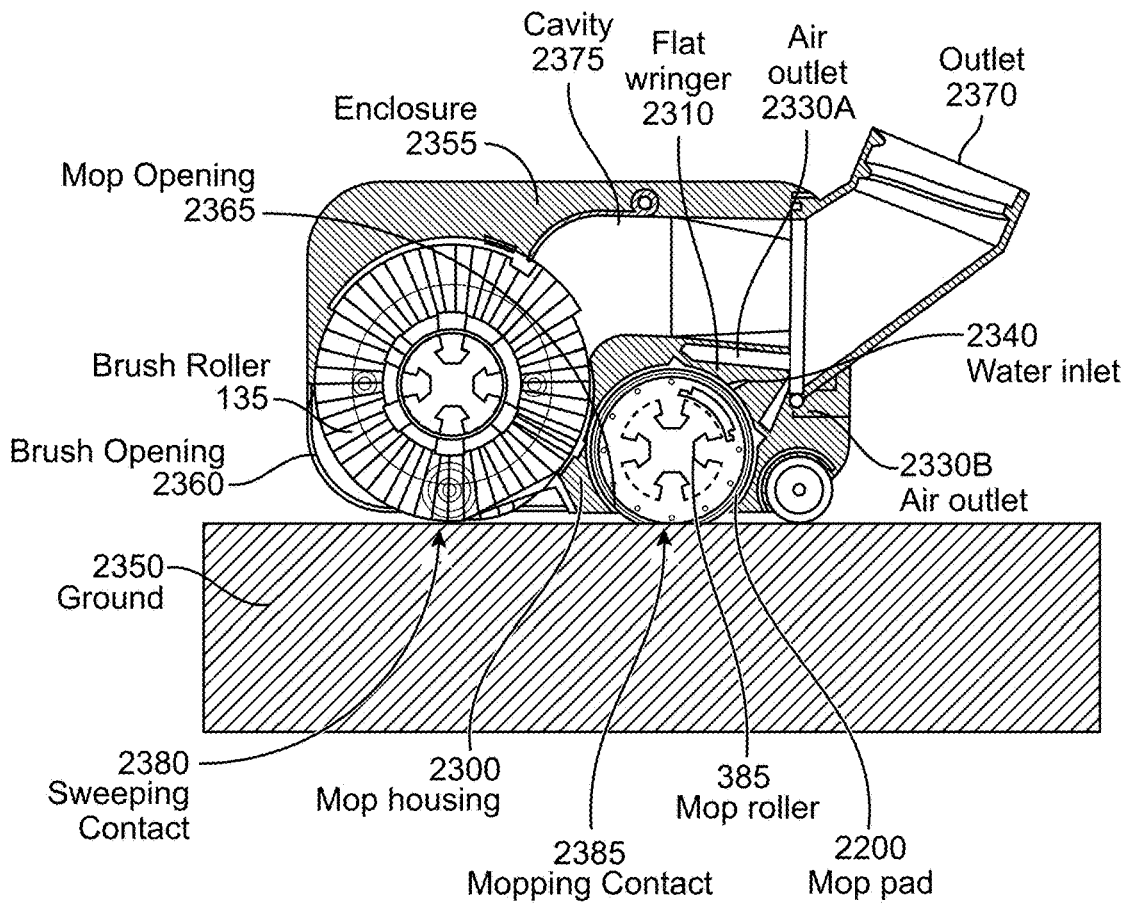
FIG. 23B shows the cleaning head of the autonomous vacuum including the mop roller, according to one embodiment.

FIG. 23B shows the cleaning head 105 of the autonomous vacuum 100 including the mop roller 385, according to one embodiment. The cleaning head comprises an enclosure 2355 that houses the brush roller 135 and the mop roller 385. The enclosure 2355 comprises a first interior opposite a second interior, a front interior opposite a back interior, and a top interior opposite the ground 2350 connecting the front interior, back interior, first interior, and second interior to form a cavity 2375. The enclosure 2355 further comprises one or more openings. In some embodiments, the one or more openings may include a brush opening 2360 partially opposite the top interior and adjacent to the front interior, a mop opening 2365 opposite the top interior and at a back portion of the enclosure, and one or more outlets 2370 on the back interior. The outlets 2370 may connect the cavity 2375 to the solvent pump 120 (or solvent volume 340), an inlet to the waste bag 110 (or waste container 200 or waste volume 350), and/or the vacuum pump 115.

The brush roller 135 sits at the front side of the enclosure 2355 (e.g., adjacent to the front interior) such that a first portion of the brush roller is exposed to the cavity 2375 while a second portion of the brush roller 135 is externally exposed at the brush opening 2360, allowing the brush roller 135 to make sweeping contact 2380 with the ground 2350. The mop roller 385 sits behind the brush roller 135 in the enclosure 2355 adjacent to the back interior and below the cavity 2375. A lower portion of the mop roller 385 is externally exposed at the mop opening 2365 such that the mop roller 385 may make mopping contact 2385 with the ground 2350. A first end and second end of the brush roller 135 connect to the first interior and the second interior, respectively, of the enclosure 2355. A first end and second end of the mop roller 385 connect to the first interior and second interior, respectively, of the enclosure 2355. The connections between the brush roller 135 and mop roller 385 allow the brush roller 135 and mop roller 385 to move in parallel with the enclosure 2355 when the actuator moves the enclosure 2355 vertically and/or tilts the enclosure 2355 forwards/backwards.

The actuator of the actuator assembly 125 connects at the back of the cleaning head 105 to one or more four-bar linkages such that the actuator can control vertical and rotational movement of the cleaning head 105 (e.g., the enclosure 2355 and its contents, including the cleaning rollers) by moving the one or more four-bar linkages. In particular, a motor of the actuator may be mounted on the autonomous vacuum 100 (e.g., the base or a component within the base) and a shaft of the actuator may be connected to the cleaning head 105 or a translating end of the one or more four-bar linkages. The cleaning head may be screwed to the one or more four-bar linkages that connects the cleaning head 105 to the base 360 of the autonomous vacuum 100, allowing the cleaning head to be removed and replaced if the brush roller 135, mop roller 385, or any other component of the cleaning head 105 needs to be replaced over time. Further, the controller of the actuator assembly 125 connects to each of the first end and the second end of each of the brush roller 135 and mop roller 385 to control rotation when addressing cleaning tasks in the environment. For example, when the autonomous vacuum 100 moves to a mess that requires cleaning by the mop roller 385, the controller may activate the motor that causes the mop roller 385 to rotate. In another example, when the autonomous vacuum 100 moves to a mess that requires cleaning by the brush roller 135, the controller may deactivate the motor that causes rotation of the mop roller 385 and activate the motor that causes the brush roller 135 to rotate. The controller may also attach the ends of the cleaning rollers to the enclosure 2355.

Figure 23C:
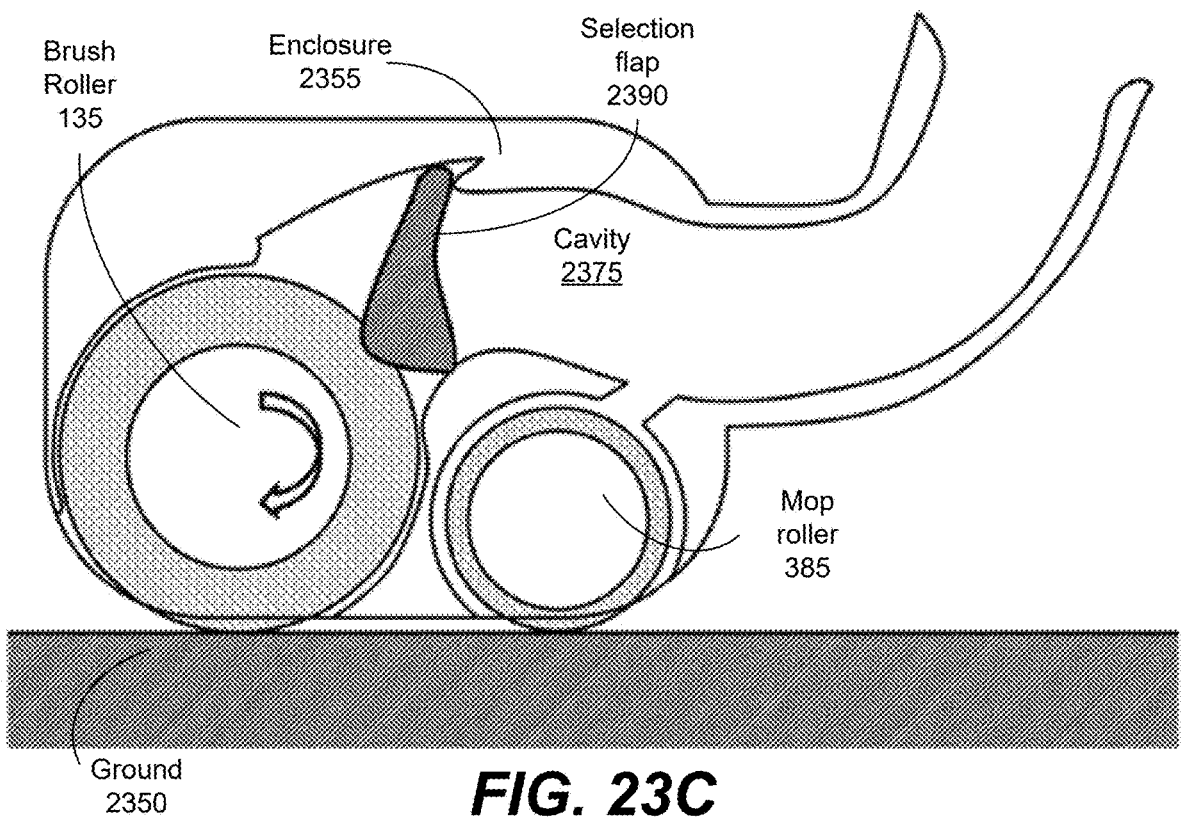
FIG. 23C shows a selection flap in an upward position, according to one embodiment.
Figure 23D:
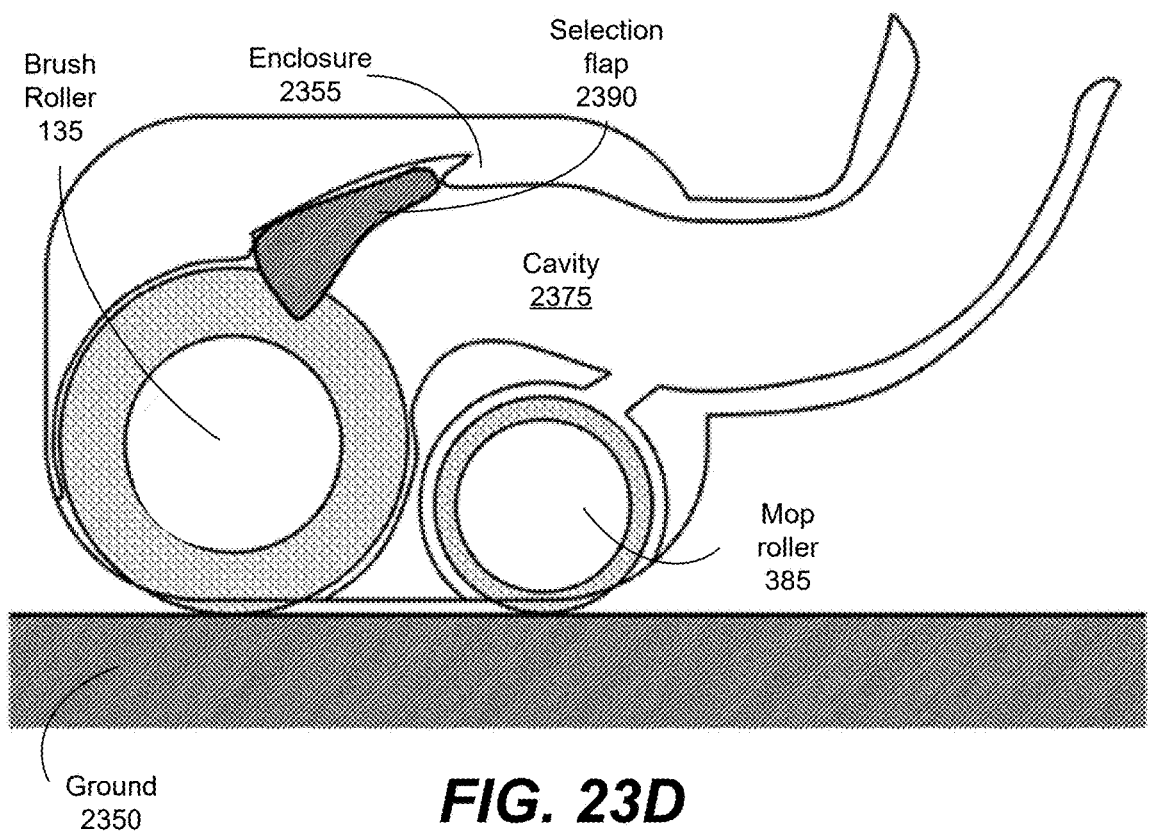
FIG. 23D shows a selection flap in a downward position, according to one embodiment.

FIGS. 23C-D illustrate an example selection flap 2390 of the cleaning head 105. The selection flap 2390 is an elongated piece of material that is hinged at a top portion of the cavity 2375. The selection flap 2390 may move to alter the size of the cavity 2375. In particular, to clean different mess types efficiently, brush roller 135 and mop roller 385 need the cavity 2375 to be differently sized, which may be accomplished with the selection flap 2390. To clean liquid messes with the mop roller 385, the cavity 2375 needs to be smaller to allow for quick movement of liquid wastes through, which is difficult when the cavity 2375 is large. Thus, the selection flap 2390 may be placed in a downward position to clean such messes, shown in FIG. 23D, which decreases the size of the cavity 2375. In the downward position, the selection flap 2390 extends over a portion of the brush roller 135 to reduce the size of the cavity 2375. Alternatively, to clean messes with the brush roller 135, the cavity 2375 needs to have a high clearance to capture waste that is large in size (e.g., popcorn, almonds, pebbles, etc.). To accomplish this, the selection flap 2390 may be placed in an upward position, where the selection flap 2390 extends over a top portion of the cavity 2375. When the selection flap 2390 is in the upward position, the cavity 2375 is large enough for such waste to pass through on its way to the waste bag 110.

The autonomous vacuum 100 may use rotation of the brush roller 135 to move the selection flap 2390 between the upward position and downward position. The selection flap may be placed in the downward position by rotating the brush roller 135 backward (e.g., clockwise in FIG. 23C), which uses nominal interference between bristles on the brush roller 135 and the selection flap 2390. The autonomous vacuum 100 may use the same nominal interference to place the selection flap 2390 in the upward position, shown in FIG. 23D, by rotating the brush roller 135 forward (e.g., counterclockwise in FIG. 23D). Thus, when the autonomous vacuum 100 detects messes in the environment, the autonomous vacuum 100 may use rotation of the brush roller 135 to control placement of the selection flap 2390 to optimize the size of the cavity 2375.

Figure 23E:
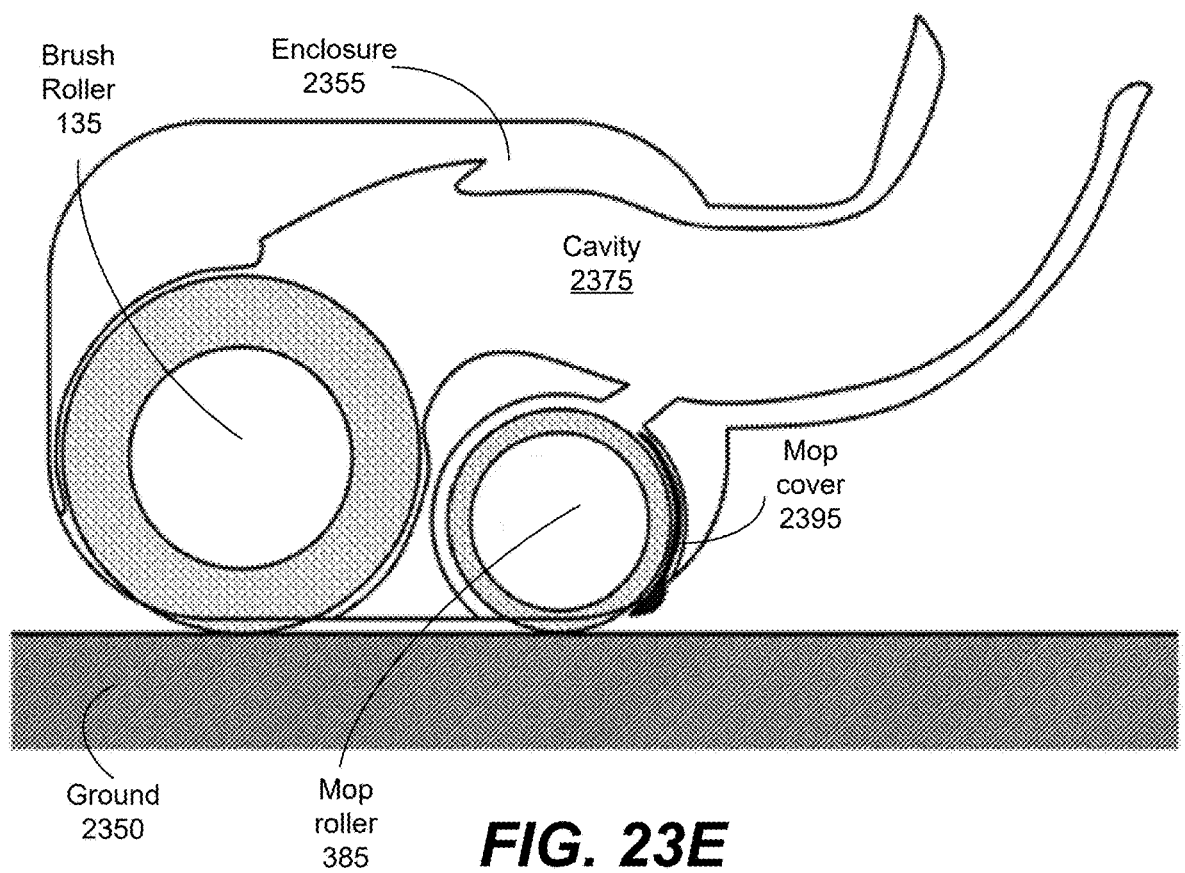
FIG. 23E shows a mop cover not covering a mop roller, according to one embodiment.
Figure 23F:
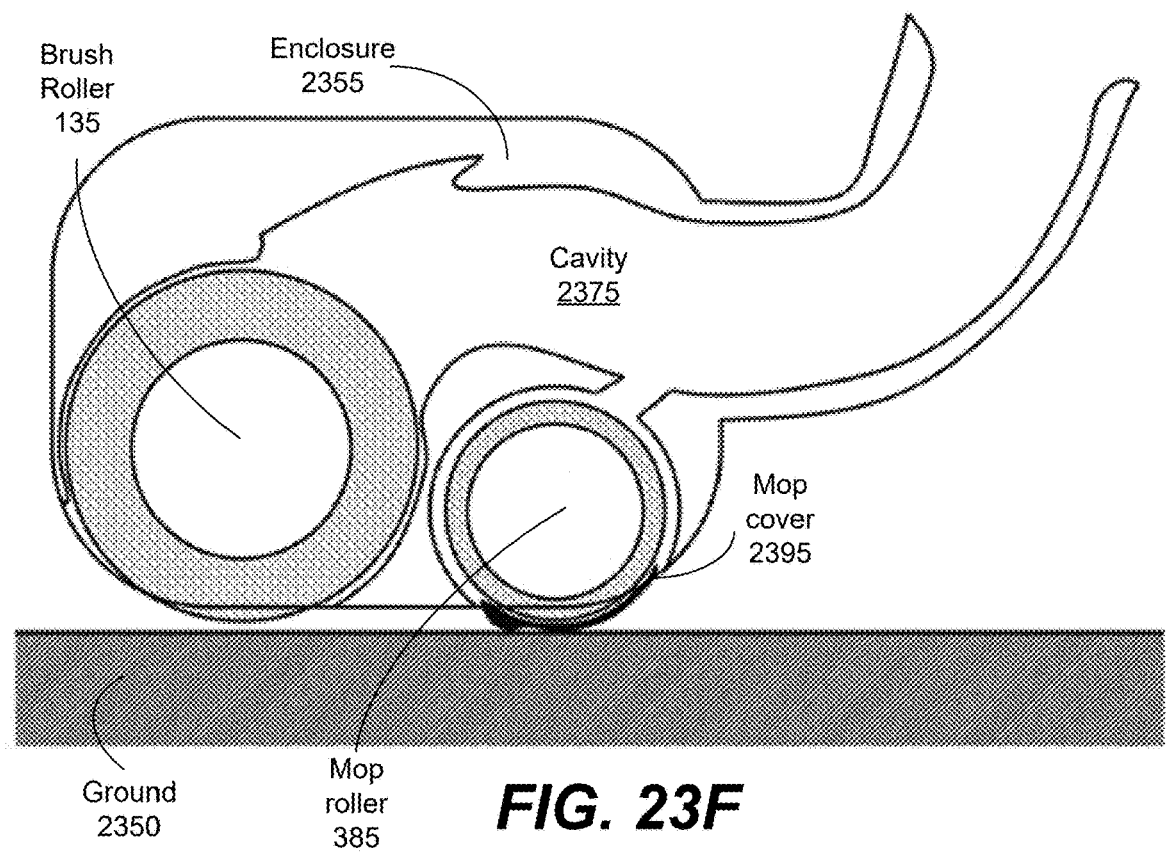
FIG. 23F shows a mop cover covering a mop roller, according to one embodiment

FIGS. 23E-F show a mop cover 2395 of the cleaning head 105. The mop roller 385 may be covered or uncovered by a mop cover 2395. The mop cover 2395 is a partial cylindrical shell rotatably positioned around an outer surface of the mop roller 385. The mop roller 385 may move the mop cover 2395 by rotating to cover or uncover the mop roller 385 with the mop cover 2395. For instance, if the mop roller 385 rotates forward (i.e., counterclockwise in FIG. 23E), the mop cover 2395 will uncover the mop roller 385 and end up in the position shown in FIG. 23E. When uncovered, the mop roller 385 may still receive water via the water inlet 2340 and may be in contact with the ground 2350. Alternatively, if the mop roller 385 rotates backward (i.e., clockwise in FIG. 23F), the mop cover 2395 will cover a portion of the mop roller that was externally exposed and end up in the position shown in FIG. 23F. This shields the mop roller 385 from the ground 2350, and the mop cover 2395 is configured to stay engaged as the autonomous vacuum 100 moves over obstacles and one or more surface types.

The actuator assembly 125 may use the controller to control rotation of the mop roller 385 to cover/uncover the mop roller 385 with the mop cover 2395 based on the environment around the autonomous vacuum 100. For example, if the autonomous vacuum 100 is about to move over carpet (or another surface type that the mop roller 385 should not be used on), the actuator assembly 125 may rotate the mop roller 385 to cover the mop roller 385 with the mop cover 2395. The actuator assembly 125 may also cover the mop roller 385 when the autonomous vacuum 100 requires more mobility to move through the environment, such as when moving over an obstacle.

Figure 24A:
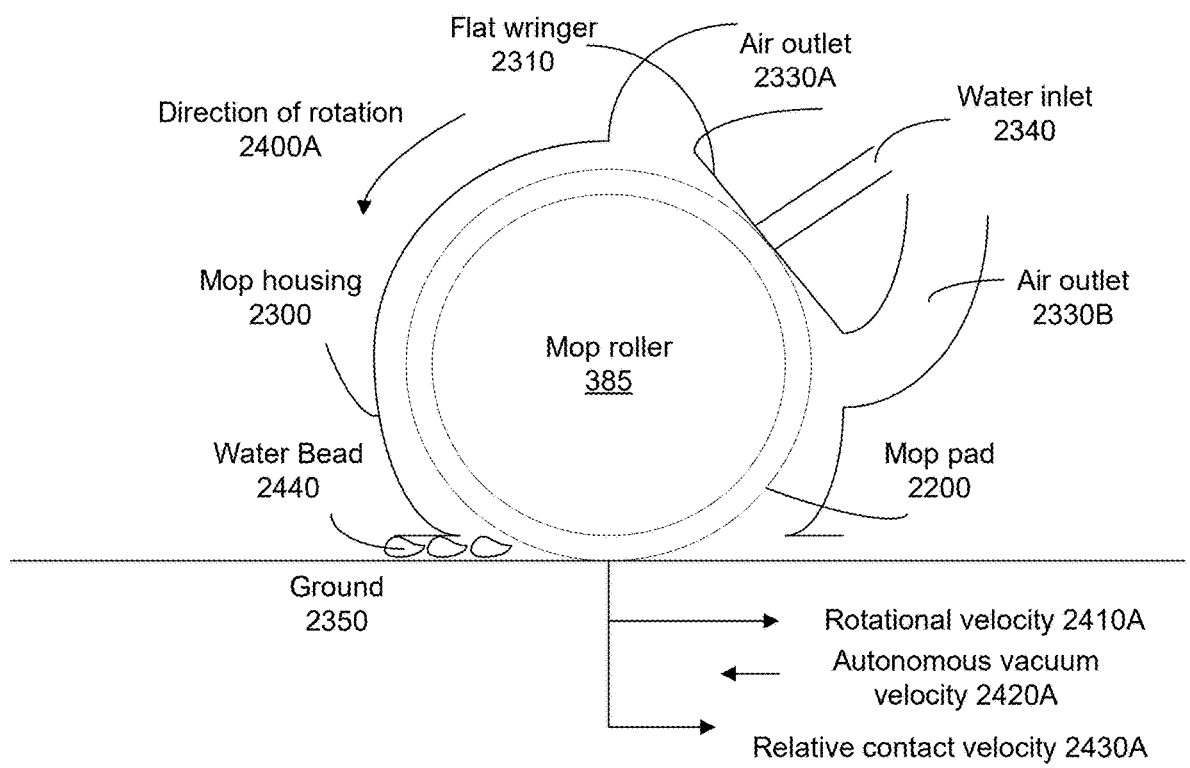
FIG. 24A illustrates a mop roller rotating counterclockwise as the autonomous vacuum moves forward, according to one embodiment.

FIG. 24A illustrates the mop roller 385 rotating counterclockwise as the autonomous vacuum 100 moves forward, according to one example embodiment. As shown in FIG. 24, when the mop roller 385 has a rotational velocity 2410A in with a direction of rotation 2400A opposite of the autonomous vacuum velocity 2420A, the cleaning effectiveness of the mop roller 385 is decreased. In particular, in this embodiment, the relative contact velocity 2430A of the mop roller 385 with the ground 2350 is reduced due to the opposing directions of the rotational velocity 2410A of the mop roller 385 and the autonomous vacuum velocity 2420A. This decreases the cleaning effectiveness of the mop roller 385 by reducing its scrubbing ability on the ground 2350 but increases the mop roller's 385 ability to pick up water 2320, seen in the water beading 2440 that forms at the front of the mop roller 385 such that the mop roller 385 is always moving towards the bead 385.

Figure 24B:
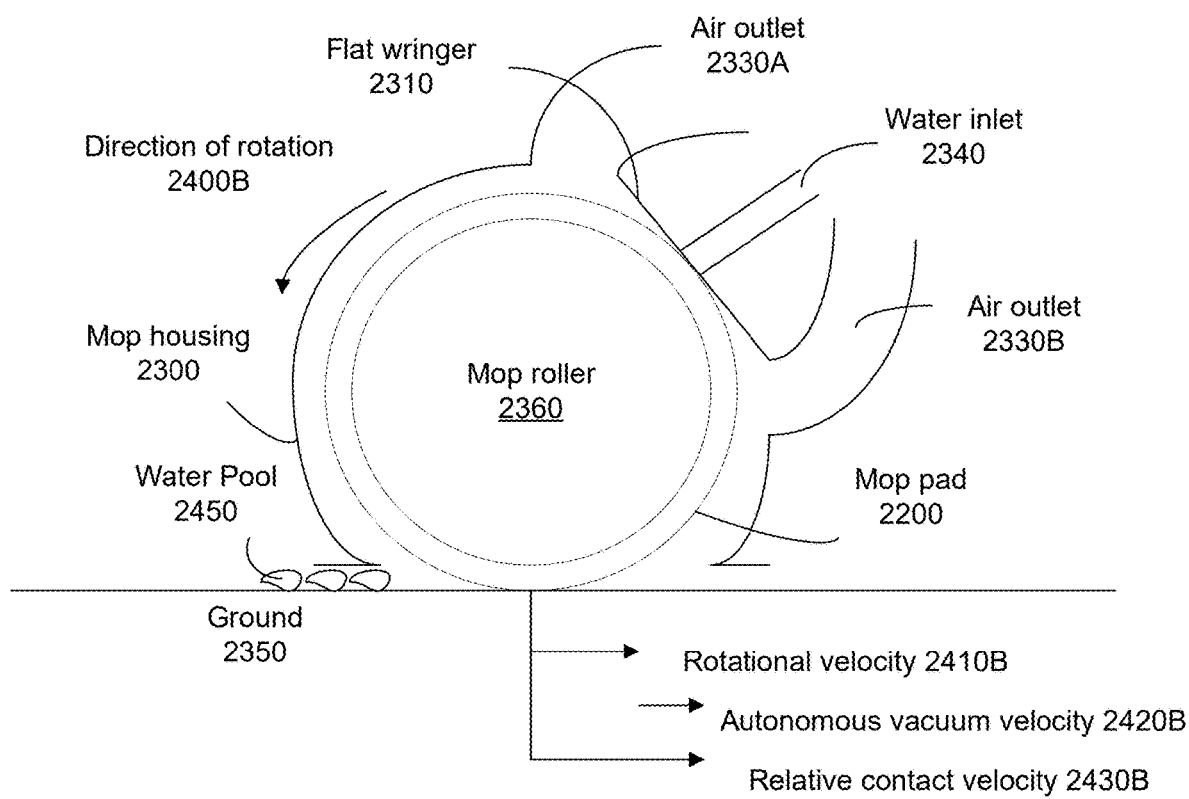
FIG. 24B illustrates a mop roller rotating counterclockwise as the autonomous vacuum moves backward, according to one embodiment.

FIG. 24B illustrates a mop roller 385 rotating counterclockwise as the autonomous vacuum moves backward, according to one example embodiment. In this embodiment, the direction of the rotational velocity 2410B of the mop roller 385 and the direction of the autonomous vacuum velocity 2420B is the same, resulting in a greater relative contact velocity 2430B than that shown in FIG. 24. The greater relative contact velocity 2430B increases the cleaning effectiveness of the mop roller 385 by increasing its scrubbing ability on the ground 2350 but decreases its ability to pick up water 2320, as shown by the water pool that forms at the front of the mop roller 385 such that the mop roller 385 is always moving away from bead.

The embodiments shown in FIGS. 24A and 24B may be used sequentially to effectively clean an environment. To remove dirt and dust from the 2350, the autonomous vacuum 100 may employ the embodiment illustrated ground in FIG. 24A where the mop roller rotates in the opposite direction as the autonomous vacuum 100 moves. This embodiment optimizes water uptake over cleaning effectiveness, which is sufficient for cleaning loose dirt and dust. To clean a stain, the autonomous vacuum 100 may employ the embodiment illustrated in FIG. 24B to increase the mop roller's scrubbing ability (i.e., by increasing the relative contact velocity of the mop roller). The autonomous vacuum 100 may switch back to the embodiment of FIG. 24A to pick up water 2320 from the water pool 2450 formed while scrubbing the stain.

Further, the abilities of the mop roller 385 illustrated with respect to FIGS. 24A-24B may be applied by the autonomous vacuum 100 to clean the mop pad 2200 of the mop roller 385. In particular, the autonomous vacuum 100 may rotate the mop roller 385 forward constantly for an interval of time to clean the mop pad 2200 by removing dirty water via the air outlets 2330. In addition, by keeping the mop roller 385 constantly rotating, the mop pad 2200 of the mop roller 385 may be uniformly exposed to dirt and other messes.

Figure 25:
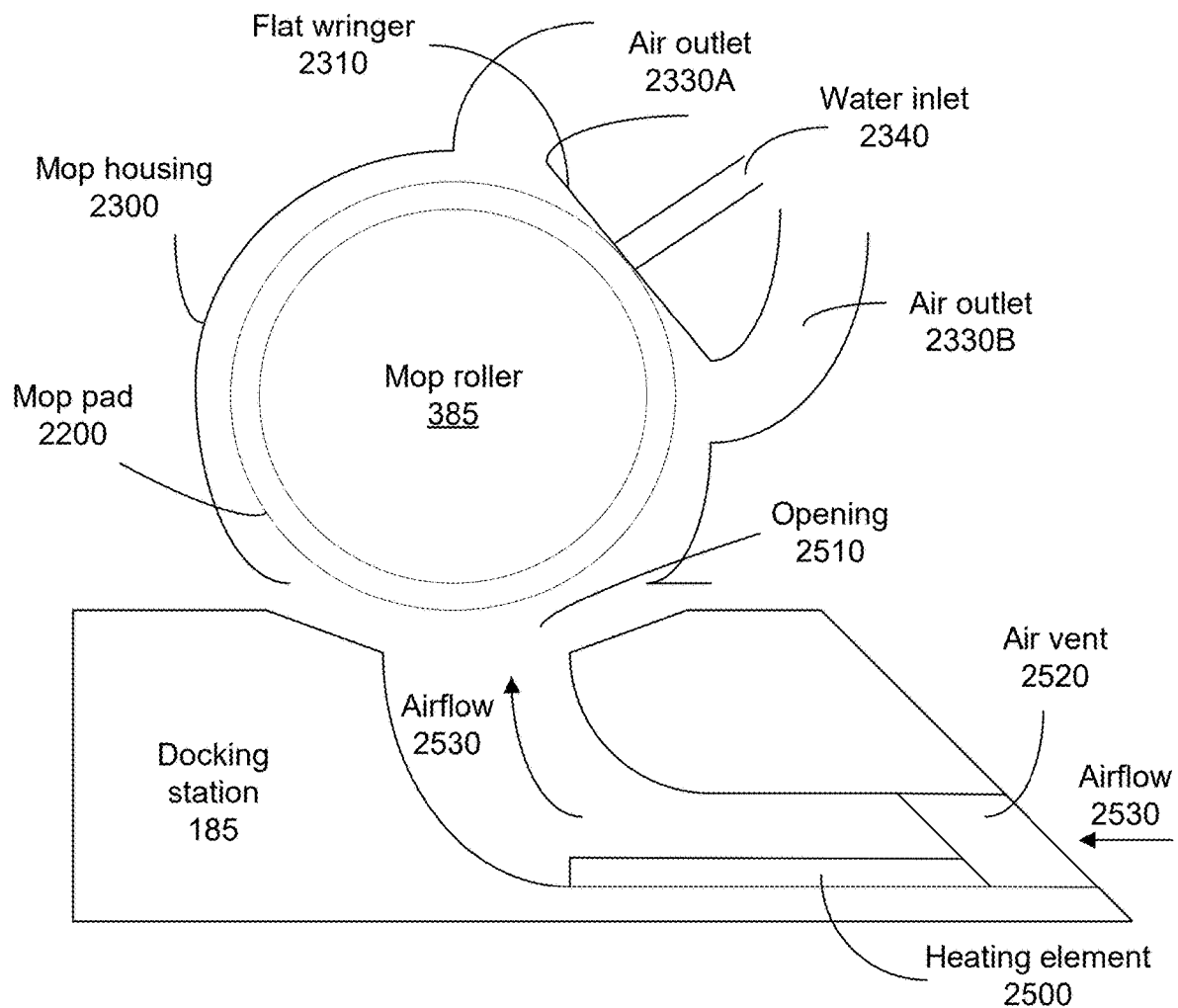
FIG. 25 illustrates a mop roller over a docking station, according to one example embodiment.

FIG. 25 illustrates a mop roller 385 over a docking station, according to one example embodiment. After the mop roller 385 has been in use for cleaning an environment, the mop pad 2200 may remain damp for several hours due to lack of airflow within the mop housing 2300. To accelerate drying of the mop pad 2200, the autonomous vacuum 100 may return to the docking station 185, which includes a heating element 2500 that generates hot air to dry the mop pad 2200. The heating element 2500 sits next to an air vent 2520 positioned in the side of the docking station 185 to allow air flow through an opening 2510. When docked at the docking station 185, the autonomous vacuum 100 rests the mop roller 385 over the opening 2510 in the docking station 185 and pulls air at a low speed through the opening using the vacuum pump 115. The air of this airflow 2530 heats up by moving over the heating element 2500 before rising through the opening 2510 towards the mop pad 2200 from drying. By combining continuous airflow 2530 and heat, the mop pad 2200 can be dried quickly, decreasing the potential for bacterial growth.

Figure 26:
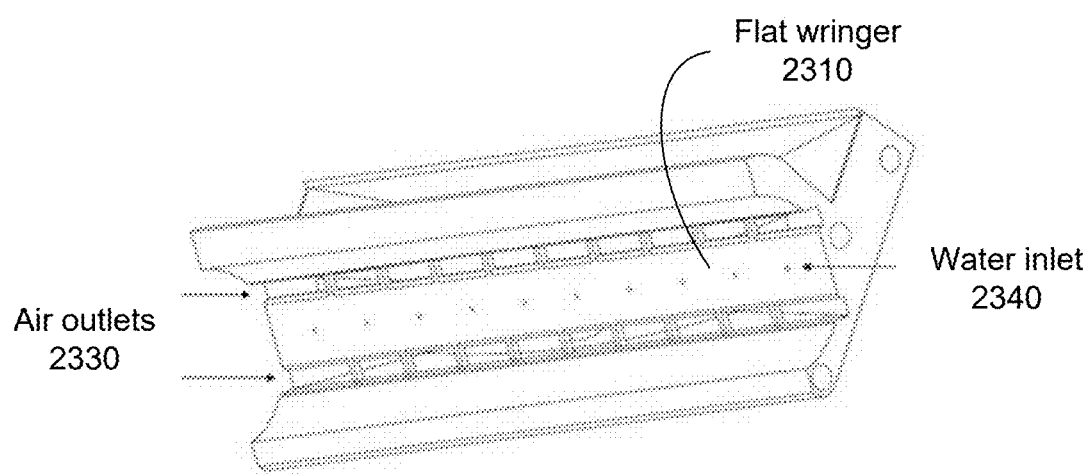
FIG. 26 illustrates a flat wringer for a mop roller, according to one example embodiment.

FIG. 26 illustrates a flat wringer 2310 for the mop roller 385, according to one example embodiment. In this embodiment, the flat wringer 2310 is positioned between two rows of air outlets 2330 and includes multiple water inlets 2340 positioned along the middle of the flat wringer 2310. In other embodiments, the flat wringer 2310 may include less water inlets 2340 and may be shaped differently, such as to conform to the curve of the mop roller 385.

Computer Architecture

Figure 27:
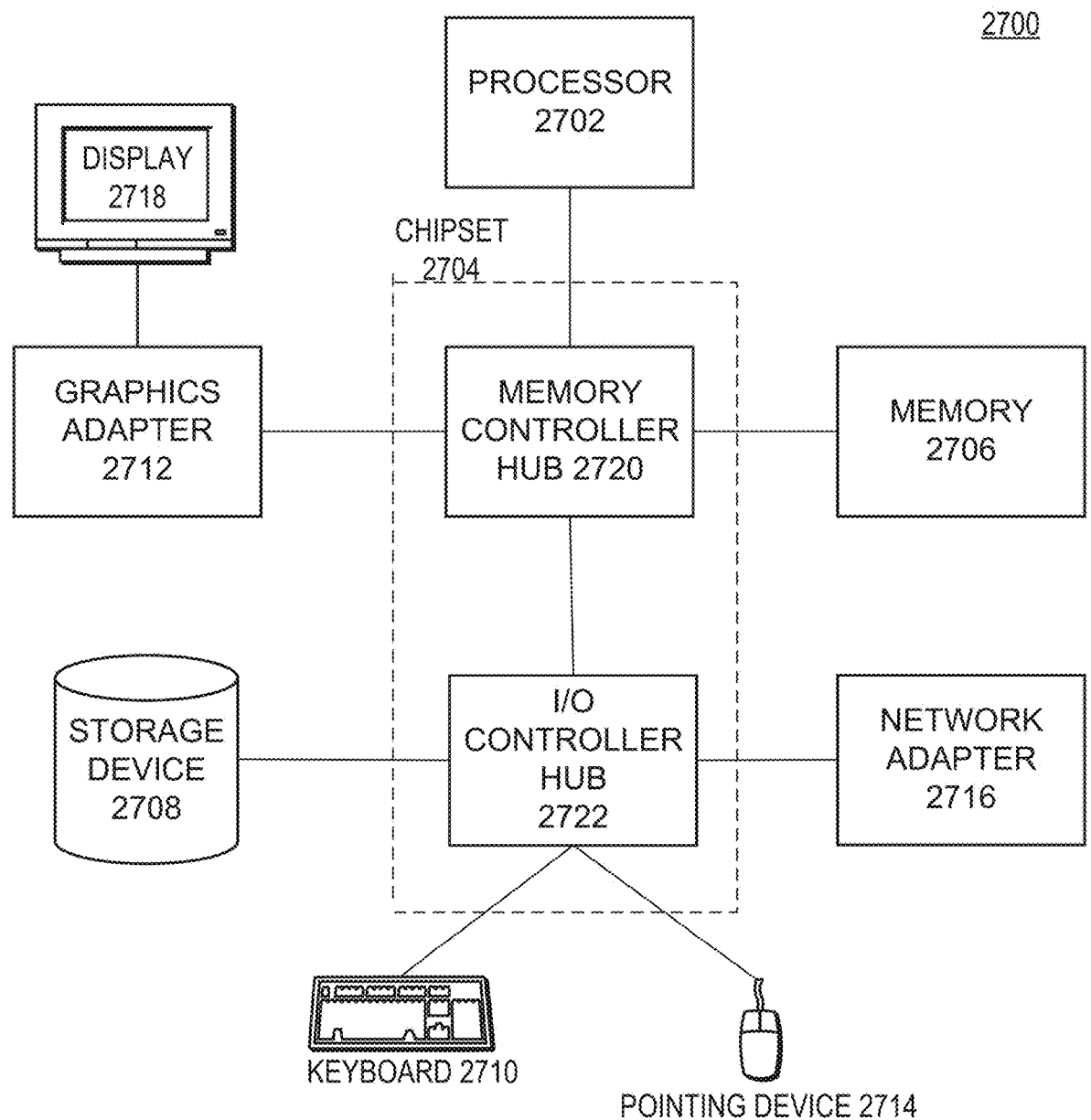
FIG. 27 is a high-level block diagram illustrating physical components of a computer used as part or all of the client device from FIG. 4, according to one embodiment. The figures depict embodiments of the disclosed configurations for purposes of illustration only. One skilled in the art will readily recognize from the following description that alternative embodiments of the structures and methods illustrated herein may be employed without departing from the principles of the disclosed configurations described herein.

FIG. 27 is a high-level block diagram illustrating physical components of a computer 2700 used as part or all of the client device 410 from FIG. 4, according to one embodiment. Illustrated are at least one processor 2702 coupled to a chipset 2704. Also coupled to the chipset 2704 are a memory 2706, a storage device 2708, a graphics adapter 2712, and a network adapter 2716. A display 2718 is coupled to the graphics adapter 2712. In one embodiment, the functionality of the chipset 2704 is provided by a memory controller hub 2720 and an I/O controller hub 2722. In another embodiment, the memory 2706 is coupled directly to the processor 2702 instead of the chipset 2704.

The storage device 2708 is any non-transitory computer-readable storage medium, such as a hard drive, compact disk read-only memory (CD-ROM), DVD, or a solid-state memory device. The memory 2706 holds instructions and data used by the processor 2702. The graphics adapter 2712 displays images and other information on the display 2718. The network adapter 2716 couples the computer 2700 to a local or wide area network.

As is known in the art, a computer 2700 can have different and/or other components than those shown in FIG. 27. In addition, the computer 2700 can lack certain illustrated components. In one embodiment, a computer 2700 acting as a server may lack a graphics adapter 2712, and/or display 2718, as well as a keyboard or pointing device. Moreover, the storage device 2708 can be local and/or remote from the computer 2700 (such as embodied within a storage area network (SAN)).

As is known in the art, the computer 2700 is adapted to execute computer program modules for providing functionality described herein. As used herein, the term "module" refers to computer program logic utilized to provide the specified functionality. Thus, a module can be implemented in hardware, firmware, and/or software. In one embodiment, program modules are stored on the storage device 2708, loaded into the memory 2706, and executed by the processor 2702.

Embodiments of the entities described herein can include other and/or different modules than the ones described here. In addition, the functionality attributed to the modules can be performed by other or different modules in other embodiments. Moreover, this description occasionally omits the term "module" for purposes of clarity and convenience.

Other Considerations

The disclosed configurations have been described in particular detail with respect to one possible embodiment. Those of skill in the art will appreciate that the invention may be practiced in other embodiments. First, the particular naming of the components and variables, capitalization of terms, the attributes, data structures, or any other programming or structural aspect is not mandatory or significant, and the mechanisms that implement the invention or its features may have different names, formats, or protocols. Also, the particular division of functionality between the various system components described herein is merely for purposes of example, and is not mandatory; functions performed by a single system component may instead be performed by multiple components, and functions performed by multiple components may instead performed by a single component.

Some portions of the above description present the features of the present invention in terms of algorithms and symbolic representations of operations on information. These algorithmic descriptions and representations are the means used by those skilled in the data processing arts to most effectively convey the substance of their work to others skilled in the art. These operations, while described functionally or logically, are understood to be implemented by computer programs. Furthermore, it has also proven convenient at times, to refer to these arrangements of operations as modules or by functional names, without loss of generality.

Unless specifically stated otherwise as apparent from the above discussion, it is appreciated that throughout the description, discussions utilizing terms such as "determining" or "displaying" or the like, refer to the action and processes of a computer system, or similar electronic computing device, that manipulates and transforms data represented as physical (electronic) quantities within the computer system memories or registers or other such information storage, transmission or display devices.

Certain aspects of the present invention include process steps and instructions described herein in the form of an algorithm. It should be noted that the process steps and instructions of the present invention could be embodied in software, firmware or hardware, and when embodied in software, could be downloaded to reside on and be operated from different platforms used by real time network operating systems.

The present invention also relates to an apparatus for performing the operations herein. This apparatus may be specially constructed for the required purposes, or it may comprise a general-purpose computer selectively activated or reconfigured by a computer program stored on a computer readable medium that can be accessed by the computer. Such a computer program may be stored in a non-transitory computer readable storage medium, such as, but is not limited to, any type of disk including floppy disks, optical disks, CD-ROMs, magnetic-optical disks, read-only memories (ROMs), random access memories (RAMs), EPROMS, EEPROMs, magnetic or optical cards, application specific integrated circuits (ASICs), or any type of computer-readable storage medium suitable for storing electronic instructions, and each coupled to a computer system bus. Furthermore, the computers referred to in the specification may include a single processor or may be architectures employing multiple processor designs for increased computing capability.

The algorithms and operations presented herein are not inherently related to any particular computer or other apparatus. Various general-purpose systems may also be used with programs in accordance with the teachings herein, or it may prove convenient to construct more specialized apparatus to perform the required method steps. The required structure for a variety of these systems will be apparent to those of skill in the art, along with equivalent variations. In addition, the present invention is not described with reference to any particular programming language. It is appreciated that a variety of programming languages may be used to implement the teachings of the present invention as described herein, and any references to specific languages are provided for invention of enablement and best mode of the present invention.

The present invention is well suited to a wide variety of computer network systems over numerous topologies.

Within this field, the configuration and management of large networks comprise storage devices and computers that are communicatively coupled to dissimilar computers and storage devices over a network, such as the Internet.

Finally, it should be noted that the language used in the specification has been principally selected for readability and instructional purposes and may not have been selected to delineate or circumscribe the inventive subject matter. Accordingly, the disclosure of the present disclosure is intended to be illustrative, but not limiting, of the scope of the protection available, which is set forth in the following claims.

What is claimed is:

1. A non-transitory computer-readable storage medium storing instructions that when executed cause a computer processor to:
receive, via a sensor system, visual data about a home environment;
determine a ground plane of the home environment in the visual data;
detect objects within the home environment based on the detected ground plane;
for each object:
segment a three-dimensional representation of the object out of the visual data,
determine an object type of the object based on visual data of the object,
wherein the object type is a classification of different objects found in the home environment,
apply a descriptor tag to the object indicating the object type of the object,
determine whether the object is static or dynamic,
responsive to determining the object is static, map the three-dimensional representation to a long-term level of a map of the home environment, and
responsive to determining the object is dynamic, map the three-dimensional representation to an intermediate level of the map of the home environment;
wherein a first set of objects having a first descriptor tag indicating a first object type is mapped to the long-term level and a second set of objects having the first descriptor tag indicating the first object type is mapped to the intermediate level;
localize a current position of an autonomous vacuum in the home environment based on objects mapped to the long-term level of the map of the home environment while excluding objects mapped to the intermediate level of the map;
determine navigation instructions to navigate the autonomous vacuum along a path from the current position of the autonomous vacuum to a target position where a mess is located, the path being based on the current position of the autonomous vacuum and objects detected within the environment in the long-term level of the map and the intermediate level of the map; and
instruct an actuator assembly to move the autonomous vacuum to vacuum dirt in the home environment using the map of the home environment and the navigation instructions.

2. The non-transitory computer-readable storage medium of claim 1, the instructions further comprising instructions that, when executed, cause the computer processor to:
responsive to detecting a first object is within a threshold radius of an autonomous vacuum, map the first object to an immediate level of the map.

3. The non-transitory computer-readable storage medium of claim 2, wherein the threshold radius varies by time of day.

4. The non-transitory computer-readable storage medium of claim 2, wherein object mappings at the immediate level are updated as the autonomous vacuum moves around the home environment.

5. The non-transitory computer-readable storage medium of claim 1, the instructions further comprising instructions that, when executed, cause the computer processor to:
identify a first object based on an object database; and
responsive to determining that the first object is of an object type indicating that the first object is a person, determine a fingerprint of the person based on the visual data and audio data captured by the sensor system.

6. The non-transitory computer-readable storage medium of claim 5, wherein the fingerprint of the person comprises an image of the person's face, an outline of the person's body, a representation of the person's clothing, and a voice print describing aspects of the person's voice.

7. The non-transitory computer-readable storage medium of claim 1, wherein the visual data includes camera data, lidar data, and infrared data.

8. The non-transitory computer-readable storage medium of claim 1, the instructions further comprising instructions that, when executed, cause the computer processor to:
identify a first object based on an object database;
tag the three-dimensional representation of the first object in the map with a warning; and
construct a virtual border around the three-dimensional representation of the first object in the map.

9. The non-transitory computer-readable storage medium of claim 1, the instructions further comprising instructions that, when executed, cause the computer processor to:
receive real-time visual data of the home environment; and
responsive to detecting pixels at or above the ground plane that do not match a surface type of the ground plane:
segment the pixels from the real-time visual data;
compare the segmented pixels to the long-term level of the map; and
responsive to determining that the segmented pixels do not match the long-term level of the map, flag an area corresponding to the pixels as containing a mess in the intermediate level of the map.

10. The non-transitory computer-readable storage medium of claim 1, the instructions further comprising instructions that, when executed, cause the computer processor to:
detect walls within the home environment based on the visual data; and
map an outline of the walls to each level of the map.

11. The non-transitory computer-readable storage medium of claim 1, the instructions further comprising instructions that, when executed, cause the computer processor to, at a subsequent time period:
receive, via the sensor system, additional visual data about the home environment;
detect a first object at a current position within the home environment;
determine that the first object is mapped to the intermediate level of the map at a prior position within the home environment; and
responsive to determining that the intermediate level of the map contains the three-dimensional representation of the first object, update a location of the first object in the intermediate level of the map from the prior position to the current position.

12. The non-transitory computer-readable storage medium of claim 1, the instructions further comprising instructions that, when executed, cause the computer processor to:
   receive real-time visual data of the home environment; and
   apply a neural network to the real-time visual data to detect the dirt in the home environment, the neural network trained on image data labeled with surface type and inclusion of dirt, wherein the computer processor is caused to instruct the actuator assembly responsive to detecting the dirt in the real-time visual data.

13. The non-transitory computer-readable storage medium of claim 1, wherein object mappings at the long-term level are updated when an autonomous vacuum is at a docking station.

14. A method for mapping a home environment around an autonomous vacuum, the method comprising:
   receiving, via a sensor system, visual data about the home environment;
   determining a ground plane of the home environment in the visual data;
   detecting objects within the home environment based on the detected ground plane;
   for each object:
      segmenting a three-dimensional representation of the object out of the visual data,
      determining an object type of the object based on visual data of the object,
         wherein the object type is a classification of different objects found in the home environment,
      applying a descriptor tag to the object indicating the object type of the object,
      determining whether the object is static or dynamic,
      responsive to determining the object is static, mapping the three-dimensional representation to a long-term level of a map of the home environment, and
      responsive to determining the object is dynamic, mapping the three-dimensional representation to an intermediate level of the map of the home environment;
   wherein a first set of objects having a first descriptor tag indicating a first object type is mapped to the long-term level and a second set of objects having the first descriptor tag indicating the first object type is mapped to the intermediate level;
   localizing a current position of an autonomous vacuum in the home environment based on objects mapped to the long-term level of the map of the home environment while excluding objects mapped to the intermediate level of the map;
   determining navigation instructions to navigate the autonomous vacuum along a path from the current position of the autonomous vacuum to a target position where a mess is located, the path being based on the current position of the autonomous vacuum and objects detected within the environment in the long-term level of the map and the intermediate level of the map; and
   instructing an actuator assembly to move the autonomous vacuum to vacuum dirt in the home environment using the map of the home environment and the navigation instructions.

15. The method of claim 14, the method further comprising:
   responsive to detecting the object is within a threshold radius of the autonomous vacuum,
   mapping the object to an immediate level of the map.

16. The method of claim 15, wherein the threshold radius varies by time of day.

17. The method of claim 14, the method further comprising:
   identify a first object based on an object database; and
   responsive to determining that the first object is of an object type indicating that the first object is a person, determining a fingerprint of the person based on the visual data and audio data captured by the sensor system, wherein the fingerprint of the person comprises an image of the person's face, an outline of the person's body, a representation of the person's clothing, and a voice print describing aspects of the person's voice.

18. The method of claim 14, the method further comprising:
   identifying a first object based on an object database;
   tagging the three-dimensional representation of the first object in the map with a warning; and
   constructing a virtual border around the three-dimensional representation of the first object in the map.

19. A computer system comprising:
   a computer processor; and
   a non-transitory computer-readable storage medium storing instructions that when executed cause a computer processor to perform actions comprising:
      receiving, via a sensor system, visual data about a home environment;
      determining a ground plane of the home environment in the visual data;
      detecting objects within the home environment based on the detected ground plane;
      for each object:
         segmenting a three-dimensional representation of the object out of the visual data,
         determining an object type of the object based on visual data of the object, wherein the object type is a classification of different objects found in the home environment,
         applying a descriptor tag to the object indicating the object type of the object,
         determining whether the object is static or dynamic,
         responsive to determining the object is static, mapping the three-dimensional representation to a long-term level of a map of the home environment, and
         responsive to determining the object is dynamic, mapping the three-dimensional representation to an intermediate level of the map of the home environment;
      wherein a first set of objects having a first descriptor tag indicating a first object type is mapped to the long-term level and a second set of objects having the first descriptor tag indicating the first object type is mapped to the intermediate level;
      localizing a current position of an autonomous vacuum in the home environment based on objects mapped to the long-term level of the map of the home environment while excluding objects mapped to the intermediate level of the map;
      determining navigation instructions to navigate the autonomous vacuum based on the position of the autonomous vacuum along a path from the current position of the autonomous vacuum to a target position where a mess is located, the path being based on the current position of the autonomous vacuum and objects detected within the environment in the long-term level of the map and the intermediate level of the map; and instructing an actuator assembly to move the autonomous vacuum to vacuum dirt in the home environment using the map of the home environment and the navigation instructions.

20. The computer system of claim 19, the actions further comprising:

responsive to detecting the object is within a threshold radius of an autonomous vacuum, mapping the object to an immediate level of the map.

* * * * *